(12) United States Patent
Shirai et al.

(10) Patent No.: US 10,347,059 B2
(45) Date of Patent: Jul. 9, 2019

(54) INFORMATION PROCESSING APPARATUS, INFORMATION PROCESSING METHOD, PROGRAM, AND INFORMATION PROCESSING SYSTEM

(71) Applicant: SONY CORPORATION, Tokyo (JP)

(72) Inventors: Taizo Shirai, Kanagawa (JP); Akichika Tanaka, Kanagawa (JP); Tatsuhiro Ilda, Tokyo (JP); Koichi Sakumoto, Tokyo (JP); Takeo Inagaki, Tokyo (JP); Shinpei Hirano, Tokyo (JP); Tetsuro Tsuji, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/992,834

(22) Filed: May 30, 2018

(65) Prior Publication Data
US 2018/0276918 A1    Sep. 27, 2018

Related U.S. Application Data

(63) Continuation of application No. 15/532,807, filed as application No. PCT/JP2015/074100 on Aug. 26, 2015, now Pat. No. 10,055,913.

(30) Foreign Application Priority Data
Dec. 9, 2014    (JP) .................................. 2014-249218

(51) Int. Cl.
G07C 9/00    (2006.01)
E05B 49/00    (2006.01)
(Continued)

(52) U.S. Cl.
CPC .......... *G07C 9/00039* (2013.01); *E05B 49/00* (2013.01); *H04L 9/14* (2013.01);
(Continued)

(58) Field of Classification Search
CPC ....... G07C 9/00039; E05B 47/00; H04L 9/14; H04L 9/30; H04L 9/3226
(Continued)

(56) References Cited

U.S. PATENT DOCUMENTS 10,075,845 B2 *    9/2018    Yamamoto ............ H04W 12/06
2006/0072755 A1    4/2006    Oskari
(Continued)

FOREIGN PATENT DOCUMENTS

JP    2000-231481 A    8/2000
JP    2003-343133 A    12/2003
(Continued)

OTHER PUBLICATIONS

Extended European Search Report dated May 18, 2018 in corresponding European Patent Application No. 15868048.8, 8 pages.
(Continued)

*Primary Examiner* — Allen T Cao
(74) *Attorney, Agent, or Firm* — Xsensus, LLP

(57) ABSTRACT

An information processing apparatus provides an enhanced capability of authentication safety when unlocking. The information processing apparatus includes communication circuitry configured to receive an unlocking request and first information generated based on a first secret key, from a first communication terminal and control circuitry configured to determine whether or not to cause a locking circuit to unlock, based on a first public key corresponding to the first secret key and the generated first information.

18 Claims, 45 Drawing Sheets

(51) Int. Cl.
  *H04L 9/14* (2006.01)
  *H04L 9/32* (2006.01)
  *H04L 9/30* (2006.01)
  *E05B 47/00* (2006.01)
(52) U.S. Cl.
  CPC .................. *H04L 9/30* (2013.01); *H04L 9/32* (2013.01); *H04L 9/3226* (2013.01); *E05B 47/00* (2013.01)
(58) Field of Classification Search
  USPC .................................................. 340/5.6–5.65
  See application file for complete search history.

(56) References Cited

U.S. PATENT DOCUMENTS

| | | |
|---|---|---|
| 2011/0035604 A1 | 2/2011 | Habraken |
| 2012/0280783 A1 | 11/2012 | Gerhardt et al. |
| 2012/0280789 A1 | 11/2012 | Gerhardt et al. |
| 2012/0280790 A1 | 11/2012 | Gerhardt et al. |
| 2014/0365773 A1 | 12/2014 | Gerhardt et al. |
| 2014/0379951 A1* | 12/2014 | Taki .................... G06F 13/4068 710/303 |
| 2015/0102906 A1 | 4/2015 | Gerhardt et al. |
| 2015/0131605 A1* | 5/2015 | Nogami ................ H04L 5/0053 370/330 |
| 2015/0181014 A1 | 6/2015 | Gerhardt et al. |
| 2017/0243424 A1 | 8/2017 | Shirai |

FOREIGN PATENT DOCUMENTS

| | | |
|---|---|---|
| JP | 2006-233475 A | 9/2006 |
| JP | 2007-239347 A | 9/2007 |
| JP | 2010-134749 A | 6/2010 |
| JP | 2011-179957 A | 9/2011 |
| JP | 2012-151807 A | 8/2012 |
| JP | 2013-235465 A | 11/2013 |

OTHER PUBLICATIONS

International Search Report dated Nov. 10, 2015 in PCT/JP2015/074100 filed Aug. 26, 2015.

* cited by examiner

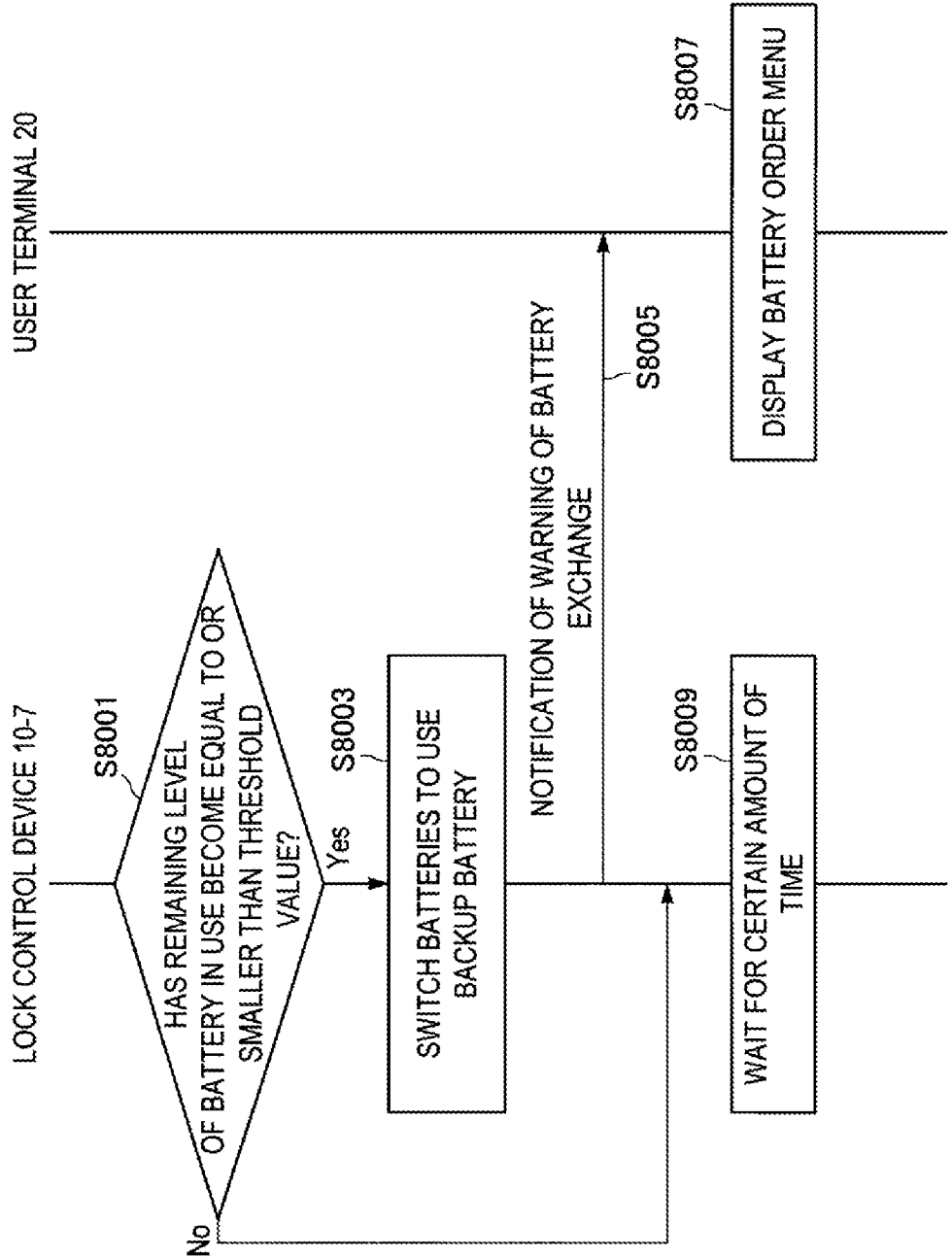

INFORMATION PROCESSING APPARATUS, INFORMATION PROCESSING METHOD, PROGRAM, AND INFORMATION PROCESSING SYSTEM

CROSS-REFERENCE TO RELATED APPLICATIONS

The present application is a continuation of U.S. application Ser. No. 15/532,807, filed on Jun. 2, 2017, which is based on PCT application No. PCT/JP2015/074100, filed on Aug. 26, 2015, and claims priority to Japanese Patent Application 2014-249218, filed on Dec. 9, 2014, the entire contents of each of which is incorporated herein by reference.

TECHNICAL FIELD

The present disclosure relates to an information processing apparatus, an information processing method, a program, and an information processing system.

BACKGROUND ART

In the past, lock control devices capable of locking and unlocking doors electrically have been developed. For example, Patent Literature 1 discloses a technology that performs an unlocking control in which, when a portable device is placed over an electrical lock, the electrical lock reads key data from the portable device and then matches the read key data to authentication key data.

CITATION LIST

Patent Literature

Patent Literature 1: JP 2007-239347A

DISCLOSURE OF INVENTION

Technical Problem

However, the technology described in Patent Literature 1 is low in safety of authentication. For example, in the above technology, the key data of the portable device is transmitted to the electrical lock as it is. Accordingly, when transmitting the key data, there is a risk of key data leak by intercept of another device, for example.

Thus, in the present disclosure, there is proposed an information processing apparatus, an information processing method, a program, and an information processing system, which are novel and improved, and are capable of enhancing the safety of authentication when unlocking.

Solution to Problem

According to the present disclosure, there is provided an information processing apparatus including: a communication unit configured to receive an unlocking request and first information generated on the basis of a first secret key, from a first communication terminal; and a determination unit configured to determine whether or not to cause a locking unit to unlock, on the basis of a first public key corresponding to the first secret key and the generated first information.

Further, according to the present disclosure, there is provided an information processing method including: receiving an unlocking request and first information generated on the basis of a first secret key, from a first communication terminal; and determining whether or not to cause a locking unit to unlock, on the basis of a first public key corresponding to the first secret key and the generated first information.

Further, according to the present disclosure, there is provided a program for causing a computer to function as: a communication unit configured to receive an unlocking request and first information generated on the basis of a first secret key, from a first communication terminal; and a determination unit configured to determine whether or not to cause a locking unit to unlock, on the basis of a first public key corresponding to the first secret key and the generated first information.

Further, according to the present disclosure, there is provided an information processing system including: a first communication terminal; and an information processing apparatus. The information processing apparatus includes a communication unit configured to receive an unlocking request and first information generated on the basis of a first secret key, from the first communication terminal, and a determination unit configured to determine whether or not to cause a locking unit to unlock, on the basis of a first public key corresponding to the first secret key and the generated first information.

Advantageous Effects of Invention

As described above, according to the present disclosure, the safety of authentication when unlocking can be enhanced. Note that the effect described herein is not necessarily restrictive, but may be one of the effects described in embodiments of the present disclosure.

BRIEF DESCRIPTION OF DRAWINGS

FIG. 45 is a sequence diagram illustrating an operation according to the same embodiment.

MODE(S) FOR CARRYING OUT THE INVENTION

Figure 1:
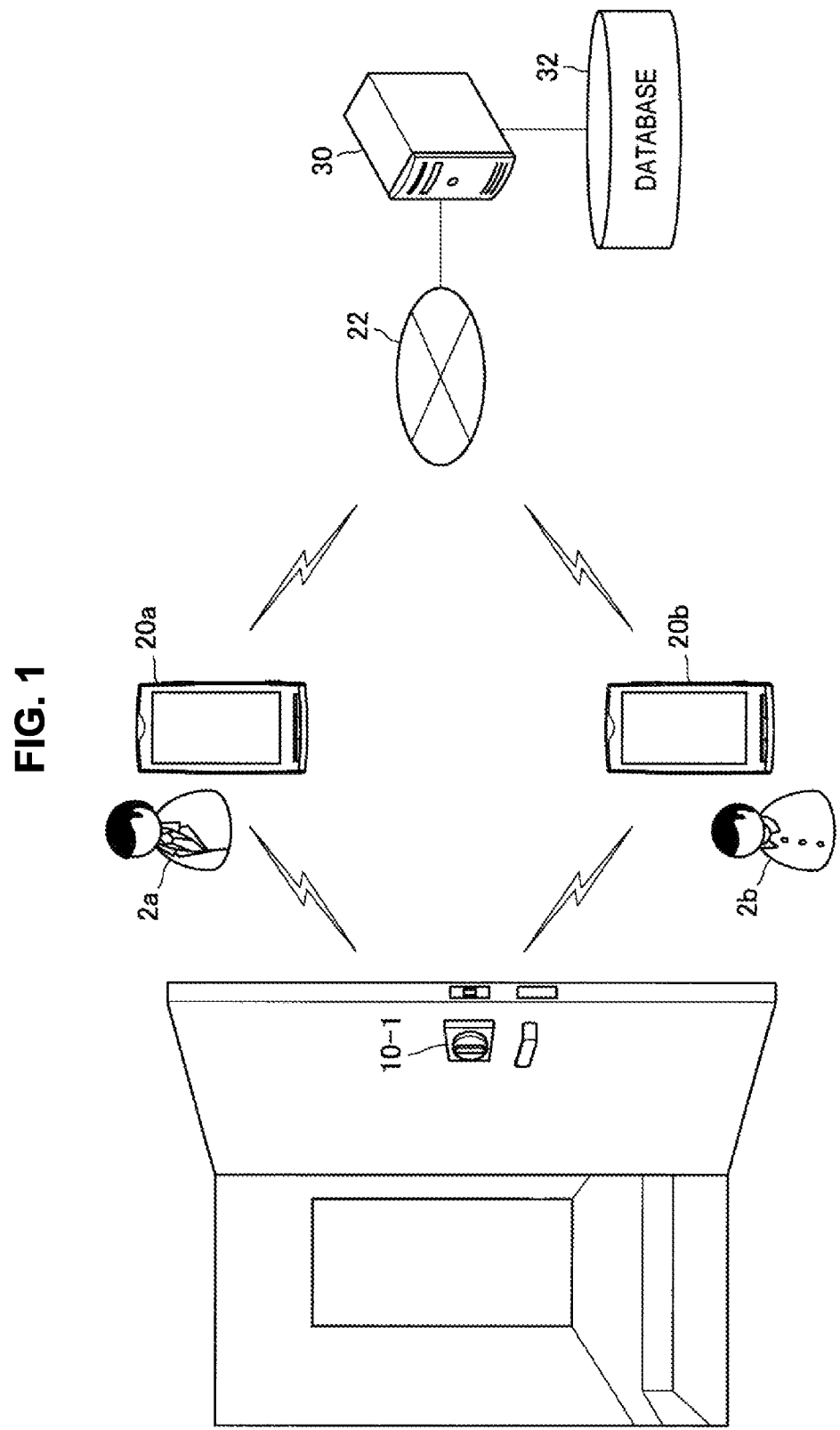
FIG. 1 is an explanatory diagram illustrating an exemplary configuration of an information processing system according to a first embodiment of the present disclosure.

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Also, in the present specification and drawings, a plurality of structural elements that have substantially the same function and structure are sometimes distinguished by adding different alphabets after a same reference numeral. For example, a plurality of configurations having substantially same function and structure are distinguished as appropriate, like the user terminal 20a and the user terminal 20b. However, in a case where a plurality of structural elements that have substantially the same function and structure are needless to be distinguished from each other, only a same reference sign is assigned. For example, in a case where a user terminal 20a and a user terminal 20b are needless to be distinguished particularly, they are simply referred to as user terminal 20.

Also, "Description of Embodiments" will be described in accordance with the item order listed below.

1. First Embodiment
2. Second Embodiment
3. Third Embodiment
4. Fourth Embodiment
5. Fifth Embodiment
6. Sixth Embodiment
7. Seventh Embodiment
8. Exemplary Variant The present disclosure can be embodied in various forms, as described in detail in "1. First Embodiment" to "7. Seventh Embodiment" as one example. First, the first embodiment will be described.

1. First Embodiment

<1-1. System Configuration>

FIG. 1 is an explanatory diagram illustrating the configuration of an information processing system according to the first embodiment. As illustrated in FIG. 1, the information processing system according to the first embodiment includes a lock control device 10-1, user terminals 20, a communication network 22, a server 30, and a database 32.

[1-1-1. Lock Control Device 10-1]

The lock control device 10-1 is an example of the information processing apparatus in the present disclosure. The lock control device 10-1 is attached to a door at an entrance of a house for example, for the purpose of controlling locking and unlocking. More specifically, the lock control device 10-1 controls locking and unlocking of a locking unit 132 corresponding to a thumbturn of a lock.

Also, this lock control device 10-1 controls unlocking on the basis of an unlocking request received from the user terminal 20 described later.

[1-1-2. User Terminal 20]

The user terminal 20 is an example of a communication terminal in the present disclosure. The user terminal 20 is a terminal that a user 2 possess, and is basically a portable terminal. For example, the user terminal 20 may be a mobile phone such as a smartphone, a tablet terminal, and a device of a watch type.

The user terminal 20 is capable of implementing an application for requesting the lock control device 10-1 to unlock the door. Also, the user terminal 20 is capable of communicating with the server 30 via the communication network 22 described later, by wireless communication for example.

[1-1-3. Communication Network 22]

The communication network 22 is a wired or wireless transmission channel of information transmitted from devices connected to the communication network 22. For example, the communication network 22 may include a public line network such as a telephone line network, the Internet, and a satellite communication network, various types of local area networks (LAN) including Ethernet (registered trademark), a wide area network (WAN). Also, the communication network 22 may include a dedicated line network, such as an internet protocol-virtual private network (IP-VPN).

[1-1-4. Server 30]

The server 30 is an example of a management device in the present disclosure. The server 30 is a device for managing a key authentication service configured by a web system, for example. For example, the server 30 newly registers an account of the user 2 on the basis of a request from the user terminal 20, and authenticates when the user terminal 20 logs in to the key authentication service.

[1-1-5. Database 32]

The database 32 is a device for storing various information utilized in the key authentication service, in accordance with an instruction from the server 30. For example, the database 32 stores registration information of the user 2 and the user terminal 20 having an unlocking right, in association with the individual lock control device 10-1.

Note that the information processing system according to the first embodiment is not limited to the above configuration. For example, the database 32 may be stored in the server 30, instead of being configured as an independent device.

[1-1-6. Clarification of Problem]

(1-1-6-1. Problem 1)

In the above, the configuration of the information processing system according to the first embodiment has been described. In the meantime, when the user terminal 20 requests unlocking to the lock control device 10-1, it is necessary for the lock control device 10-1 to have the capability of authenticating that the user terminal 20 is a rightful terminal having the authority to unlock.

As the first method, the user terminal 20 is authenticated, by registering an ID or a password of the user in the lock control device 10-1, and then matching, by the lock control device 10-1, an ID or a password received at the time of an unlocking request from the user terminal 20.

However, in this first method, when transmitting the ID or the password, there is a risk of ID or password leak, by intercept of another device, for example. Then, when the ID or the password has leaked, the other device can unlock the door.

Also, as the second method, the user terminal 20 is authenticated, by registering a common key in the lock control device 10-1 and the user terminal 20, and then verifying, by the lock control device 10-1, the result obtained by decoding information encrypted with the common key and received by the user terminal 20. In this method, even if the information transmitted and received between the lock control device 10-1 and the user terminal 20 is intercepted, the risk of unlocking the door by another device is reduced. However, in this method, authentication is not performed without registering the same common key in a plurality of devices, increasing the number of devices for managing the key. As a result, there remains a risk of the key being intercepted.

(1-1-6-1. Problem 2)

Also, another problem is described below. It is desirable that the user 2 who is an administrator that manages the key of the lock control device 10-1 (hereinafter, referred to as owner 2a, in some cases) can issue unlockable key information for another user 2 (hereinafter, referred to as guest 2b, in some cases).

In the publicly known technology, there is proposed a method in which the guest 2b registers a his or her own key in the server, and then the owner 2a sets the unlocking authority to the key of the guest 2b registered in the server, as the first method. However, in this method, the owner 2a is unable to set the unlocking right to the guest 2b, in a case where his or her own key has not been registered in the server yet, e.g., when the guest 2b has not installed an appropriate application. Also, in this method, even if the guest 2b wishes to receive the key information, it is sometimes difficult to know which application is to be installed and how the setting of the terminal is to be conducted, for example.

Also, the second method may be such that a key ID issued for the guest 2b by the owner 2a is embedded in a URL (Uniform Resource Locator), and then an e-mail including the URL and the installation procedure of the application is transmitted to the guest 2b. However, in this method, when the key ID described in the e-mail main text is intercept by a third person, the third person can unlock the door.

Thus, in view of the above circumstances, the lock control device 10-1 according to the first embodiment has been created. The lock control device 10-1 according to the first embodiment is capable of authenticating the user terminal 20, without leaking secret information of the user terminal 20. Also, according to the first embodiment, the key information can be prevented from leaking, when the owner 2a delivers the key information of the lock control device 10-1 to the guest 2b. In the following, this first embodiment will be described in detail sequentially.

<1-2. Configuration>

[1-2-1. Lock Control Device 10-1]

Figure 2:
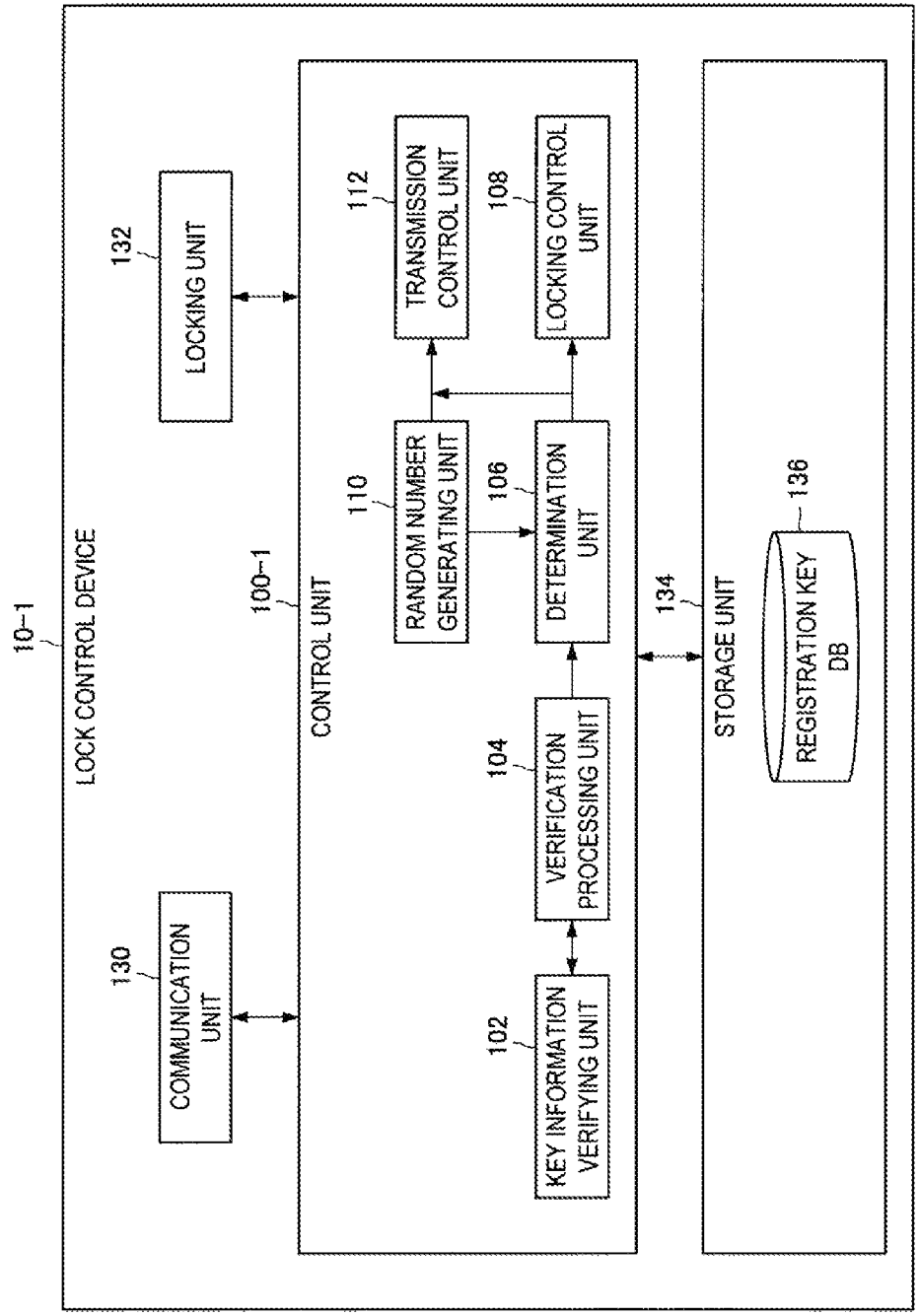
FIG. 2 is a functional block diagram illustrating an exemplary configuration of a lock control device 10-1 according to the same embodiment.

Next, the configuration according to the first embodiment will be described in detail. FIG. 2 is a functional block diagram illustrating the configuration of the lock control device 10-1 according to the first embodiment. As illustrated in FIG. 2, the lock control device 10-1 includes a control unit 100-1, a communication unit 130, a locking unit 132, and a storage unit 134.

(1-2-1-1. Control Unit 100-1)

The control unit 100-1 generally controls the operation of the lock control device 10-1, using hardware, such as a central processing unit (CPU) and a random access memory (RAM) for example, which are built into the lock control device 10-1. Also, as illustrated in FIG. 2, the control unit 100-1 includes a key information verifying unit 102, a verification processing unit 104, a determination unit 106, a locking control unit 108, a random number generating unit 110, and a transmission control unit 112.

(1-2-1-2. Key Information Verifying Unit 102)

The key information verifying unit 102 is an example of a key verifying unit in the present disclosure. The key information verifying unit 102 determines the rightfulness of an eKey received from the user terminal 20. Here, the eKey is an example of key information in the present disclosure.

For example, the key information verifying unit 102 verifies the rightfulness of the public key of the user terminal 20 on the basis of signature information for the public key of the user terminal 20, which is included in the received eKey. More specifically, the key information verifying unit 102 verifies whether or not the public key of the user terminal 20 is rightful, on the basis of the public key of the user terminal 20, and the decoding result, by the verification processing unit 104, of the signature information for the public key of the user terminal 20 which is included in the received eKey.

Also, the key information verifying unit 102 determines whether or not the eKey is within an effective period, with reference to the effective period of the received eKey.

eKey

Figure 3:
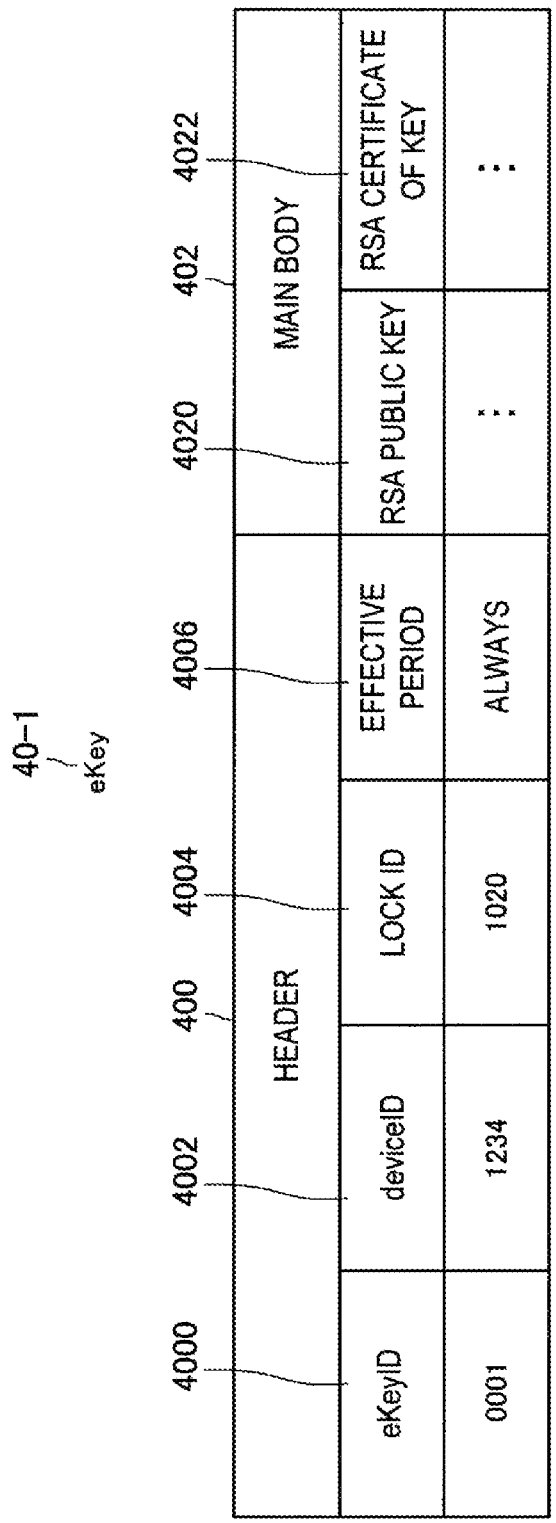
FIG. 3 is an explanatory diagram illustrating an exemplary configuration of an eKey according to the same embodiment.

Here, an exemplary configuration (eKey 40-1) of the eKey according to the first embodiment will be described with reference to FIG. 3. As illustrated in FIG. 3, the eKey 40-1 includes a header 400 and a main body 402, for example. Also, the header 400 includes an eKey ID 4000, a device ID 4002, a lock ID 4004, and an effective period 4006. Also, the main body 402 includes an RSA public key 4020 and an RSA certificate 4022 of the key.

Here, in the eKey ID 4000, the eKey ID corresponding to the eKey 40-1 is recorded. Note that, the eKey ID is an ID decided by the user terminal 20a of the owner 2a which has issued the eKey 40-1, for example. Also, in the device ID 4002, the terminal ID of the user terminal 20 having the eKey 40-1 is recorded. Also, in the lock ID 4004, the ID of the lock control device 10-1 which is authorized to unlock is recorded (in association with the eKey 40-1). Also, in the effective period 4006, the effective period set to the eKey 40-1 is recorded. For example, in the effective period 4006, usable day, day of week, or, time period, and the like are recorded. Note that FIG. 3 illustrates an example in which "ALWAYS", which is the value indicating no limitation of the period, is recorded as the effective period 4006. Also, in the RSA public key 4020, the RSA public key of the user terminal 20 to which the eKey 40-1 is issued is recorded. Also, in the RSA certificate 4022 of the key, the signature information by the user terminal 20a of the owner 2a for the RSA public key of the user terminal 20 to which the eKey 40-1 is issued is recorded. More specifically, in the RSA certificate 4022 of the key, the signature information using a RSA secret key of the user terminal 20a for the RSA public key of the user terminal 20 to which the eKey 40-1 is issued is recorded.

Note that the user terminal 20a of the owner 2a is also capable of issuing the eKey 40-1 for the terminal itself. In this case, in the RSA certificate 4022 of the key, the signature information of the user terminal 20a itself for the RSA public key of the user terminal 20a is recorded.

(1-2-1-3. Verification Processing Unit 104)

The verification processing unit 104 verifies, by a predetermined algorithm, the information generated on the basis of the secret key of the user terminal 20, which is received from the user terminal 20. For example, in a case where the information generated on the basis of the secret key of the user terminal 20 is received, the verification processing unit 104 verifies the received information on the basis of the public key of the user terminal 20. Also, the verification processing unit 104 decodes the signature information by the user terminal 20a of the owner 2a for the public key of the user terminal 20b, which is included in the eKey received from the user terminal 20, on the basis of the public key of the user terminal 20a.

(1-2-1-4. Determination Unit 106)

The determination unit 106 determines whether or not to cause the locking unit 132 described later to unlock, on the basis of the verification result of the information generated on the basis of the secret key of the user terminal 20, and the verification result of the public key of the user terminal 20. For example, the determination unit 106 determines to cause the locking unit 132 to unlock, in a case where the key information verifying unit 102 verifies that the public key of the user terminal 20 is rightful, and the verification processing unit 104 verifies that the information generated on the basis of the secret key of the user terminal 20 is rightful. More specifically, first, the determination unit 106 confirms whether or not the key information verifying unit 102 has verified that the public key of the user terminal 20 is rightful. Then, the determination unit 106 determines to cause the locking unit 132 to unlock, in a case where it is verified that the public key of the user terminal 20 is rightful, and the verification processing unit 104 has verified that the information generated by the user terminal 20 is rightful.

Also, the determination unit 106 determines not to cause the locking unit 132 to unlock, in a case where it is verified that the public key of the user terminal 20 is not rightful, or in a case where it is verified that the information generated on the basis of the secret key of the user terminal 20 is not rightful.

(1-2-1-5. Locking Control Unit 108)

The locking control unit 108 controls the operation of the locking unit 132 on the basis of the determination result by the determination unit 106. For example, the locking control unit 108 causes the locking unit 132 to unlock, in a case where the determination unit 106 has determined to unlock.

(1-2-1-6. Random Number Generating Unit 110)

The random number generating unit 110 generates a random number, such as a uniform random number within a predetermined range, for example.

(1-2-1-7. Transmission Control Unit 112)

The transmission control unit 112 causes the communication unit 130 to transmit various types of information to the user terminal 20. For example, the transmission control unit 112 causes the communication unit 130 to transmit the random number generated by the random number generating unit 110, to the user terminal 20.

(1-2-1-8. Communication Unit 130)

The communication unit 130 performs transmission and reception of information with another device, by the wireless communication in accordance with Bluetooth (registered trademark) such as Bluetooth low energy (BLE), Wi-Fi (registered trademark), near field communication (NFC), or the like, for example. For example, the communication unit 130 is controlled by the transmission control unit 112 to transmit the random number to the user terminal 20. Also, the communication unit 130 receives the eKey, the unlocking request, and the information generated on the basis of the secret key of the user terminal 20, from the user terminal 20.

(1-2-1-9. Locking Unit 132)

The locking unit 132 carries out locking or unlocking in accordance with the control of the locking control unit 108.

(1-2-1-10. Storage Unit 134)

The storage unit 134 is capable of storing various types of data, such as a registration key DB 136 described later, and software, for example.

Registration Key DB 136

As described later, the registration key DB 136 is a database that stores the information relevant to the user terminal 20a of the owner 2a which manages the relevant lock control device 10-1. Also, as an exemplary variant, the registration key DB 136 is capable of storing the information relevant to the user terminal 20b of the guest 2b for which the determination unit 106 has determined to unlock.

[1-2-2. User Terminal 20]

Figure 4:
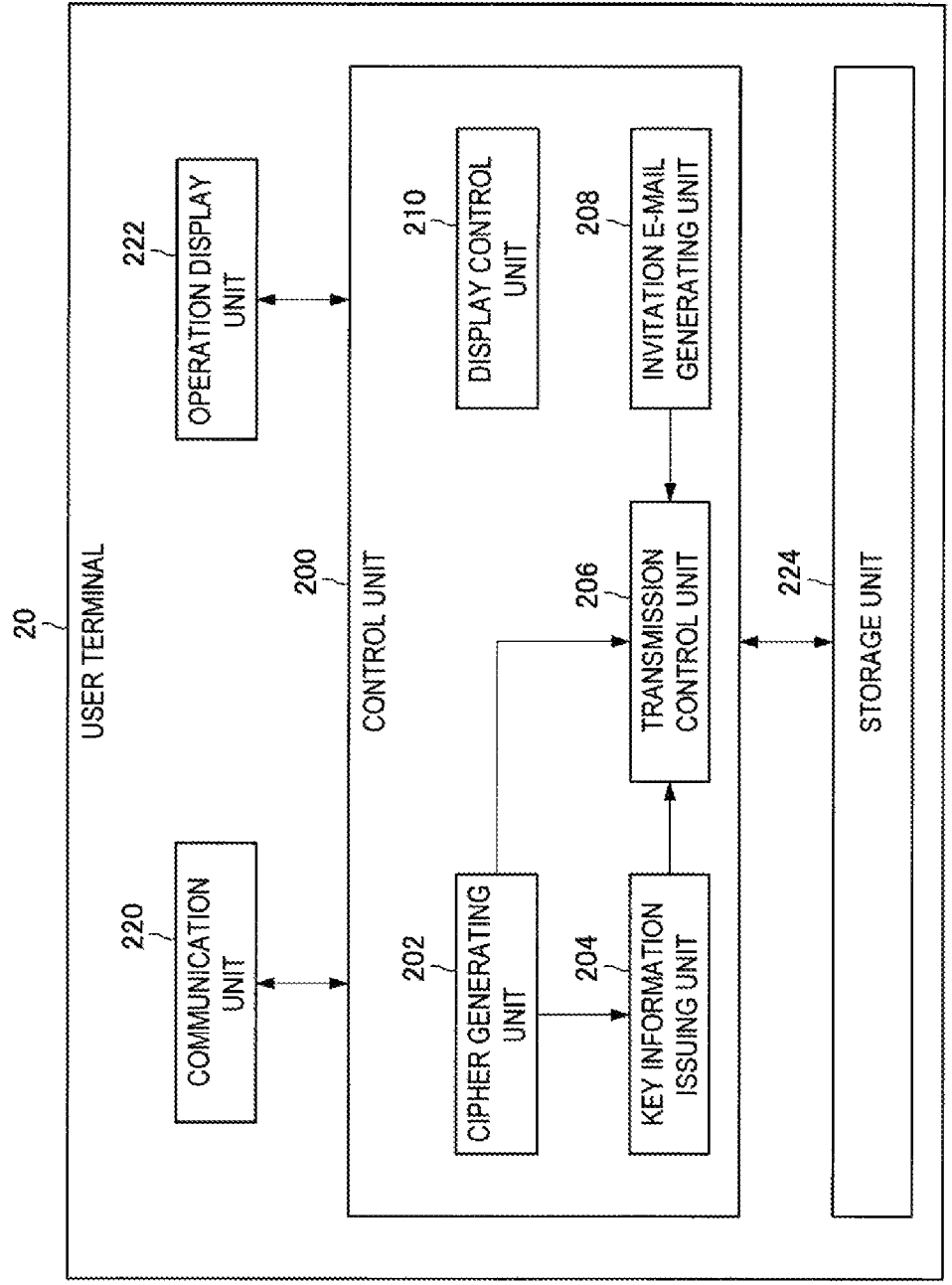
FIG. 4 is a functional block diagram illustrating an exemplary configuration of a user terminal 20 according to the same embodiment.

FIG. 4 is a functional block diagram illustrating the configuration of the user terminal 20 according to the first embodiment. As illustrated in FIG. 4, the user terminal 20 includes a control unit 200, a communication unit 220, an operation display unit 222, and a storage unit 224.

(1-2-2-1. Control Unit 200)

The control unit 200 generally controls the operation of the user terminal 20, using hardware, such as a CPU and a RAM for example, which is built into the user terminal 20. Also, as illustrated in FIG. 4, the control unit 200 includes a cipher generating unit 202, a key information issuing unit 204, a transmission control unit 206, an invitation e-mail generating unit 208, and a display control unit 210.

(1-2-2-2. Cipher Generating Unit 202)

Generation Example 1

The cipher generating unit 202 generates information on the basis of a predetermined algorithm and the random number received from the lock control device 10-1, for example. For example, the cipher generating unit 202 generates information on the basis of the received random number and the secret key of the user terminal 20 stored in the storage unit 224 described later. Here, the predetermined algorithm is the RSA cryptographic algorithm, for example.

Generation Example 2

In addition, in a case where the user terminal 20 is the user terminal 20 of the owner 2a, the cipher generating unit 202 is also capable of creating a digital signature for the public key of the user terminal 20b of the guest 2b. For example, in the above case, the cipher generating unit 202 creates a digital signature by encrypting the public key of the guest 2b, on the basis of the secret key of the user terminal 20.

(1-2-2-3. Key Information Issuing Unit 204)

The key information issuing unit 204 issues an eKey in association with the user terminal 20b, in a case where the user 2 of the user terminal 20 has the authority for issuing an eKey, and the eKey issuance request with respect to another user terminal 20b is received from the server 30 described later. More specifically, in the above case, the key information issuing unit 204 issues an eKey including signature information for the public key of the user terminal 20b, which is generated by the cipher generating unit 202.

(1-2-2-4. Transmission Control Unit 206)

The transmission control unit 206 causes the communication unit 220 to transmit various types of information to the lock control device 10-1 or the server 30. For example, the transmission control unit 206 causes the communication unit 220 to transmit the information generated by the cipher generating unit 202 to the lock control device 10-1. Also, the transmission control unit 206 causes the communication unit 220 to transmit the eKey issued by the key information issuing unit 204 to the server 30. Also, the transmission control unit 206 causes the communication unit 220 to transmit the invitation e-mail generated by the invitation e-mail generating unit 208 described later, to the relevant user terminal 20.

(1-2-2-5. Invitation E-Mail Generating Unit 208)

The invitation e-mail generating unit 208 generates the invitation e-mail including the eKey ID associated with another user terminal 20b and the link information to the server 30. Note that, when the user terminal 20b receives this invitation e-mail, the user terminal 20b connects to the link information described in the invitation e-mail, and thus can request a person authorized to issue the eKey, such as the owner 2a, to issue the eKey, for example.

(1-2-2-6. Display Control Unit 210)

The display control unit 210 causes the operation display unit 222 to display various types of display screen images. For example, in a case where the user terminal 20 is the user terminal 20 of the owner 2a, the display control unit 210 causes the operation display unit 222, described later, to display an eKey issuance approval screen image for inputting whether or not to approve the issuance of the eKey for the user terminal 20b of another user 2b.

(1-2-2-7. Communication Unit 220)

The communication unit 220 performs transmission and reception of information with another device, by the wireless communication in accordance with Bluetooth, Wi-Fi, NFC, or the like, for example. For example, the communication unit 220 is controlled by the transmission control unit 206, to transmit the information generated by the cipher generating unit 202 to the lock control device 10-1.

(1-2-2-8. Operation Display Unit 222)

The operation display unit 222 is configured with a touch panel display, for example. This operation display unit 222 is controlled by the display control unit 210, to display various types of display screen images. Also, the operation display unit 222 accepts various types of input by the user, such as selection of selection buttons displayed on the display screen image, for example.

(1-2-2-9. Storage Unit 224)

The storage unit 224 stores various types of software and various types of data such as the RSA secret key of the user terminal 20, for example.

[1-2-3. Server 30]

Figure 5:
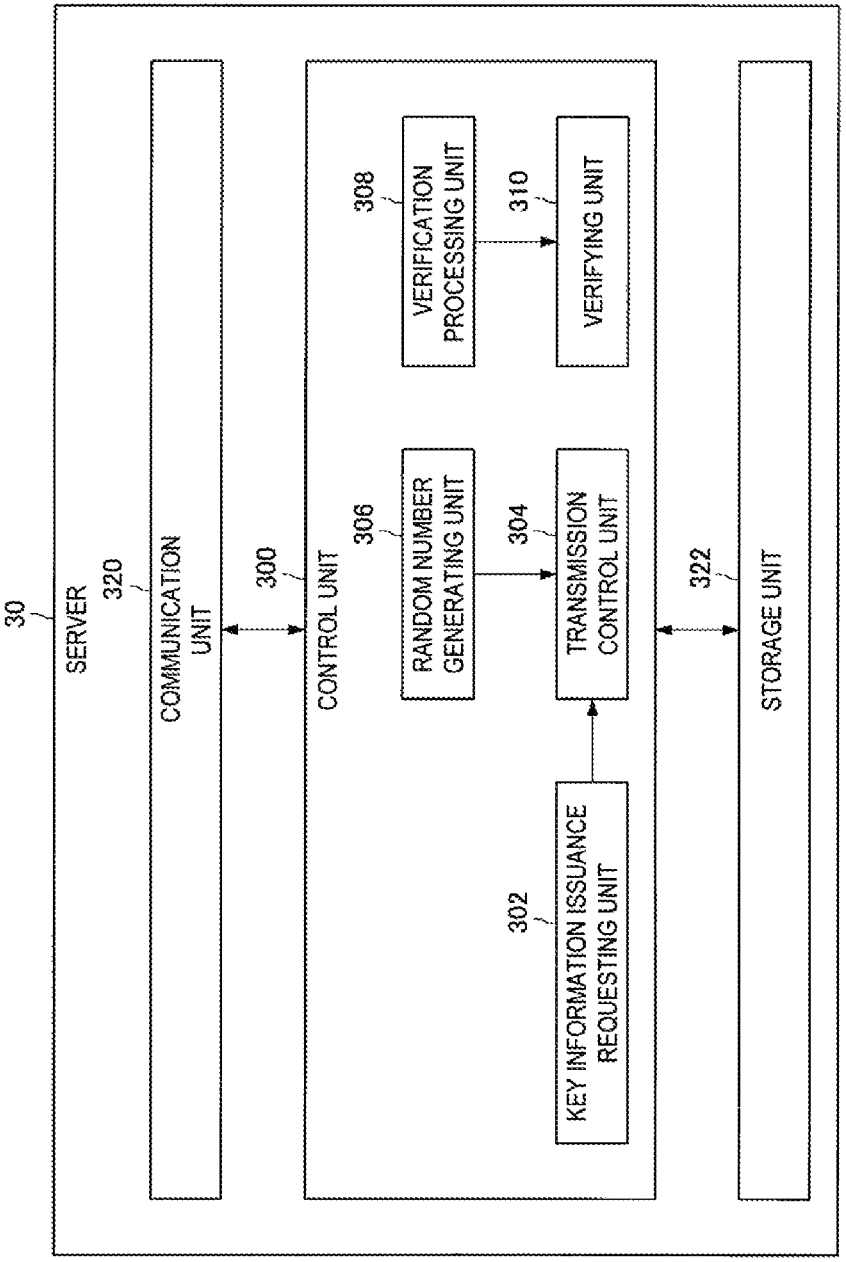
FIG. 5 is a functional block diagram illustrating an exemplary configuration of a server 30 according to the same embodiment.

FIG. 5 is a functional block diagram illustrating the configuration of the server 30 according to the first embodiment. As illustrated in FIG. 5, the server 30 includes a control unit 300, a communication unit 320, and a storage unit 322.

(1-2-3-1. Control Unit 300)

The control unit 300 generally controls the operation of the server 30, using hardware, such as a CPU and a RAM for example, which is built into the server 30. Also, as illustrated in FIG. 5, the control unit 300 includes a key information issuance requesting unit 302, a transmission control unit 304, a random number generating unit 306, a verification processing unit 308, and a verifying unit 310.

(1-2-3-2. Key Information Issuance Requesting Unit 302)

The key information issuance requesting unit 302 generates an eKey issuance request corresponding to the eKey ID, in a case where receiving the eKey ID from the user terminal 20b of the guest 2b.

(1-2-3-3. Transmission Control Unit 304)

The transmission control unit 304 causes the communication unit 320 to transmit various types of information to the user terminal 20. For example, the transmission control unit 304 causes the communication unit 320 to transmit the eKey issuance request generated by the key information issuance requesting unit 302, to the user terminal 20a of the owner 2a.

(1-2-3-4. Random Number Generating Unit 306)

The random number generating unit 306 generates a random number, such as a uniform random number within a predetermined range, for example.

(1-2-3-5. Verification Processing Unit 308)

The verification processing unit 308 verifies, by a predetermined algorithm, the information generated on the basis of the secret key of the user terminal 20, which is received from the user terminal 20. For example, the verification processing unit 104 decodes the information generated on the basis of the secret key of the user terminal 20, which is received from the user terminal 20, on the basis of the public key of the user terminal 20 recorded in the database 32 for example.

(1-2-3-7. Verifying Unit 310)

The verifying unit 310 verifies the rightfulness of the user terminal 20 on the basis of the result of verification, by the verification processing unit 308, of the information received from the user terminal 20. For example, the verifying unit 310 determines that the user terminal 20 is rightful in a case where the verification processing unit 308 verifies that the information received from the user terminal 20 is rightful, and determines that the user terminal 20 is not rightful in a case where the verification processing unit 308 verifies that the same information is not rightful.

(1-2-3-8. Communication Unit 320)

The communication unit 320 performs transmission and reception of information with another device connected to the communication network 22, for example. For example, the communication unit 320 is controlled by the transmission control unit 304, to transmit the eKey issuance request to the relevant user terminal 20a of the owner 2a.

(1-2-3-9. Storage Unit 322)

The storage unit 322 stores various types of data and the software. Note that, as an exemplary variant, the storage unit 322 is also capable of storing the database 32.

<1-3. Operation>

In the above, the configuration according to the first embodiment has been described. Next, the operation according to the first embodiment will be described in the following order with reference to FIGS. 6 to 17.

1. Operation when registering a key into the lock control device 10-1
2. Operation when verifying the key of the owner 2a
3. Operation when registering an account into the server 30
4. Operation when registering the user terminal 20 into the server 30
5. Operation when authenticating the account by the server 30
6. Operation when inviting the guest 2b
7. Operation when requesting issuance of an eKey
8. Operation when issuing the eKey
9. Operation when unlocking
10. Operation of the unlocking process
11. Operation when requesting invalidation of an eKey Group Note that, unless expressly stated otherwise, FIGS. 6 to 17 illustrates an example in which the user terminal 20a is the user terminal 20 of the owner 2a, and, the user terminal 20b is the user terminal 20 of the guest 2b.

[1-3-1. Operation When Registering Key into Lock Control Device 10-1]

Figure 6:
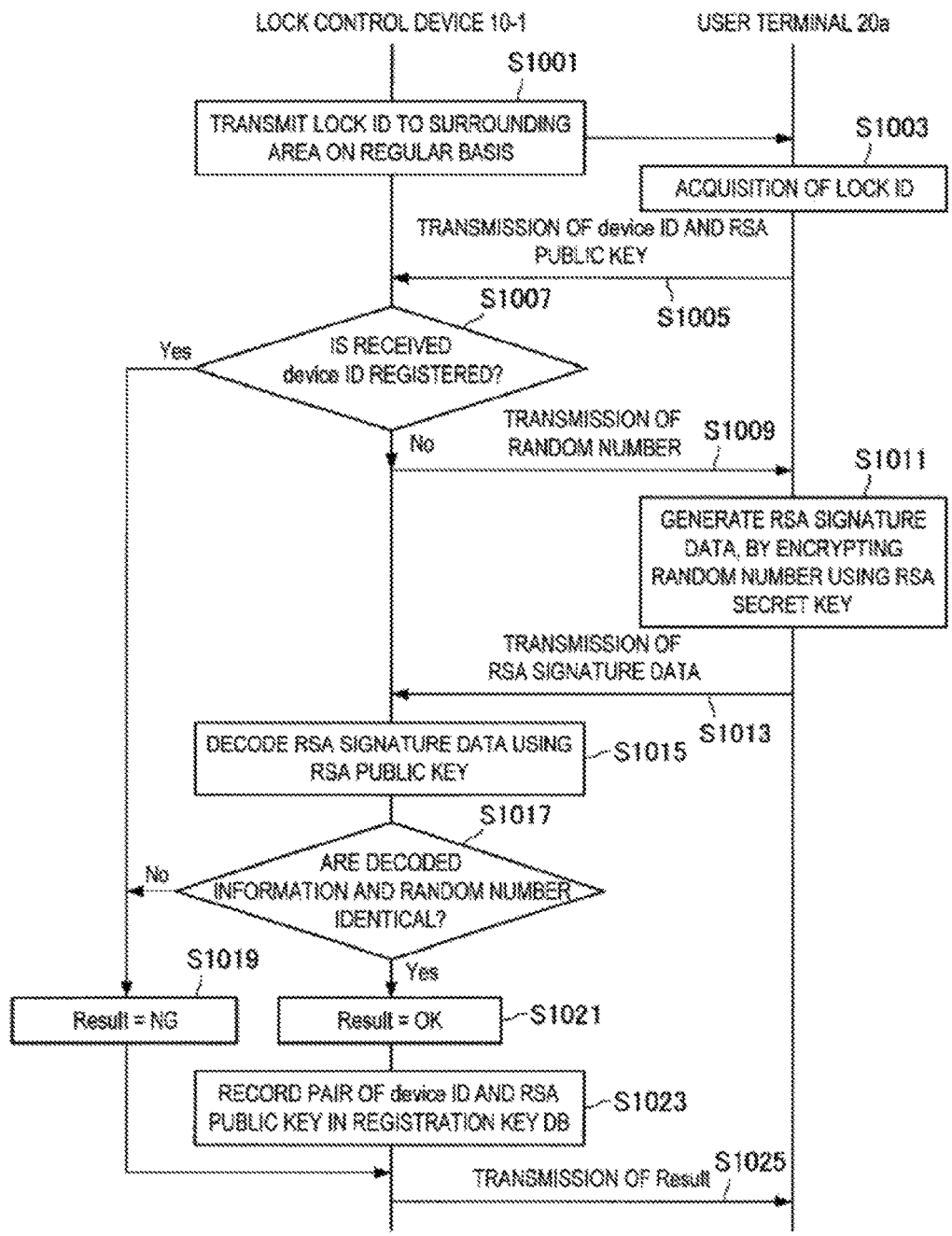
FIG. 6 is a sequence diagram illustrating an operation when registering a key into a lock control device 10-1 according to the same embodiment.

FIG. 6 is a sequence diagram illustrating the operation when registering a key into the lock control device 10-1, according to the first embodiment. Note that this operation is an operation when initially registering information such as the device ID and the public key of the user terminal 20a of the owner 2a, into the lock control device 10-1 managed by the owner 2a. Also, this operation is basically performed only once by the owner 2a who manages the lock control device 10-1, with regard to each lock control device 10-1.

As illustrated in FIG. 6, first, the transmission control unit 112 of the lock control device 10-1 sends the lock ID which is the identification information of the lock control device 10-1, to the surrounding area, on a regular basis (S1001).

Thereafter, when the user terminal 20a approaches the lock control device 10-1, the user terminal 20a receives the lock ID sent from the lock control device 10-1, and then determines whether or not to be the target lock control device 10-1 on the basis of the received lock ID. If it is the target lock control device 10-1, the user terminal 20a establishes a session with the lock control device 10-1 (S1003).

Subsequently, the transmission control unit 206 of the user terminal 20a causes the communication unit 220 to transmit the device ID of the user terminal 20a and the RSA public key of the user terminal 20a to the lock control device 10-1 (S1005).

Thereafter, the control unit 100-1 of the lock control device 10-1 confirms whether or not the device ID received in S1005 has been recorded in the registration key DB 136 (S1007). If the device ID has been recorded in the registration key DB 136 (S1007: Yes), the lock control device 10-1 performs the operation of S1019 described later.

On the other hand, if the device ID is not recorded in the registration key DB 136 (S1007: No), the random number generating unit 110 generates a random number. Then, the transmission control unit 112 causes the communication unit 130 to transmit the generated random number to the user terminal 20a (S1009).

Thereafter, the cipher generating unit 202 of the user terminal 20a generates the RSA signature data by encrypting the random number received in S1009 with the RSA secret key of the user terminal 20a (S1011).

Subsequently, the transmission control unit 206 causes the communication unit 220 to transmit the RSA signature data generated in S1011 to the lock control device 10-1 (S1013).

Thereafter, the verification processing unit 104 of the lock control device 10-1 decodes the RSA signature data received in S1013, using the RSA public key received in S1005 (S1015).

Subsequently, the determination unit 106 compares the information decoded in S1015 and the random number generated in S1009 (S1017). If the both are not identical with each other (S1017: No), the determination unit 106 sets "NG" to Result (=registration result), (S1019). Thereafter, the lock control device 10-1 performs the operation of S1025, which is described later.

On the other hand, if the both are identical with each other (S1017: Yes), the determination unit 106 sets "OK" to the Result (S1021). Then, the determination unit 106 records the device ID received in S1005 and the RSA public key in association with each other, in the registration key DB 136 (S1023).

Thereafter, the transmission control unit 112 causes the communication unit 130 to transmit the Result set in S1019 or S1021 to the user terminal 20*a* (S1025).

[1-3-2. Operation When Verifying Key of Owner 2*a*]

Next, with reference to FIG. 7, the operation when verifying the key of the owner 2*a* according to the first embodiment will be described. Note that this operation is performed by the lock control device 10-1 to verify whether or not the user terminal 20 of the communication target is the user terminal 20*a* of the owner 2*a*. For example, this operation is performed when the user terminal 20 requests a process authorized only to the owner 2*a*, such as a deletion request of the data registered in the lock control device 10-1.

Figure 7:
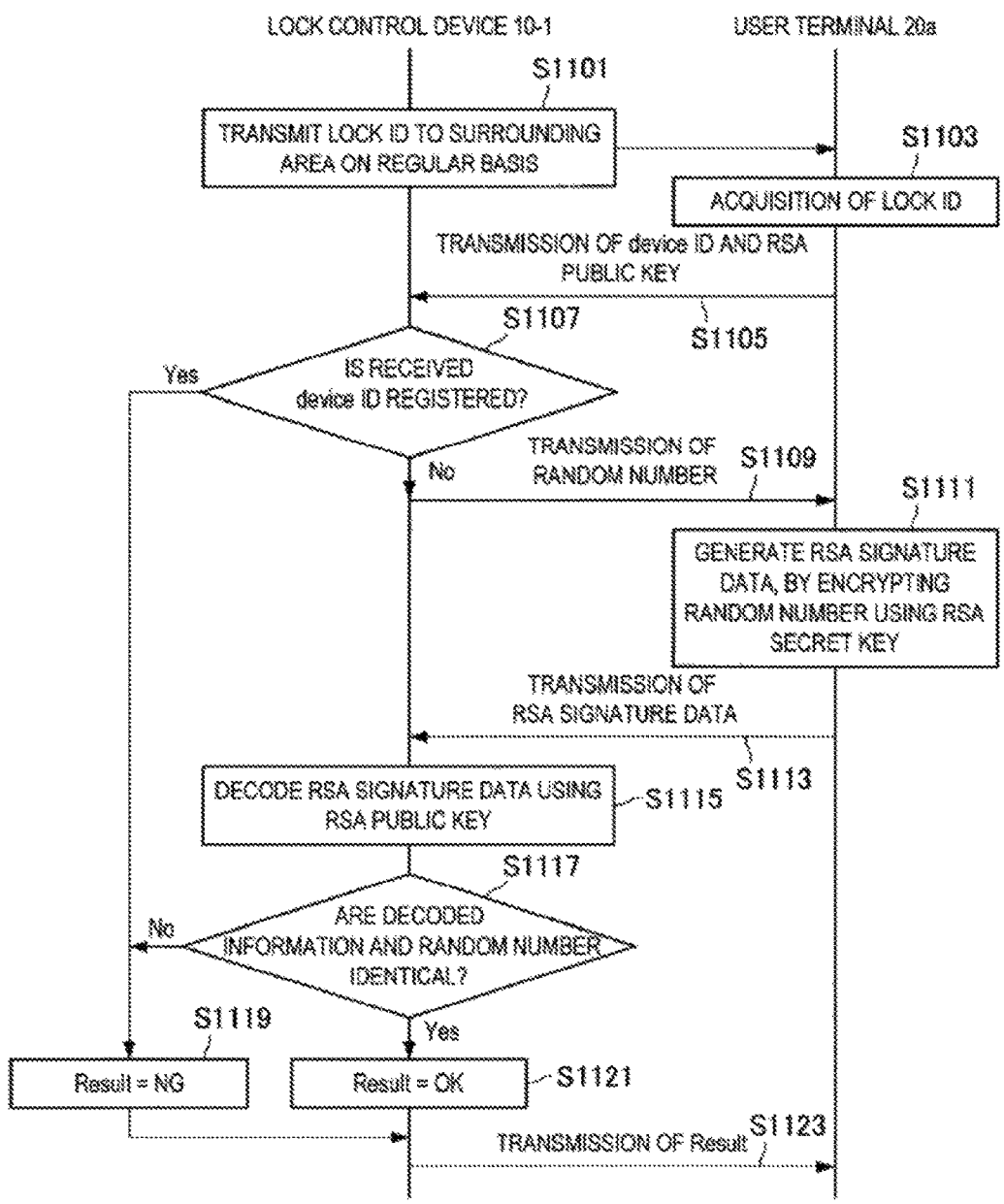
FIG. 7 is a sequence diagram illustrating an operation when verifying a key of an owner 2a according to the same embodiment.

The operation of S1101 to S1105 illustrated in FIG. 7 is substantially similar to the operation of S1001 to S1005 illustrated in FIG. 6. Note that S1103 is different from S1003 in that the user terminal 20*a* establishes a session with the lock control device 10-1 in a case where the lock ID received in S1101 is the lock ID of the lock control device 10-1 that has registered the public key.

After S1105, the control unit 100-1 of the lock control device 10-1 confirms whether or not the device ID received in S1105 has been recorded in the registration key DB 136 (S1107). If the device ID is not recorded in the registration key DB 136 (S1107: No), the lock control device 10-1 performs the operation of S1119 described later.

On the other hand, if the device ID has been recorded in the registration key DB 136 (S1107: Yes), the random number generating unit 110 generates a random number. Then, the transmission control unit 112 causes the communication unit 130 to transmit the generated random number to the user terminal 20*a* (S1109).

Note that the operation of S1111 to S1115 is substantially similar to the operation of S1011 to S1015 illustrated in FIG. 6.

After S1115, the determination unit 106 compares the information decoded in S1115 and the random number generated in S1109 (S1117). If the both are not identical with each other (S1117: No), the determination unit 106 sets "NG" to Result (=verification result), and then does not authenticate the user terminal 20*a* (S1119). Thereafter, the lock control device 10-1 performs the operation of S1123 described later.

On the other hand, if the both are identical with each other (S1117: Yes), the determination unit 106 sets "OK" to the Result, and then authenticates the user terminal 20*a* (S1121).

Thereafter, the transmission control unit 112 causes the communication unit 130 to transmit the Result set in S1119 or S1121 to the user terminal 20*a* (S1123).

[1-3-3. Operation When Registering Account into Server 30]

Next, with reference to FIG. 8, the operation when registering the account into the server 30 according to the first embodiment will be described. Note that, for example, this operation is performed when the user 2 registers the account into the server 30 to utilize the key authentication service. Here, the user 2 may be the owner 2*a*, or may be the guest 2*b* (who has received an invitation e-mail described in section 1-3-6).

Figure 8:
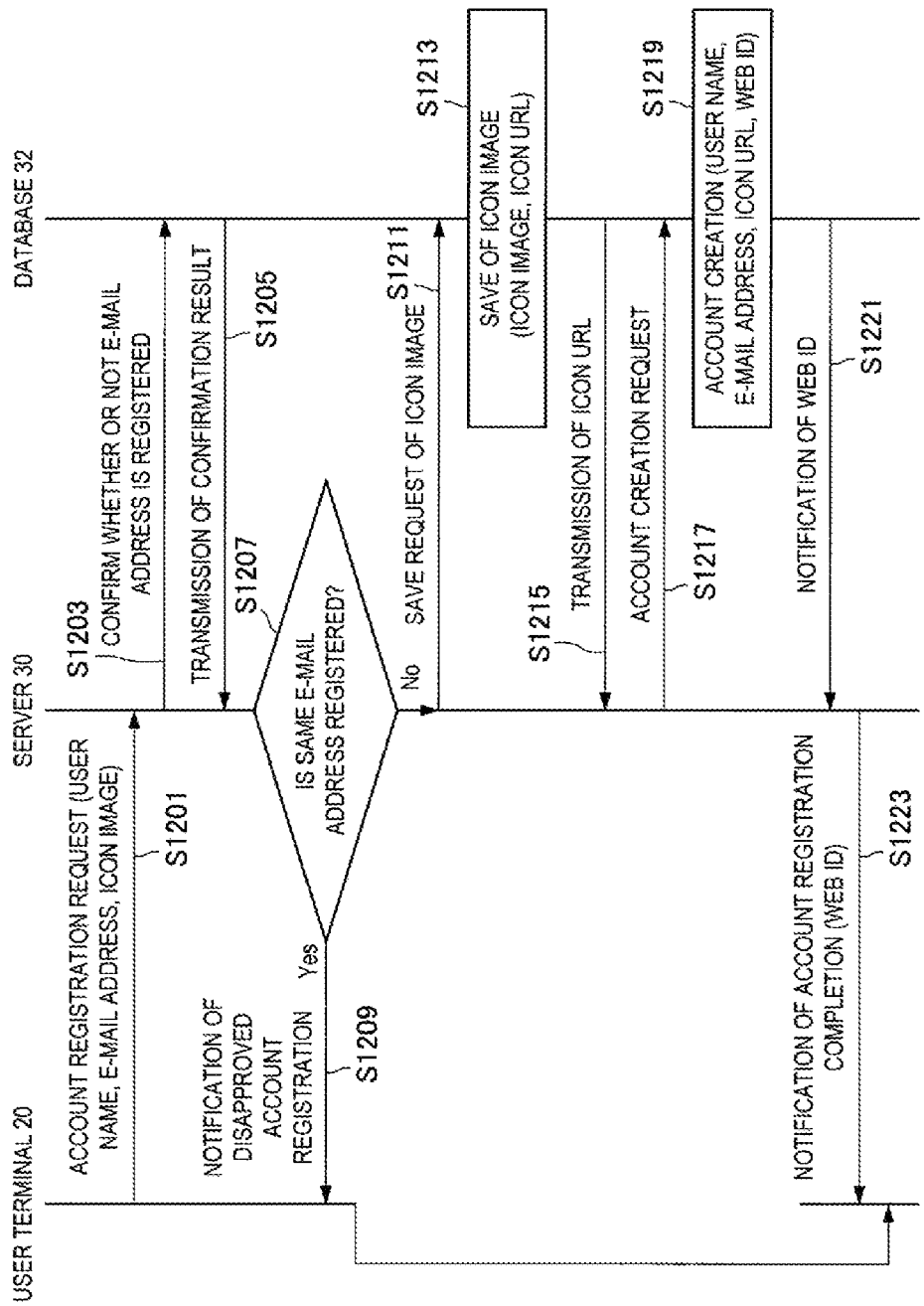
FIG. 8 is a sequence diagram illustrating an operation when registering an account into the server 30 according to the same embodiment.

As illustrated in FIG. 8, first, the user terminal 20 accesses to the server 30. Then, the operation display unit 222 of the user terminal 20 displays an account registration screen image received from the server 30 for example, and then accepts input of a user name and an e-mail address, and selection of an icon image (used in individual identification, for example) from the user 2, in the registration screen image. Thereafter, the transmission control unit 206 causes the communication unit 220 to transmit a registration request of the account, including input content, to the server 30 (S1201).

Thereafter, the transmission control unit 304 of the server 30 causes the communication unit 320 to transmit to the database 32 the request to confirm whether or not the same e-mail address as the e-mail address received in S1201 is registered (S1203).

Thereafter, the database 32 performs confirmation on the basis of the request received in S1203, and then transmits the confirmation result to the server 30 (S1205).

Thereafter, if it is confirmed that the same e-mail address is registered (S1207: Yes), the transmission control unit 304 of the server 30 causes the communication unit 320 to transmit to the user terminal 20 a notification of disapproved registration of the relevant account (S1209). Then, the "operation when registering the account into the server 30" ends.

On the other hand, if it is confirmed that the same e-mail address is not registered (S1207: No), the transmission control unit 304 causes the communication unit 320 to transmit to the database 32 a save request of the icon image received in S1201 (S1211).

Thereafter, the database 32 decides the URL of the save destination of the icon image received in S1211. Then, the database 32 stores the received icon image and the decided URL in association with each other (S1213). Then, the database 32 transmits the URL decided in S1213 to the server 30 (S1215).

Thereafter, the transmission control unit 304 of the server 30 causes the communication unit 320 to transmit to the database 32 a creation request of the account, which includes the user name and the e-mail address received in S1201 and the icon URL received in S1215 (S1217).

Thereafter, the database 32 decides the web ID corresponding to the relevant user 2. Then, the database 32 stores the user name, the e-mail address, the icon URL included in the creation request received in S1217, and the decided web ID, in association with each other (S1219).

Subsequently, the database 32 transmits the web ID decided in S1219 to the server 30 (S1221).

Thereafter, the transmission control unit 304 of the server 30 causes the communication unit 320 to transmit to the user terminal 20 a notification of the registration completion of the account, which includes the web ID received in S1221 (S1223).

[1-3-4. Operation When Registering User Terminal 20 into Server 30]

Next, with reference to FIG. 9, the operation when registering the user terminal 20 into the server 30 according to the first embodiment will be described. Note that this operation is performed when the user 2 registers the information of the user terminal 20 in the server 30 to utilize the key authentication service. Also, for example, this operation is performed immediately after the "operation when registering the account into the server 30" described in section 1-3-3. Although, in the following, an exemplary operation performed when registering the information of the user terminal 20*b* of the guest 2*b* will be described, the operation performed when registering the information of the user terminal 20*a* of the owner 2*a* is substantially similar.

Figure 9:
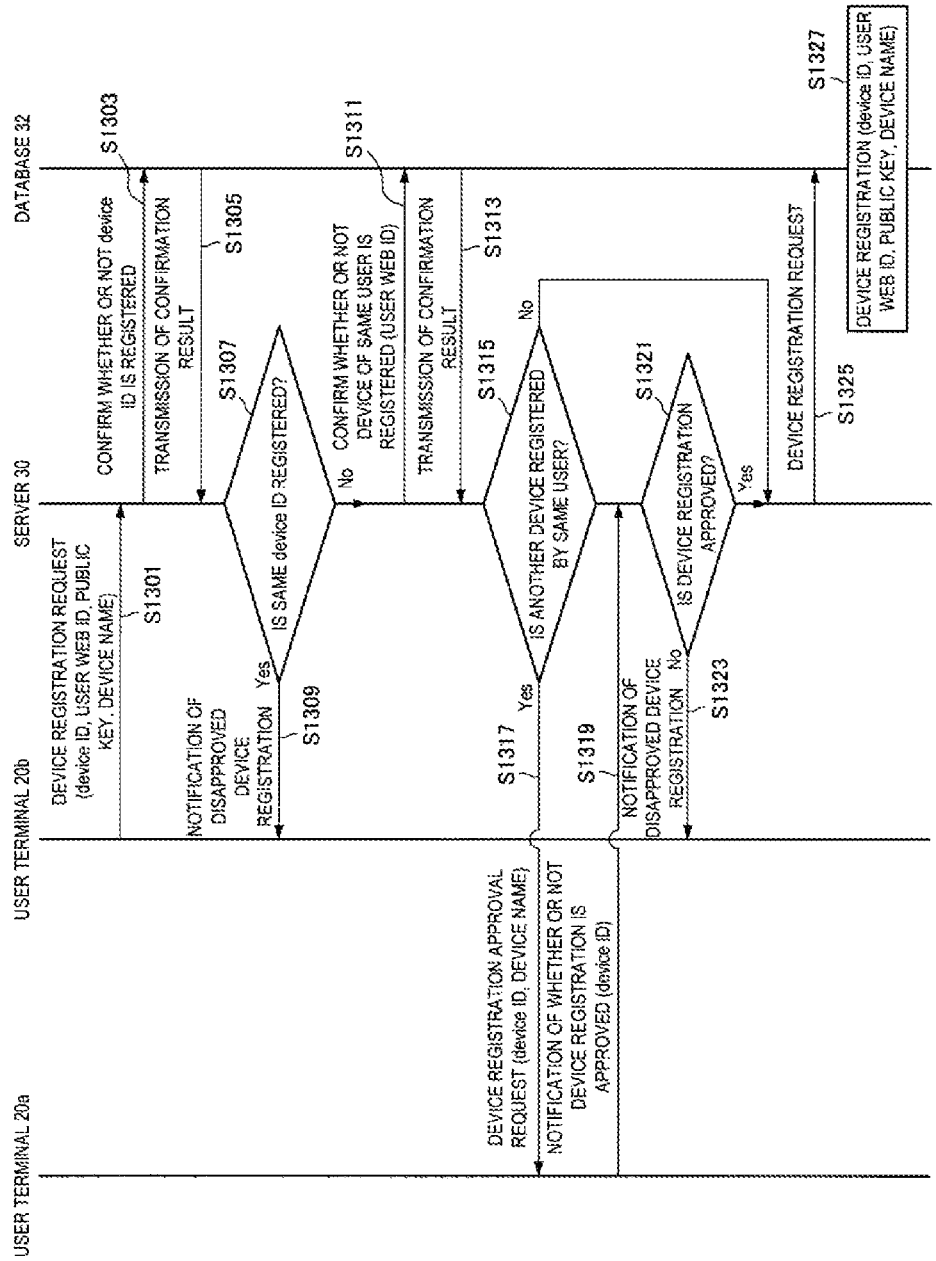
FIG. 9 is a sequence diagram illustrating an operation when registering a user terminal 20 into the server 30 according to the same embodiment.

As illustrated in FIG. 9, first, the user terminal 20*b* accesses to the server 30. Then, the user terminal 20*b* transmits to the server 30 a registration request of the device, which includes the device ID of the user terminal 20*b*, the user web ID (that has been issued from the server 30), the RSA public key of the user terminal 20*b*, and the device name of the user terminal 20*b* (S1301).

Thereafter, the transmission control unit 304 of the server 30 causes the communication unit 320 to transmit to the database 32 a request to confirm whether or not the same device ID as the device ID received in S1301 has been registered (S1303).

Thereafter, the database 32 performs confirmation on the basis of the request received in S1303, and then transmits the confirmation result to the server 30 (S1305).

Thereafter, if it is confirmed that the same device ID is registered (S1307: Yes), the transmission control unit 304 of the server 30 causes the communication unit 320 to transmit to the user terminal 20*b* a notification of disapproved registration of the relevant user terminal 20*b* (S1309).

On the other hand, if it is confirmed that the same device ID is not registered (S1307: No), the transmission control unit 304 of the server 30 causes the communication unit 320 to transmit to the database 32 a request to confirm whether or not device registration has been performed by the same user 2*b* (i.e., the user 2*b* having the same user web ID) (S1311).

Thereafter, the database 32 performs confirmation on the basis of the request received in S1311, and then transmits the confirmation result to the server 30 (S1313).

Thereafter, if it is confirmed that another device is not registered by the same user 2*b* (S1315: No), the server 30 performs the operation of S1325 described later.

On the other hand, if it is confirmed that another device is registered by the same user 2*b* (S1315: Yes), the transmission control unit 304 of the server 30 causes the communication unit 320 to transmit to the user terminal 20*a* of the owner 2*a* a request to approve registration of the new device, which includes the device ID and the device name received in S1301 (S1317).

Thereafter, for example, the display control unit 210 of the user terminal 20*a* causes the operation display unit 222 to display a device registration approval screen image for inputting whether or not to approve in response to the approval request received in S1317. Then, the transmission control unit 206 generates a notification of whether or not to the registration of the device is approved, which includes the device ID received in S1317, on the basis of the input of the owner 2*a* to the operation display unit 222, and then causes the communication unit 220 to transmit the generated notification to the server 30 (S1319).

Thereafter, the control unit 300 of the server 30 confirms the content of the notification received in S1319 (S1321). If the content of the received notification indicates to reject the registration of the device (S1321: No), the transmission control unit 304 causes the communication unit 320 to transmit the notification of the disapproved registration of the relevant user terminal 20*b*, to the user terminal 20*b* (S1323).

On the other hand, if the content of the received notification indicates to approve the registration of the device (S1321: Yes), the transmission control unit 304 causes the communication unit 320 to transmit the device registration request to the database 32, on the basis of the registration request received in S1301 (S1325).

Thereafter, the database 32 stores the device ID, the user web ID, the RSA public key, and the device name, which are included in the device registration request received in S1325, in association with each other (S1327).

[1-3-5. Operation When Authenticating Account by Server 30]

Next, with reference to FIG. 10, the operation when authenticating an account by the server 30 according to the first embodiment will be described. Note that this operation is performed each time the user terminal 20 logs in to the key authentication service, after the end of registration of the account and registration of the user terminal 20 to the above server 30, for example.

Figure 10:
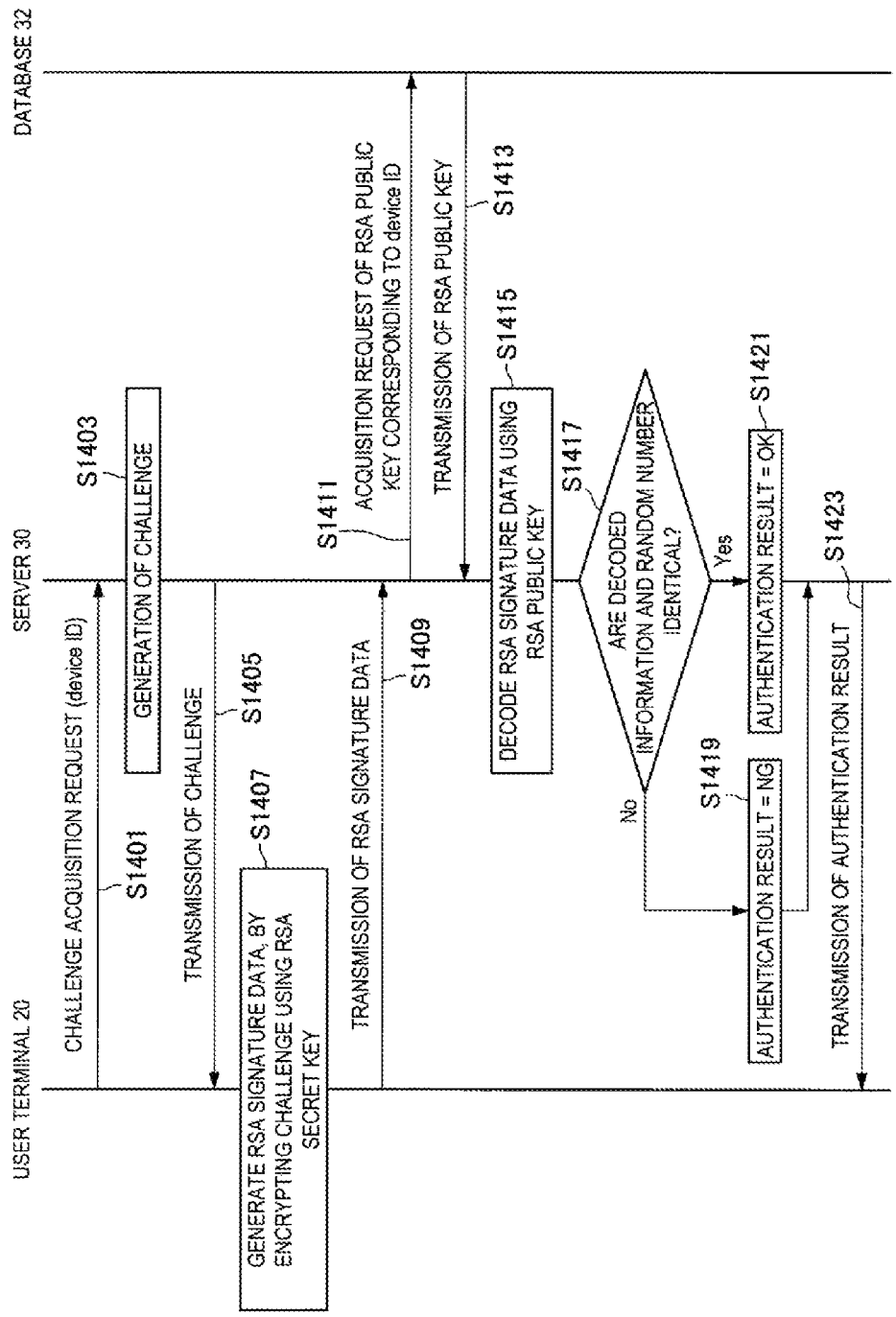
FIG. 10 is a sequence diagram illustrating an operation when authenticating an account by the server 30 according to the same embodiment.

As illustrated in FIG. 10, first, the transmission control unit 206 of the user terminal 20 causes the communication unit 220 to transmit to the server 30 a challenge acquisition request which includes the device ID of the user terminal 20 (S1401).

Thereafter, the random number generating unit 306 of the server 30 generates a challenge which is a uniform random number, for example (S1403). Then, the transmission control unit 304 causes the communication unit 320 to transmit the challenge generated in S1403 to the user terminal 20 (S1405).

Thereafter, the cipher generating unit 202 of the user terminal 20 generates RSA signature data by encrypting the challenge received in S1405 with the RSA secret key of the user terminal 20, (S1407).

Subsequently, the transmission control unit 206 causes the communication unit 220 to transmit the RSA signature data generated in S1407 to the server 30 (S1409).

Thereafter, the transmission control unit 304 of the server 30 causes the communication unit 320 to transmit to the database 32 a request to acquire the RSA public key corresponding to the device ID received in S1401 (S1411).

Thereafter, the database 32 extracts the RSA public key corresponding to the device ID included in the acquisition request received in S1411, and then transmits the extracted RSA public key to the server 30 (S1413).

Thereafter, the verification processing unit 308 of the server 30 decodes the RSA signature data received in S1409, using the RSA public key received in S1413 (S1415).

Subsequently, the verifying unit 310 compares the information decoded in S1415 and the challenge generated in S1403 (S1417). If the both are not identical with each other (S1417: No), the verifying unit 310 sets "NG" to Result (=authentication result), and then does not authenticate the user terminal 20 (S1419). Thereafter, the server 30 performs the operation of S1423 described later.

On the other hand, if the both are identical with each other (S1417: Yes), the verifying unit 310 sets "OK" to the Result, and then authenticates the user terminal 20 (S1421).

Thereafter, the transmission control unit 304 causes the communication unit 320 to transmit the Result set in S1419 or S1421 to the user terminal 20 (S1423).

[1-3-6. Operation When Inviting Guest 2*b*]

Next, with reference to FIG. 11, the operation when inviting the guest 2*b* according to the first embodiment will be described. Note that, for example, this operation is performed to give the unlocking right to the guest 2b whom the owner 2a approves to give the unlocking right of the lock control device 10-1.

Figure 11:
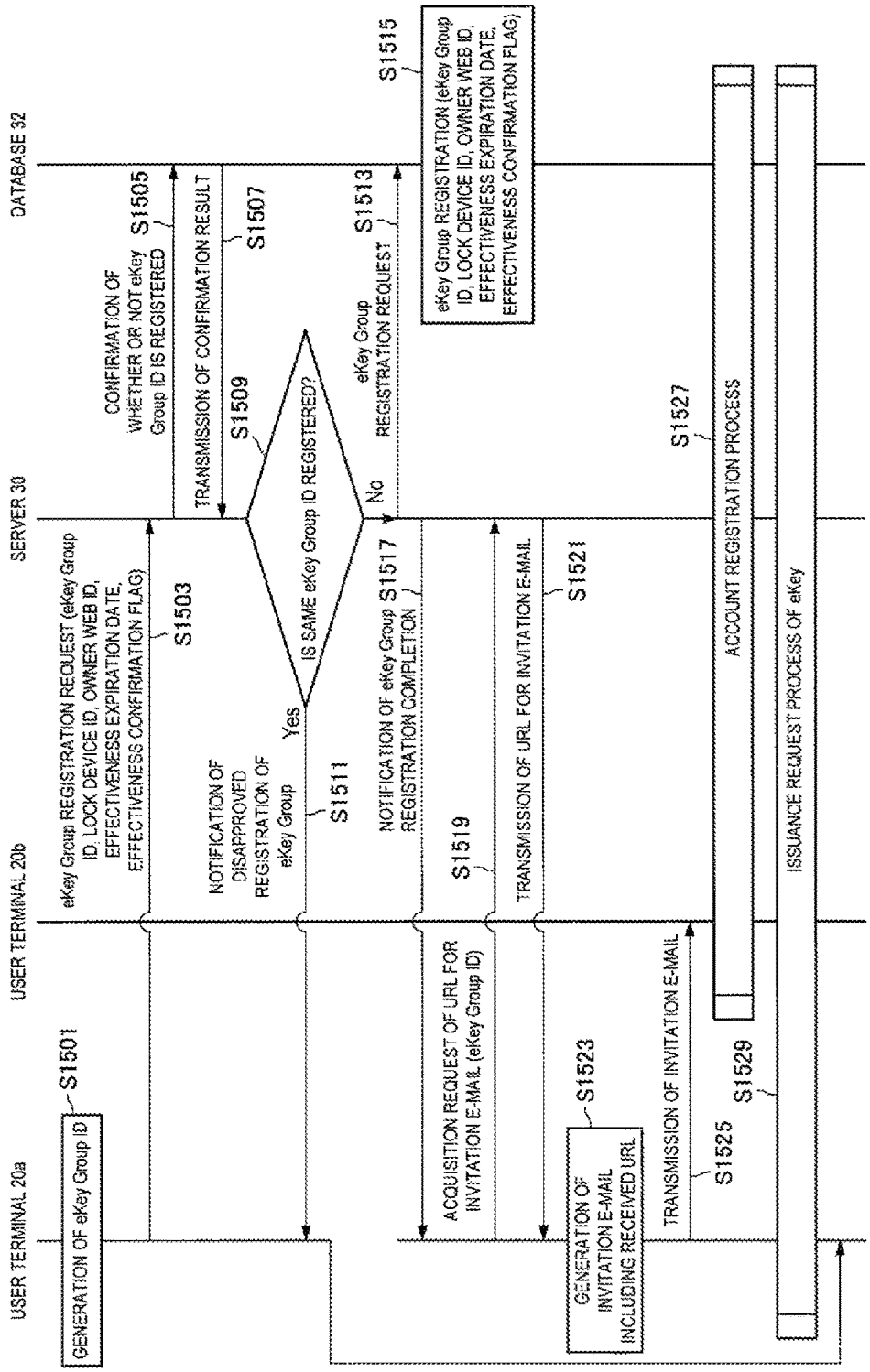
FIG. 11 is a sequence diagram illustrating an operation when inviting a guest 2b according to the same embodiment.

As illustrated in FIG. 11, first, the key information issuing unit 204 of the user terminal 20a generates an eKey Group ID associated with a specific lock control device 10-1, on the basis of the input of the owner 2a into the operation display unit 222, for example (S1501). Note that, here, the effectiveness expiration date of the eKey Group corresponding to the relevant eKey Group ID, and the value of the effectiveness confirmation flag are also set. Although the detail will be described later, the effectiveness confirmation flag is a flag for setting whether or not the lock control device 10-1 is to inquire of the server 30 as to the effectiveness of the eKey received from the user terminal 20 at the time of the unlocking request by the lock control device 10-1.

Subsequently, the transmission control unit 206 causes the communication unit 220 to transmit to the server 30 a registration request of the eKey Group, which includes the eKey Group ID generated in S1501, the lock control device ID corresponding to the eKey Group ID, the web ID of the owner 2a, the effectiveness expiration date set in S1501, and the effectiveness confirmation flag, (S1503).

Thereafter, the transmission control unit 304 of the server 30 causes the communication unit 320 to transmit to the database 32 a request to confirm whether or not the same eKey Group ID as the eKey Group ID included in the registration request received in S1503 has been registered (S1505).

Thereafter, the database 32 performs confirmation on the basis of the request received in S1505, and then transmits the confirmation result to the server 30 (S1507).

Thereafter, if it is confirmed that the same eKey Group ID is registered (S1509: Yes), the transmission control unit 304 of the server 30 causes the communication unit 320 to transmit to the user terminal 20a a notification of disapproved registration of the eKey Group (S1511). Then, the "operation when inviting the guest 2b" ends.

On the other hand, if it is confirmed that the same eKey Group ID is not registered (S1509: No), the transmission control unit 304 of the server 30 causes the communication unit 320 to transmit to the database 32 the registration request of the eKey Group, on the basis of the registration request received in S1503 (S1513).

Thereafter, the database 32 stores the eKey Group ID, the lock control device ID, the web ID of the owner 2a, the effectiveness expiration date, and the effectiveness confirmation flag, which are included in the registration request received in S1513, in association with each other (S1515).

Thereafter, the transmission control unit 304 of the server 30 causes the communication unit 320 to transmit to the user terminal 20a a notification of the registration completion of the eKey Group (S1517).

Thereafter, the transmission control unit 206 of the user terminal 20a causes the communication unit 220 to transmit to the server 30 a request to acquire the URL for the invitation e-mail (for inviting the guest 2b to the eKey Group), which includes the relevant eKey Group ID (S1519).

Thereafter, the control unit 300 of the server 30 decides the URL for the invitation e-mail, on the basis of the acquisition request received in S1519. Note that this URL is the link information to a predetermined link destination in the server 30, for example.

Then, the transmission control unit 304 causes the communication unit 320 to transmit the decided URL to the user terminal 20a (S1521).

Thereafter, the invitation e-mail generating unit 208 of the user terminal 20a generates the invitation e-mail including the URL received in S1521 (S1523). Then, the transmission control unit 206 causes the communication unit 220 to transmit the invitation e-mail generated in S1523 to the server 30 (S1525).

Thereafter, the process substantially similar to the "operation when registering the account into the server 30" described in section 1-3-3 is executed between the user terminal 20b, the server 30, and the database 32 (S1527).

Thereafter, the "operation when requesting the issuance of the eKey", which is described later, is performed between the user terminal 20a, the user terminal 20b, the server 30, and the database 32 (S1529).

[1-3-7. Operation When Requesting Issuance of eKey]

Next, with reference to FIG. 12, the "operation when requesting the issuance of the eKey" in S1529 will be described in detail. Note that, for example, this operation is performed when the guest 2b who has received the invitation e-mail from the owner 2a requests the issuance of the eKey to the owner 2a via the server 30.

Figure 12:
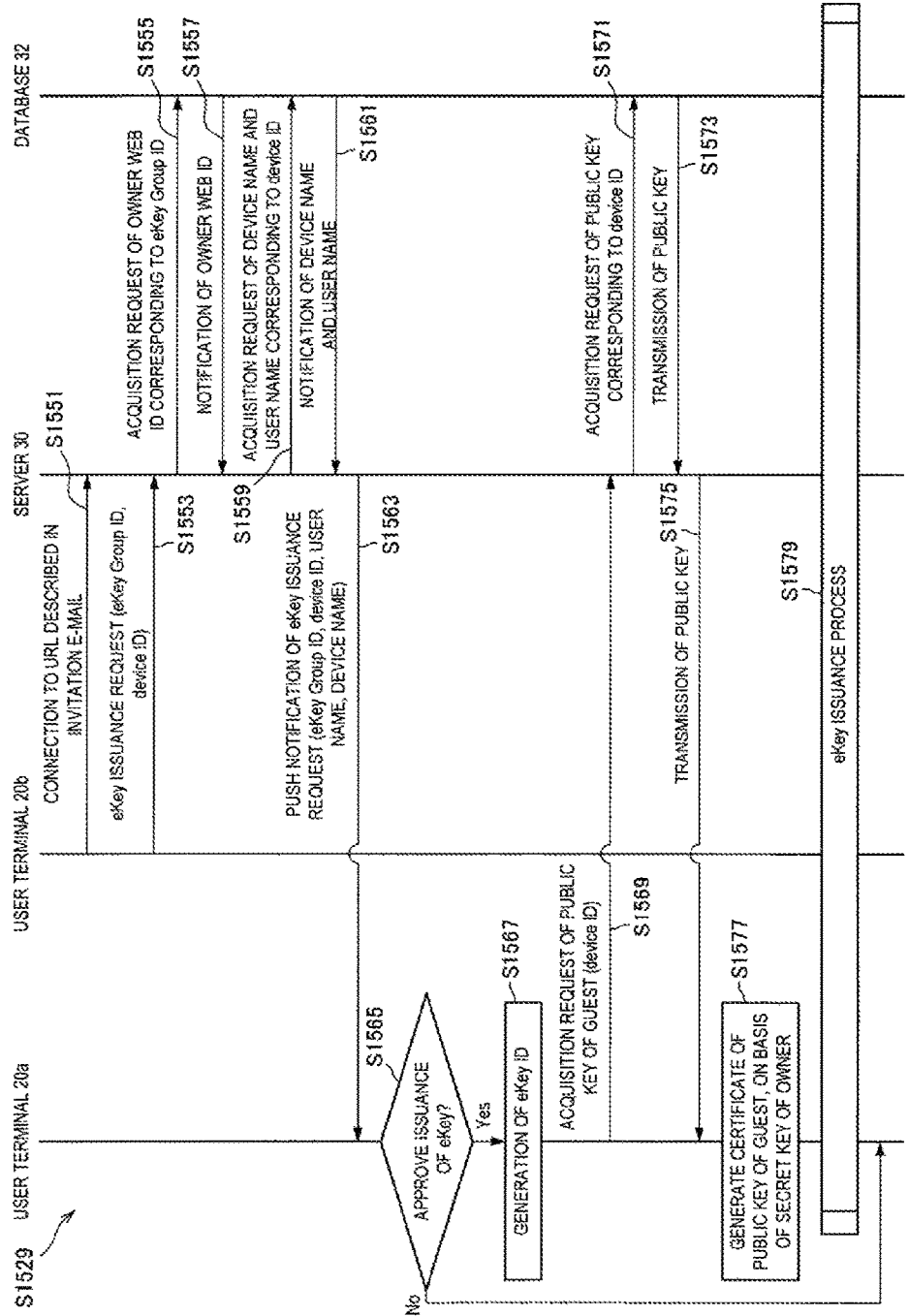
FIG. 12 is a sequence diagram illustrating an operation when requesting an issuance of the eKey according to the same embodiment.

As illustrated in FIG. 12, first, the user terminal 20b accesses to the URL described in the invitation e-mail received in S1525 illustrated in FIG. 11 (S1551). Thereby, the user terminal 20b can access to a predetermined link destination in the server 30.

Subsequently, the transmission control unit 206 of the user terminal 20b causes the communication unit 220 to transmit to the server 30 an eKey issuance request, which includes the eKey Group ID described in the invitation e-mail received in S1525 and the device ID of the user terminal 20b (S1553).

Thereafter, the transmission control unit 304 of the server 30 causes the communication unit 320 to transmit to the database 32 a request to acquire the web ID of the owner 2a on the basis of the eKey issuance request received in S1553 (S1555).

Thereafter, the database 32 extracts the web ID of the owner 2a corresponding to the eKey Group ID included in the received acquisition request, and then transmits the extracted web ID to the server 30 (S1557).

Thereafter, the transmission control unit 304 of the server 30 causes the communication unit 320 to transmit to the database 32 a request to acquire the device name and the user name, on the basis of the eKey issuance request received in S1553 (S1559).

Thereafter, the database 32 extracts the device name and the user name corresponding to the device ID included in the acquisition request received in S1559, and then transmits the extracted device name and user name to the server 30 (S1561).

Thereafter, the transmission control unit 304 of the server 30 push-notifies the user terminal 20a corresponding to the web ID received in S1557, of the eKey issuance request which includes the eKey Group ID and the device ID included in the eKey issuance request received in S1553, and the device name and the user name received in S1561 (S1563).

Thereafter, the display control unit 210 of the user terminal 20a causes the operation display unit 222 to display the eKey issuance approval screen image for example, on the basis of the issuance request notified in S1563. Then, if the owner 2a inputs disapproval into the operation display unit 222 (S1565: No), the user terminal 20a ends the process. Then, the "operation when requesting the issuance of the eKey" ends.

On the other hand, if the owner 2a inputs approval (S1565: Yes), the key information issuing unit 204 of the user terminal 20a generates an eKey ID which is a universally unique identifier (UU ID), for example (S1567).

Thereafter, the transmission control unit 206 of the user terminal 20a causes the communication unit 220 to transmit to the server 30 a request to acquire the RSA public key corresponding to the device ID notified in S1563 (S1569).

Thereafter, the transmission control unit 304 of the server 30 causes the communication unit 320 to transmit to the database 32 a request to acquire the RSA public key, on the basis of the acquisition request received in S1569 (S1571).

Thereafter, the database 32 extracts the RSA public key corresponding to the device ID included in the received acquisition request, and then transmits the extracted RSA public key to the server 30 (S1573).

Thereafter, the transmission control unit 304 of the server 30 causes the communication unit 320 to transmit the RSA public key received in S1573 to the user terminal 20a (S1575).

Thereafter, the cipher generating unit 202 of the user terminal 20a generates a certificate of the received RSA public key, by creating a digital signature using the RSA secret key of the user terminal 20a with respect to the RSA public key received in S1575 (i.e., the RSA public key of the guest 2b), (S1577).

Thereafter, the "operation when issuing an eKey" described later is performed between the user terminal 20a, the user terminal 20b, the server 30, and the database 32, (S1579).

[1-3-8. Operation When Issuing eKey]

Figure 13:
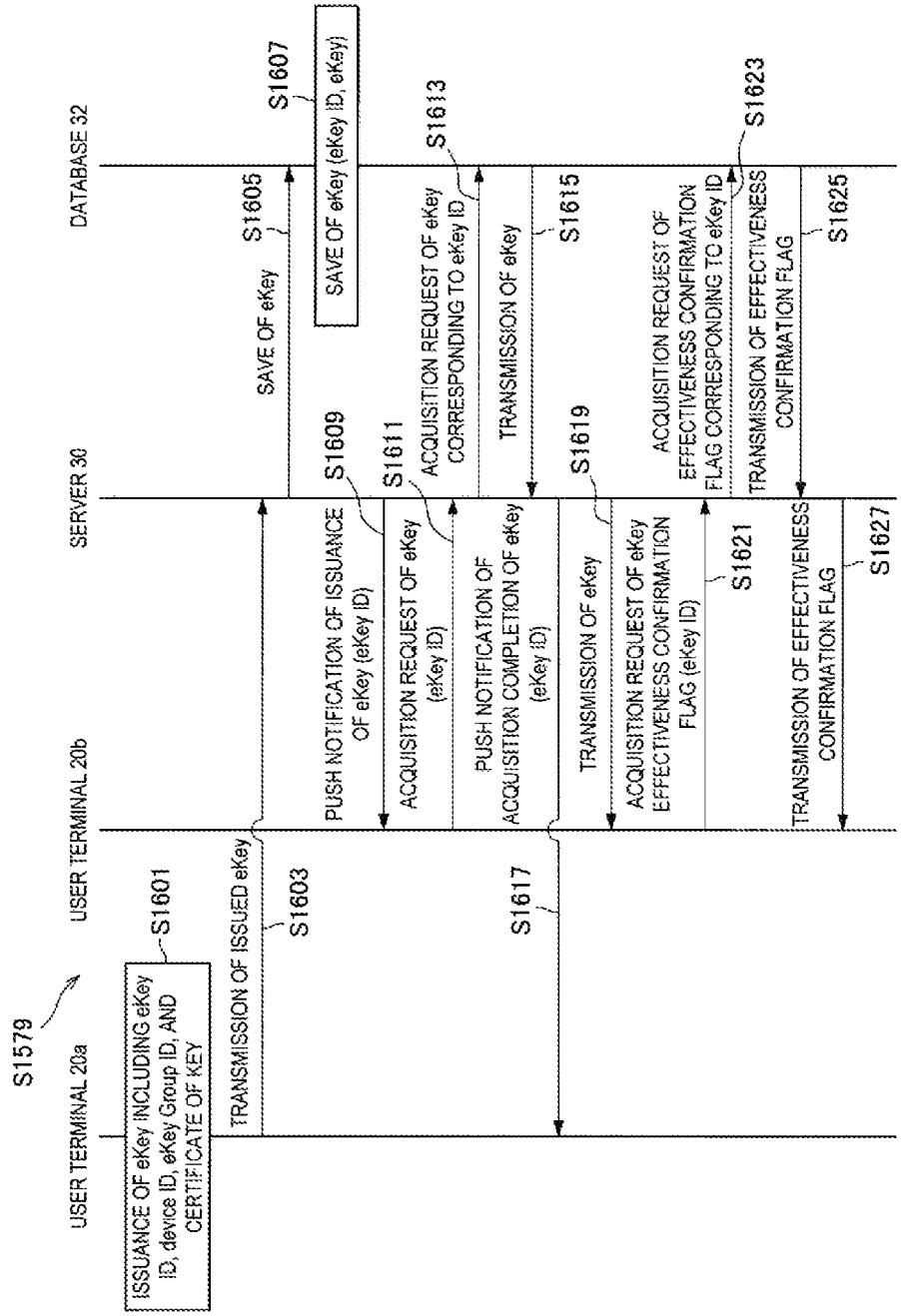
FIG. 13 is a sequence diagram illustrating an operation when issuing the eKey according to the same embodiment.

Next, with reference to FIG. 13, the "operation when issuing an eKey" in

S1579 will be described in detail. Note that, for example, this operation is performed when the user terminal 20a of the owner 2a issues the eKey of the user terminal 20b of the guest 2b, and then delivers the eKey to the user terminal 20b via the server 30.

As illustrated in FIG. 13, first, the key information issuing unit 204 of the user terminal 20a issues an eKey including the eKey ID generated in S1567 illustrated in FIG. 12, the device ID of the user terminal 20a, and the certificate of the RSA public key generated in S1577, for example (S1601). Then, the transmission control unit 206 causes the communication unit 220 to transmit the eKey and the eKey ID issued in S1601 to the server 30 (S1603).

Thereafter, the transmission control unit 304 of the server 30 causes the communication unit 320 to transmit the eKey ID and the eKey received in S1603 to the database 32 (S1605).

Thereafter, the database 32 stores the eKey ID and the eKey received in S1605 in association with each other (S1607).

Thereafter, the transmission control unit 304 of the server 30 push-notifies to the user terminal 20b the issuance of the eKey notification including the eKey ID received in S1603 (S1609).

Thereafter, the transmission control unit 206 of the user terminal 20b causes the communication unit 220 to transmit to the server 30 a request to acquire the eKey corresponding to the eKey ID notified in S1609, on the basis of the input of the guest 2b into the operation display unit 222, for example (S1611).

Thereafter, the transmission control unit 304 of the server 30 causes the communication unit 320 to transmit to the database 32 a request to acquire the eKey, on the basis of the acquisition request received in S1611 (S1613).

Thereafter, the database 32 extracts the eKey corresponding to the eKey ID included in the acquisition request received in S1613, and then transmits the extracted eKey to the server 30 (S1615).

Thereafter, the transmission control unit 304 of the server 30 push-notifies to the user terminal 20a (of the owner 2a) a notification of the acquisition completion of the eKey including the eKey ID received in S1603 (S1617).

Subsequently, the transmission control unit 304 causes the communication unit 320 to transmit the eKey received in S1615 to the user terminal 20b (S1619).

Thereafter, the transmission control unit 206 of the user terminal 20b causes the communication unit 220 to transmit to the server 30 a request to acquire the effectiveness confirmation flag of the eKey including the relevant eKey ID, on the basis of the input of the user into the operation display unit 222, for example (S1621).

Thereafter, the transmission control unit 304 of the server 30 causes the communication unit 320 to transmit to the database 32 a request to acquire the effectiveness confirmation flag, on the basis of the acquisition request received in S1621 (S1623).

Thereafter, the database 32 extracts the effectiveness confirmation flag corresponding to the eKey ID included in the acquisition request received in S1623, and then transmits the extracted effectiveness confirmation flag to the server 30 (S1625).

Thereafter, the transmission control unit 304 of the server 30 causes the communication unit 320 to transmit the effectiveness confirmation flag received in S1625 to the user terminal 20b (S1627).

[1-3-9. Operation When Unlocking]

Next, with reference to FIG. 14, the operation when unlocking according to the first embodiment will be described. Note that, for example, this operation is performed when the user terminal 20 that possess the eKey corresponding to the relevant lock control device 10-1 approaches the lock control device 10-1, and then requests the lock control device 10-1 to unlock. Although, in the following, an exemplary operation performed when the user terminal 20b of the guest 2b requests unlocking will be described, the operation performed when the user terminal 20a of the owner 2a requests unlocking is substantially similar.

Figure 14:
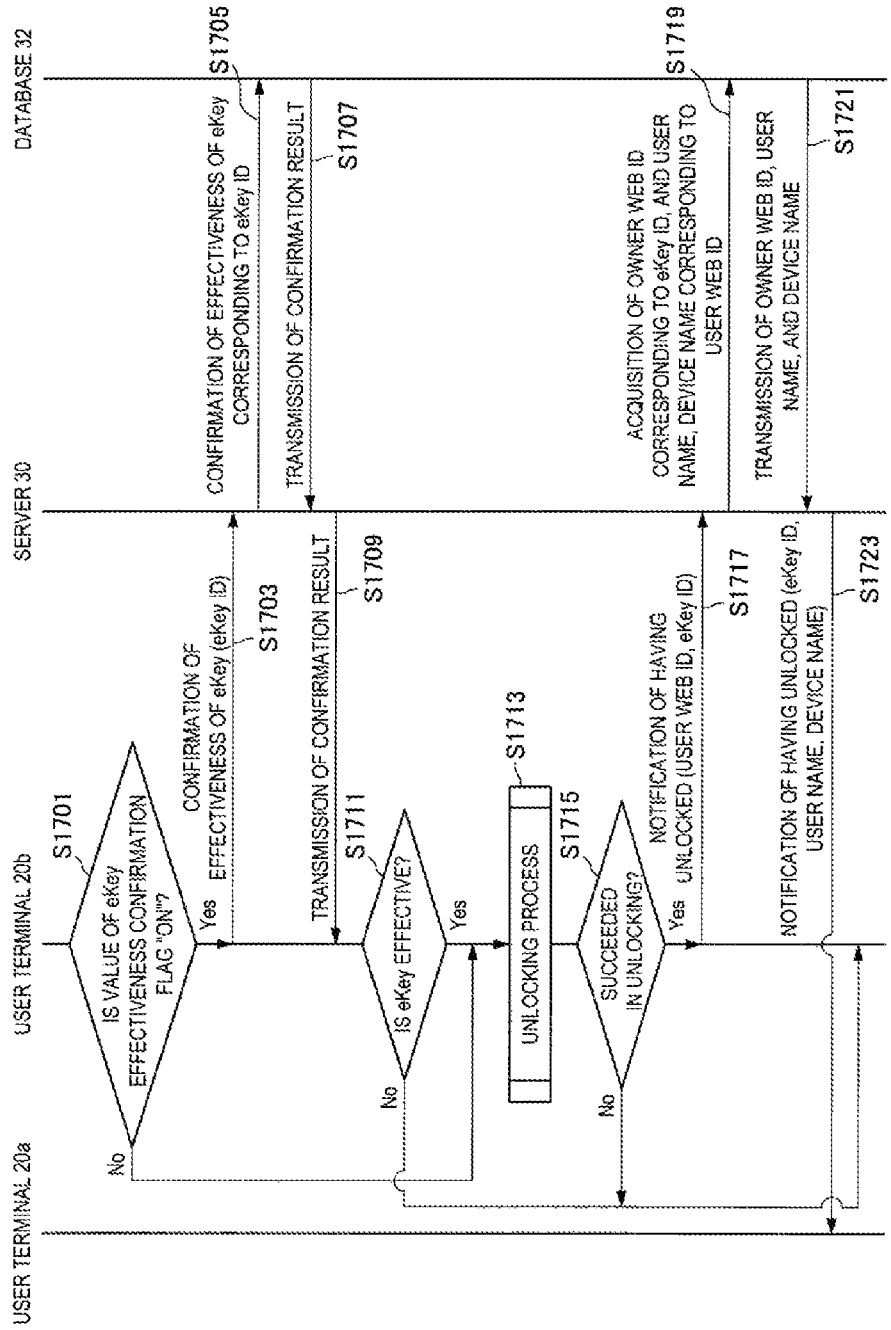
FIG. 14 is a sequence diagram illustrating a part of an operation when unlocking according to the same embodiment.

As illustrated in FIG. 14, first, the user terminal 20b confirms whether or not the value of the effectiveness confirmation flag received in S1627 illustrated in FIG. 13 is "ON" (S1701). If the value of the effectiveness confirmation flag is not "ON" (S1701: No), the user terminal 20b performs the operation of S1713 described later.

On the other hand, if the value of the effectiveness confirmation flag is "ON" (S1701: Yes), the transmission control unit 206 of the user terminal 20b causes the communication unit 220 to transmit to the server 30 a request to confirm the effectiveness of the eKey, which includes the relevant eKey ID (S1703).

Thereafter, the transmission control unit 304 of the server 30 causes the communication unit 220 to transmit to the database 32 a request to confirm the effectiveness of the eKey, on the basis of the confirmation request received in S1703 (S1705).

Thereafter, the database 32 extracts the information relevant to the effectiveness of the eKey corresponding to the eKey ID included in the confirmation request received in S1705, and then transmits the extracted information to the server 30 (S1707).

Thereafter, the transmission control unit 304 of the server 30 causes the communication unit 320 to transmit to the user terminal 20b the confirmation result of the effectiveness based on the information received in S1707 (S1709).

Thereafter, if the confirmation result received in S1709 indicates non-effectiveness of the eKey (S1711: No), the user terminal 20b ends the process. Then, the "operation when unlocking" ends.

On the other hand, if the confirmation result received in S1709 indicates effectiveness of the eKey (S1711: Yes), the user terminal 20b performs the "unlocking process" described later (S1713).

Then, if fails in unlocking in S1713 (S1715: No), the user terminal 20b ends the process. Then, the "operation when unlocking" ends.

On the other hand, if succeeds in the unlocking (S1715: Yes), the transmission control unit 206 of the user terminal 20b causes the communication unit 220 to transmit to the server 30 a notification of carrying out unlocking, which includes the user web ID and the eKey ID of the user terminal 20b (S1717).

Thereafter, the transmission control unit 304 of the server 30 causes the communication unit 320 to transmit to the database 32 a request to acquire the web ID of the owner 2a and the user name and the device name of the guest 2b, on the basis of the notification of carrying out unlocking received in S1717 (S1719).

Thereafter, the database 32 extracts the web ID of the owner 2a corresponding to the eKey ID included in the acquisition request received in S1719 and the user name and the device name corresponding to the user web ID included in the acquisition request, and then transmits the extracted information to the server 30 (S1721).

Thereafter, the transmission control unit 304 of the server 30 causes the communication unit 220 to transmit to the user terminal 20 corresponding to the web ID received in S1721 (i.e., the user terminal 20a of the owner 2a) a notification of carrying out unlocking, which includes the eKey ID received in S1717 and the user name and the device name received in S1721 (S1723).

[1-3-10. Operation of Unlocking Process]

Figure 15:
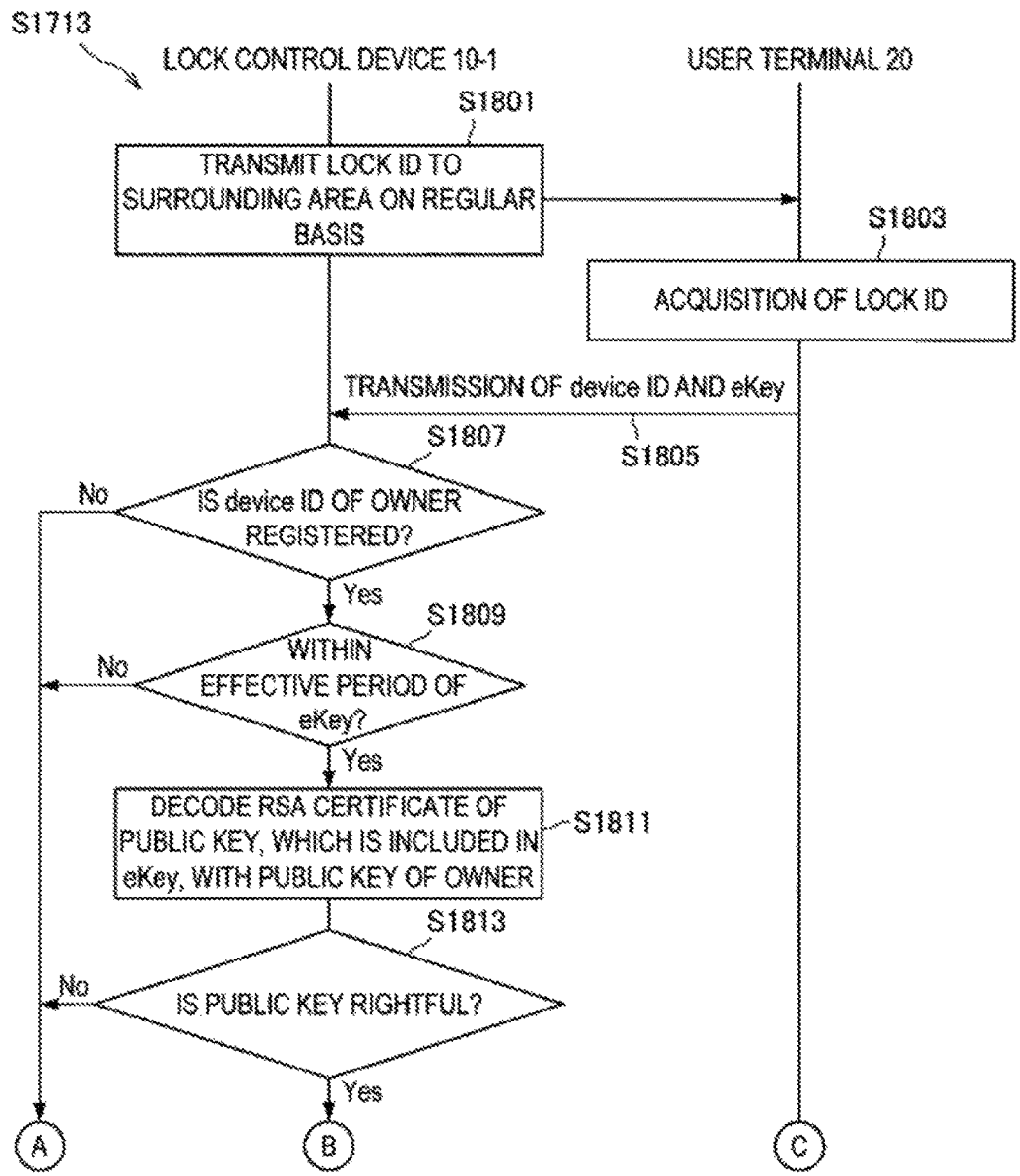
FIG. 15 is a sequence diagram illustrating a part of an operation of an unlocking process according to the same embodiment.

Next, with reference to FIGS. 15 and 16, the "operation of the unlocking process" in S1713 will be described in detail. Note that the operation of S1801 to S1803 illustrated in FIG. 15 is similar to the operation of S1101 to S1103 illustrated in FIG. 7.

After S1803, the transmission control unit 206 of the user terminal 20 causes the communication unit 220 to transmit to the lock control device 10-1 the device ID of the user terminal 20 and the eKey (received in S1619 illustrated in FIG. 13 for example) (S1805).

Thereafter, the control unit 100-1 of the lock control device 10-1 confirms whether or not the device ID received in S1805 has been recorded in the registration key DB 136 (S1807). If the device ID is not recorded in the registration key DB 136 (S1807: No), the lock control device 10-1 performs the operation of S1831 described later.

On the other hand, if the device ID is recorded in the registration key DB 136 (S1807: Yes), the key information verifying unit 102 confirms the value of the effective period included in the eKey received in S1805, and then determines whether or not the present moment is within the effective period of the eKey (S1809). If not within the effective period of the eKey (S1809: No), the lock control device 10-1 performs the operation of S1831 described later.

On the other hand, if within the effective period of the eKey (S1809: Yes), the verification processing unit 104 decodes the RSA certificate of the public key of the user 2b which is included in the relevant eKey, using the RSA public key of the user terminal 20a of the owner 2a which is recorded in the registration key DB 136 (S1811).

Then, the key information verifying unit 102 determines whether or not the RSA public key of the user 2b is rightful, on the basis of the certificate decoded in S1811 (S1813). If it is determined that the RSA public key of the user 2b is not rightful (S1813: No), the lock control device 10-1 performs the operation of S1831 described later.

On the other hand, if it is determined that the RSA public key of the user 2b is rightful (S1813: Yes), the random number generating unit 110 generates a random number. Then, the transmission control unit 112 causes the communication unit 130 to transmit the generated random number to the user terminal 20 (S1821).

Next, with reference to FIG. 16, the operation after S1821 will be described. Note that the operation of S1823 to S1827 is similar to S1011 to S1015 illustrated in FIG. 6.

After S1827, the determination unit 106 of the lock control device 10-1 compares the information decoded in S1827 and the random number generated in S1821 (S1829). If the both are not identical with each other (S1829: No), the determination unit 106 decides not to unlock (S1831). Thereafter, the lock control device 10-1 performs the operation of S1835 described later.

On the other hand, if the both are identical with each other (S1829: Yes), the determination unit 106 decides to unlock. Then, the locking control unit 108 causes the locking unit 132 to unlock (S1833).

Thereafter, the transmission control unit 112 causes the communication unit 130 to transmit to the user terminal 20 the execution result of S1831 or S1833 (S1835).

(1-3-10-1. Exemplary Variant)

Note that, in an exemplary variant of S1833, the determination unit 106 may record the RSA public key and the header 400 included in the eKey received in S1805 in association with each other in the registration key DB 136, in a case where the user terminal 20 is the user terminal 20 of the guest 2b, and, this user terminal 20 unlocks for the first time. According to this exemplary variant, the process such as transmission of the eKey and verification of the eKey can be omitted in S1805 to S1813 for example, at the second or later unlocking request by the relevant user terminal 20. This makes the process faster.

[1-3-11. Operation When Requesting Invalidation of eKey Group]

Next, with reference to FIG. 17, the operation when requesting the invalidation of the eKey Group, according to the first embodiment will be described. Note that this operation is performed in a case where the owner 2a wishes to invalidate the eKey Group associated with the lock control device 10-1, at the time of the replacement of the lock control device 10-1, for example.

Figure 17:
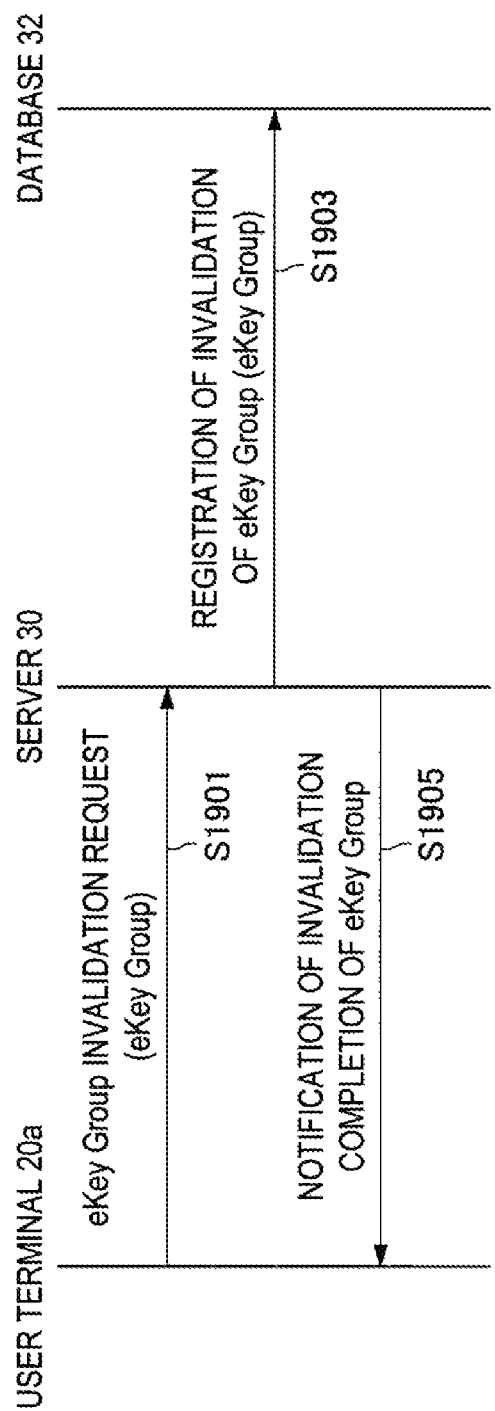
FIG. 17 is a sequence diagram illustrating an operation when requesting an invalidation of an eKey Group according to the same embodiment.

As illustrated in FIG. 17, first, the owner 2a inputs the eKey Group ID and the invalidation registration into an eKey Group invalidation registration screen image displayed on the operation display unit 222 of the user terminal 20a, for example. Then, the transmission control unit 206 of the user terminal 20a causes the communication unit 220 to transmit to the server 30 an invalidation request of the eKey Group which includes the input eKey Group ID (S1901).

Thereafter, the transmission control unit 304 of the server 30 records in the database 32 the invalidation of the eKey Group corresponding to the eKey Group ID included in the invalidation request received in S1901 (S1903). Thereby, the eKey Group corresponding to the relevant eKey Group ID is invalidated.

Thereafter, the transmission control unit 304 of the server 30 causes the communication unit 320 to transmit a notification of the invalidation completion of the eKey Group to the user terminal 20a (S1905).

<1-4. Effect>

[1-4-1. Effect 1]

In the above, for example as described with reference to FIG. 2, FIG. 15, FIG. 16, and other drawings, the lock control device 10-1 according to the first embodiment receives from the user terminal 20 the unlocking request and the information generated on the basis of the secret key of the user terminal 20, and then determines whether or not to cause the locking unit 132 to unlock on the basis of the received information generated by the user terminal 20 and the public key of the user terminal 20. Hence, the lock control device 10-1 can authenticate the user terminal 20 without receiving information of high secrecy from the user terminal 20, and therefore the safety of authentication is high.

Further, the user terminal 20 is needless to register information of high secrecy into the lock control device 10-1 and the server 30, and therefore information of high secrecy is prevented from leaking outside even when not unlocking.

Also, the lock control device 10-1 verifies the rightfulness of the public key of the user terminal 20b, by verifying, using the public key of the user terminal 20a, the signature information of the user terminal 20a of the owner 2a, which is included in the eKey received from the user terminal 20b. Hence, the lock control device 10-1 can confirm whether or not the user terminal 20b of the authentication target is the user terminal 20 of the user 2 having unlocking authority.

[1-4-2. Effect 2]

Also, according to the first embodiment, if only the mail address of the guest 2b is identified, the user terminal 20a of the owner 2a can transmit the eKey ID, which is an e-mail including an invitation letter of eKey issuance, to the user terminal 20b of the guest 2b.

Also, only in a case where the user terminal 20a approves the approval request received via the server 30 after transmitting the e-mail to the user terminal 20b of the guest 2b, the eKey is delivered to the user terminal 20b. Hence, the eKey is issued only to the guest 2b whom the owner 2a wants to approve.

Note that the eKey ID is just a pointer for having the eKey issued, and the eKey ID alone does not cause the lock control device 10-1 to unlock. Hence, even if an e-mail including the eKey ID is intercepted by a third person, the unlocking right of the lock control device 10-1 is not stolen.

<1-5. Application Example>

In the above, the first embodiment has been described. Next, the application example of the first embodiment will be described with reference to FIGS. 18 to 20.

[1-5-1. Background]

First, the background that has lead up to creating the present application example will be described. In the above first embodiment, the user 2 who can issue the eKey is only the owner 2a basically. Hence, for example, when the eKey is issued for a large number of guests 2b, it takes time to issue the eKey for all the users 2b. Also, the owner 2a is to perform an approval operation in response to the eKey issuance request from individual guest 2b, and therefore the work load of the owner 2a is huge.

As described later, according to the present application example, the owner 2a can register a vice owner 2c having the authority for issuing the eKey, from among other users 2.

[1-5-2. System Configuration]

Figure 18:
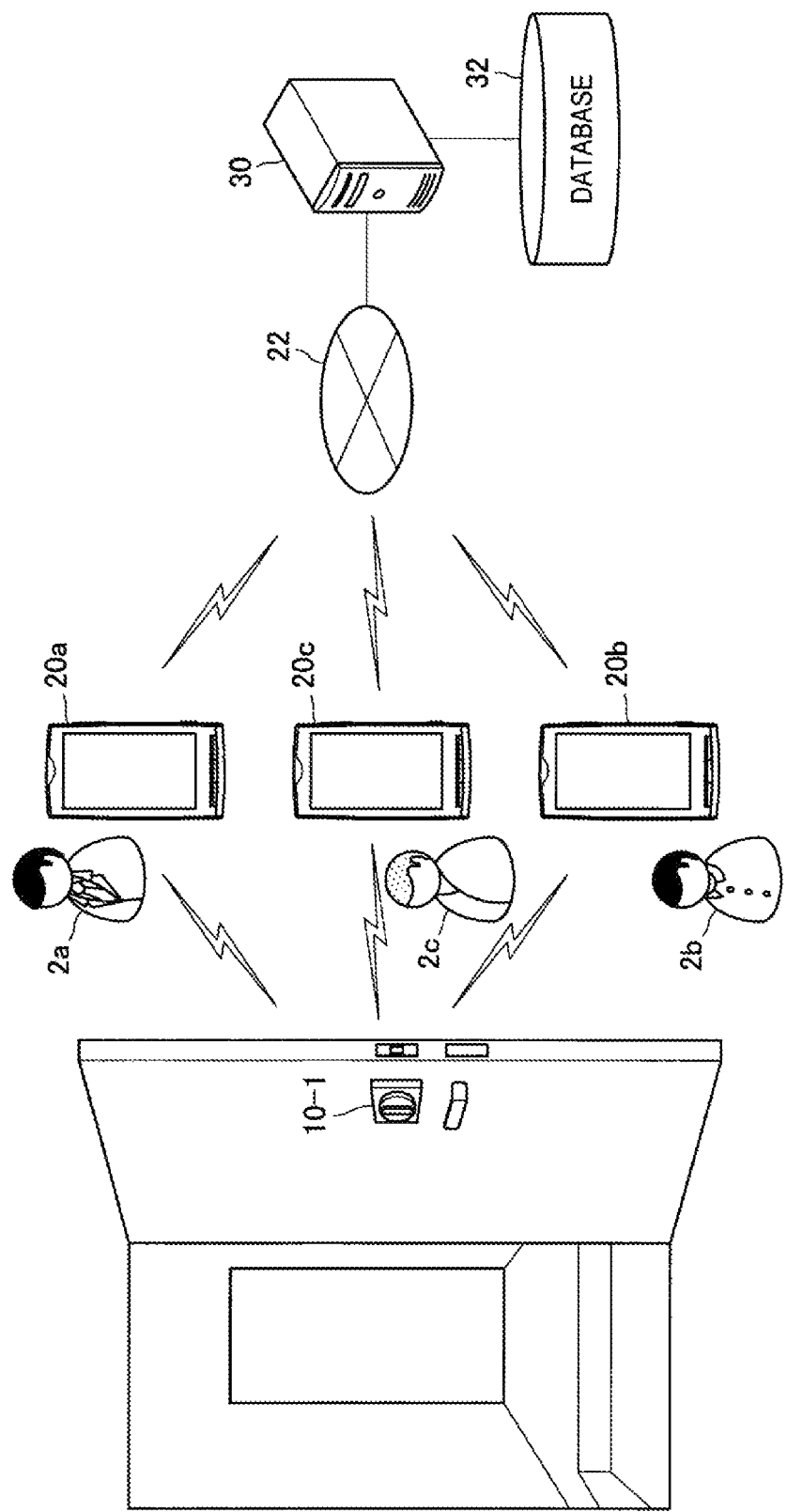
FIG. 18 is an explanatory diagram illustrating an exemplary configuration of an information processing system according to an application example of the same embodiment.

Next, with reference to FIG. 18, the configuration of the information processing system according to the present application example will be described. As illustrated in FIG. 18, the information processing system according to the present application example further includes a user terminal 20c of the vice owner 2c, as compared with the system illustrated in FIG. 1. Here, the vice owner 2c is the user 2 having the authority for issuing a conditional eKey. For example, the vice owner 2c is set at a lower rank than the owner 2a, and, has the authority for issuing the eKey to the user 2 of the lower rank than the rank set at itself. As one example, the vice owner 2c can issue the eKey to the guest 2b who does not have the authority for issuing the eKey.

Note that other components are similar to the first embodiment.

[1-5-3. Configuration]

(1-5-3-1. User Terminal 20)

In the above, the configuration of the information processing system according to the present application example has been described. Next, the configuration according to the present application example will be described in detail. The configuration of the user terminal 20 by the present application example is substantially similar to the configuration illustrated in FIG. 4. In the following, only components having the function different from the above first embodiment will be described.

Cipher Generating Unit 202

In a case where the user terminal 20 is the user terminal 20 of the owner 2a or the vice owner 2c, the cipher generating unit 202 according to the present application example creates a digital signature for the public key of the user terminal 20b of the user 2b of eKey issuance target. For example, in the above case, the cipher generating unit 202 creates a digital signature by encrypting the public key of the target user 2b, using the secret key of the user terminal 20.

Key Information Issuing Unit 204

Setting of eKey Level

The key information issuing unit 204 according to the present application example issues the eKey additionally including the eKey level indicating the rank of the user 2 of eKey issuance target.

Figure 19:
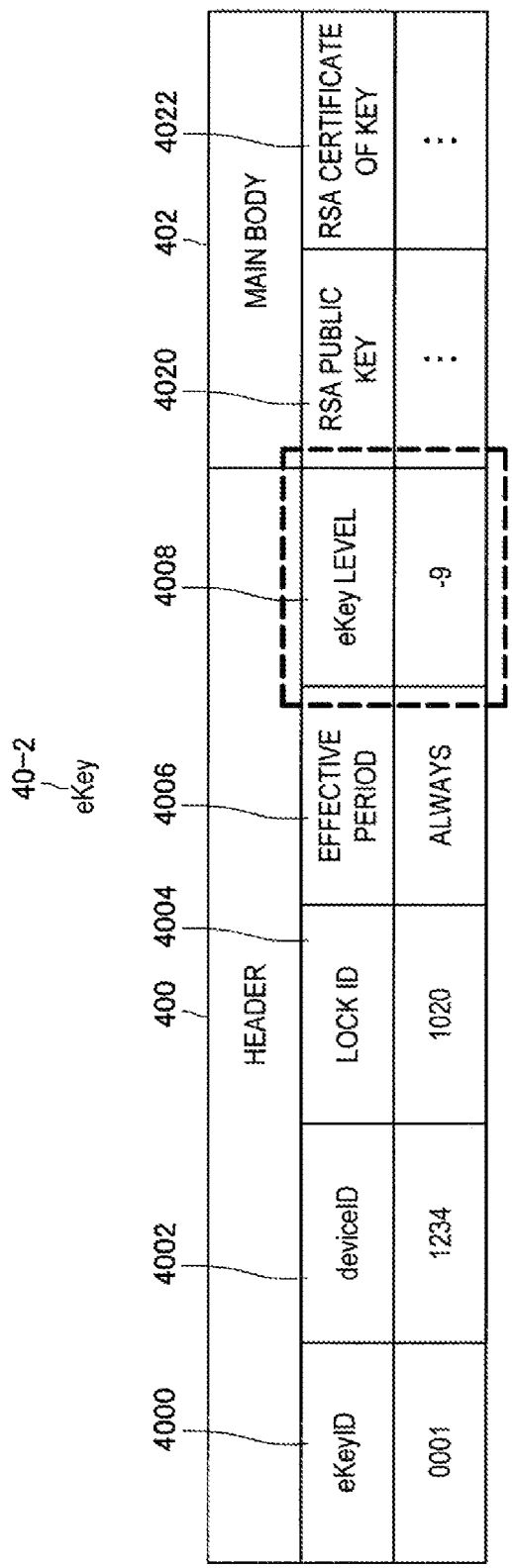
FIG. 19 is an explanatory diagram illustrating an exemplary configuration of an eKey according to the same application example.

FIG. 19 is an explanatory diagram illustrating an exemplary configuration of the eKey (eKey 40-2) according to the present application example. As illustrated in FIG. 19, the eKey 40-2 further includes the eKey level 4008, as compared with the eKey 40-1 illustrated in FIG. 3. Here, the value of the eKey level set to the relevant user 2 is recorded in the eKey level 4008.

Note that, the value of the eKey level is set by the user 2 who is the issuer of the eKey (hereinafter, sometimes referred to as eKey issuance user 2). For example, the eKey issuance user 2 sets a lower value than its own eKey level at the eKey level. As one example, the eKey issuance user 2 sets an integer within the range of "its own eKey level −1" to "−10" at the eKey level. Here, "−10" is the default value of the eKey level, and is the value given to the user 2 who does not have the authority for issuing the eKey. Also, "0" is set to the eKey level of the owner 2a.

According to this exemplary setting, the user 2 whose eKey level is set to the value of "−1" to "−9" can set a lower value than its own eKey level at the eKey level and issue the eKey. That is, the user 2 has the authority of the vice owner 2c who can issue the eKey conditionally.

(1-5-3-2. Lock Control Device 10-1, Server 30)

The configuration and the function of the lock control device 10-1 and the server 30 according to the present application example are substantially similar to the above first embodiment.

[1-5-4. Operation]

In the above, the configuration according to the present application example has been described. Next, the operation according to the present application example will be described with reference to FIG. 20. Note that the operation other than S1501 illustrated in FIG. 11 is substantially similar to the above first embodiment, and therefore the description will be omitted.

Figure 20:
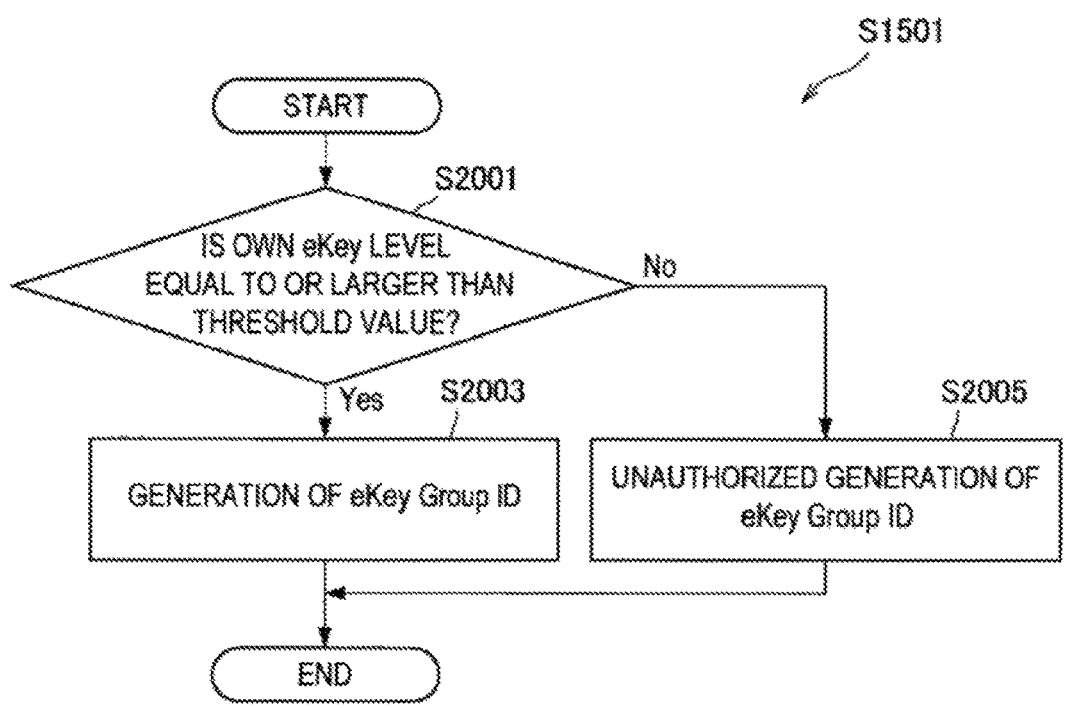
FIG. 20 is a sequence diagram illustrating a part of an operation according to the same application example.

As illustrated in FIG. 20, in the present application example, the operation of S2001 to S2003 is performed, instead of S1501. First, the key information issuing unit 204 of the user terminal 20a determines whether or not the eKey level included in the eKey of the user terminal 20a is equal to or larger than a threshold value of the authority for issuing the eKey, such as "−9" for example (S2001). If the eKey level is smaller than the threshold value (S2001: No), the user terminal 20a determines that there is no authority for issuing the eKey (S2005). Then, the "operation when inviting the guest 2b" ends.

On the other hand, if the eKey level is equal to or larger than the threshold value (S2001: Yes), the key information issuing unit 204 generates the eKey Group ID in association with the eKey level of the terminal itself for example (S2003). Thereafter, the user terminal 20a performs the operation at or after S1503 illustrated in FIG. 11.

[1-5-5. Effect]

In the above, as described with reference to FIGS. 18 to 20, the user terminal 20 according to the present application example issues the eKey additionally including the eKey level indicating the rank of the user 2 of eKey issuance target. Then, the eKey level is set to a lower value than the eKey level of the eKey issuance user 2.

Hence, the user 2 other than the owner 2a is also capable of issuing the eKey whose eKey level is set to a lower value than its own eKey level, in a case where the eKey level set for itself is equal to or larger than the threshold value, so as to have the authority of the vice owner 2c. Then, the owner 2a can select the vice owner 2c to commission the vice owner 2c to issue the eKey to the guest 2b for example, reducing the work load of the owner 2a.

For example, according to the present application example, the proprietor (the owner 2a) of the apartment building sets the real estate management company as the vice owner 2c for example, and then commissions the real estate management company to issue the eKey to the guest 2b such as tenants of each room of the apartment building, maintenance workers, the intermediate agent, etc. Hence, the work load of the proprietor of the apartment building is reduced significantly.

[1-5-6. Exemplary Variant]

Although, in the above application example, an example using the eKey level has been described as the method for setting the vice owner 2c, the present disclosure is not limited to such an example. As an exemplary variant, a method in which the flag indicating the presence or absence of the authority of the vice owner 2c is set in the eKey or the public key of the user 2 may be used.

2. Second Embodiment

<2-1. Background>

In the above, the first embodiment has been described. Next, the second embodiment will be described.

First, the background that has lead up to creating the second embodiment will be described. In the above first embodiment, authentication is performed using only one authentication algorithm, such as the RSA authentication algorithm, for example.

In the meantime, in only one authentication algorithm implemented in the lock control device 10-1, there is a risk of being unable to maintain the confidentiality of the key, due to the reason such as dramatic progress of the calculation functionality in future for example. Then, there is a risk that the key is decrypted by the third person who does not have the rightful authority in order to unlock.

As described later, a lock control device 10-2 according to the second embodiment is capable of implementing a plurality of types of authentication algorithms.

<2-2. System Configuration>

The system configuration according to the second embodiment is similar to the first embodiment illustrated in FIG. 1 or FIG. 18.

<2-3. Configuration>

[2-3-1. Lock Control Device 10-2]

Figure 21:
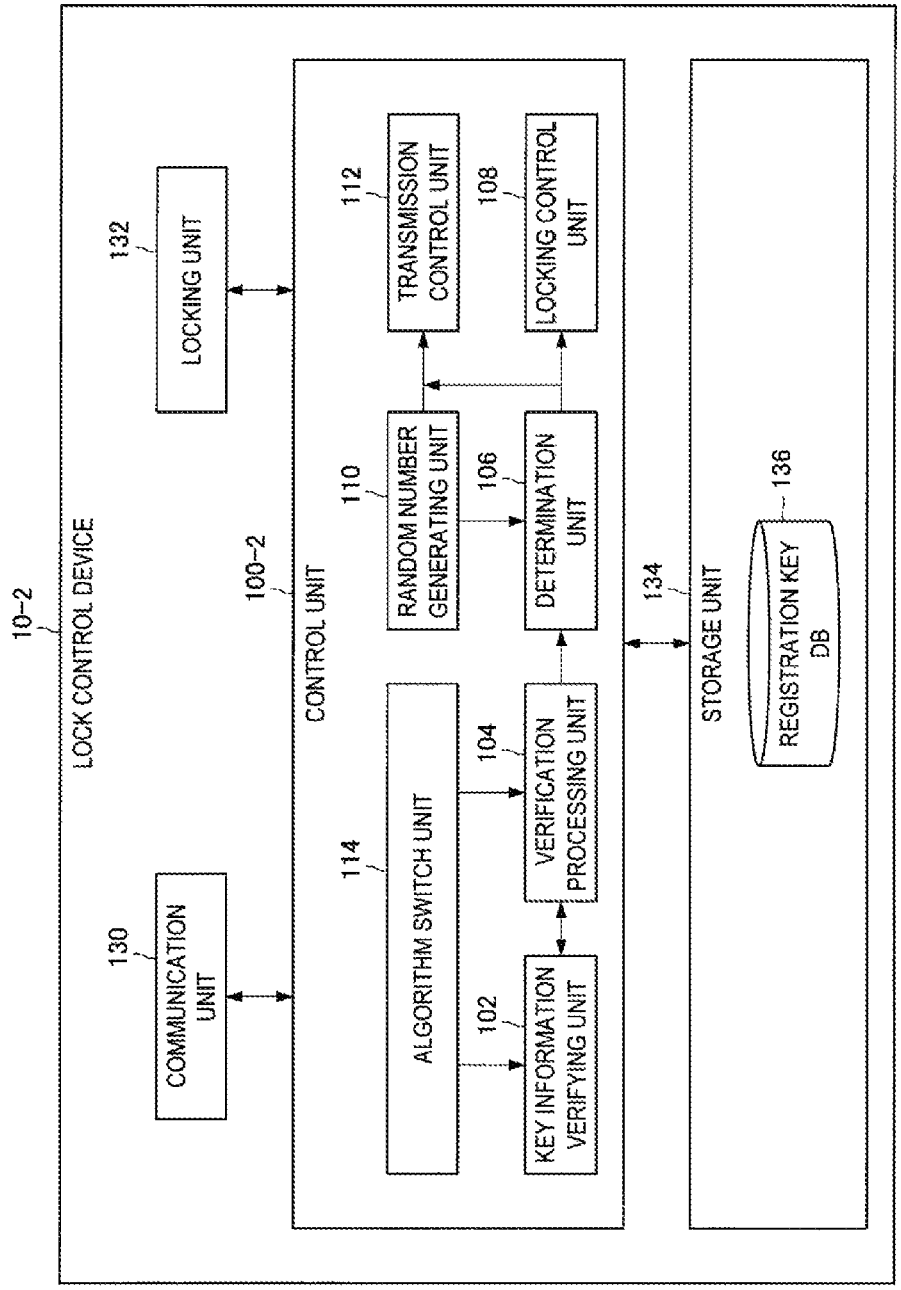
FIG. 21 is a functional block diagram illustrating an exemplary configuration of a lock control device 10-2 according to a second embodiment of the present disclosure.

Next, the configuration according to the second embodiment will be described in detail. FIG. 21 is a functional block diagram illustrating the configuration of the lock control device 10-2 according to the second embodiment. As illustrated in FIG. 21, the lock control device 10-2 includes a control unit 100-2, instead of the control unit 100-1, as compared with the lock control device 10-1 illustrated in FIG. 2. Note that, in the following, the description will be omitted with respect to the functions overlapping the first embodiment.

(2-3-1-1. Control Unit 100-2)

The control unit 100-2 further includes an algorithm switch unit 114, as compared with the control unit 100-1 according to the first embodiment.

(2-3-1-2. Algorithm Switch Unit 114)

In a case where a change request from the first authentication algorithm to the second authentication algorithm is received from the user terminal 20a of the owner 2a, the algorithm switch unit 114 switches the authentication algorithm to use from the first authentication algorithm to the second authentication algorithm. More specifically, in a case where the change request is received from the user terminal 20a, the algorithm switch unit 114 first stops using the first authentication algorithm, and then changes the setting to use the second authentication algorithm.

Alternatively, the algorithm switch unit 114 may switch, at the time of the unlocking request, the authentication algorithm to use from the first authentication algorithm to the second authentication algorithm, in a case where the information generated on the basis of the second authentication algorithm is received from the user terminal 20 for example.

Here, the first authentication algorithm takes a short time for processing, but is an algorithm having the risk of being unable to maintain the confidentiality of the key if the calculation functionality is improved significantly. For example, the first authentication algorithm is RSA, DSA, or ECDSA. Also, the second authentication algorithm takes a long time for processing, but is an algorithm having a large possibility of being able to maintain the confidentiality of the key even if the calculation functionality is improved significantly. For example, the second authentication algorithm is an algorithm considered to have the resistance to the quantum computer. As one example, the second authentication algorithm is the MQ authentication method, the lattice cryptosystem based authentication method, or the cipher based authentication method utilizing codes. Note that whether or not to change from the first authentication algorithm to the second authentication algorithm is determined by the owner 2a on the basis of the current calculation functionality and the technology trend, for example.

Note that, in the following, an example in which the first authentication algorithm is the RSA algorithm, and the second authentication algorithm is the MQ algorithm will be described mainly.

(2-3-1-3. Key Information Verifying Unit 102)

In a case where the use of the RSA algorithm is stopped by the algorithm switch unit 114, the key information verifying unit 102 according to the second embodiment determines the rightfulness of the eKey received from the user terminal 20, on the basis of the MQ algorithm.

eKey

Figure 22:
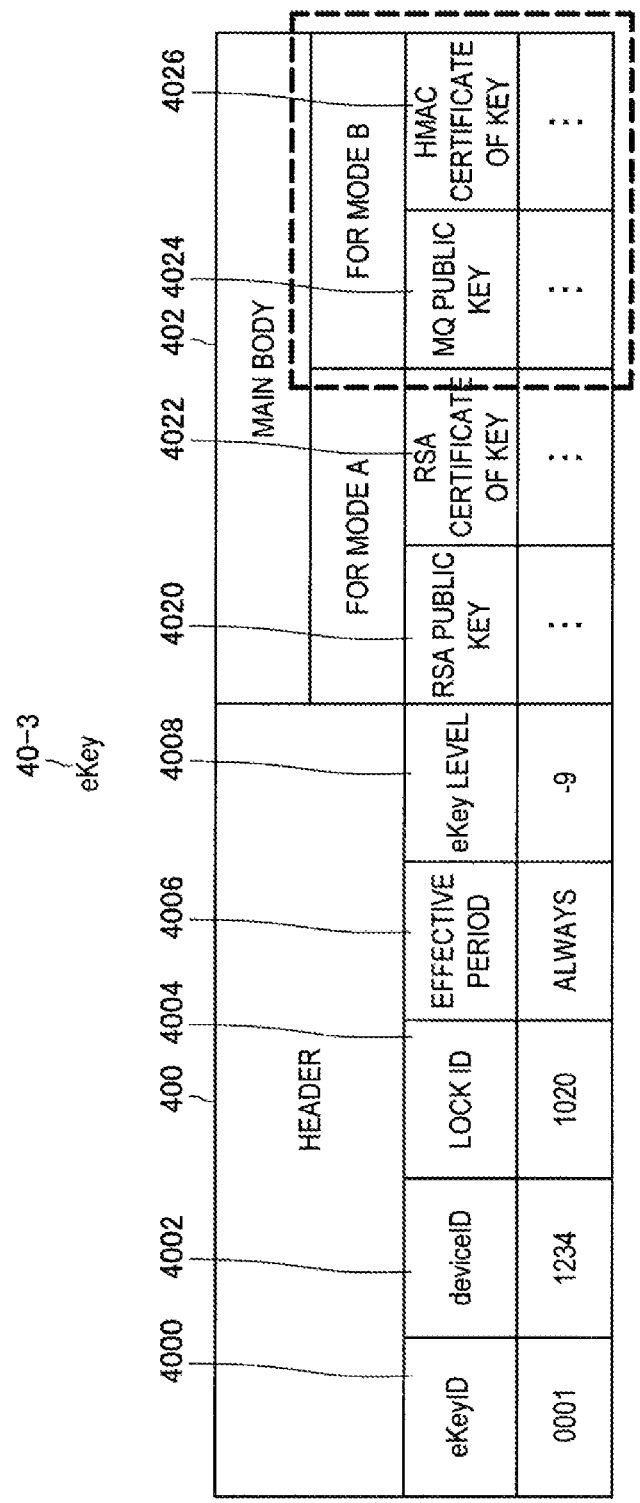
FIG. 22 is an explanatory diagram illustrating an exemplary configuration of an eKey according to the same embodiment.

Here, an exemplary configuration of the eKey (eKey 40-3) according to the second embodiment will be described with reference to FIG. 22. As illustrated in FIG. 22, the eKey 40-3 further includes an MQ public key 4024 and an HMAC certificate 4026 of the key, as compared with the eKey 40-2 (according to the application example of the first embodiment) illustrated in FIG. 19. Here, the MQ public key of the user terminal 20 to which the eKey 40-3 is issued is recorded in the MQ public key 4024. Also, the signature information using the HMAC key of the user terminal 20a of the owner 2a, for the MQ public key of the user terminal 20, is recorded in the HMAC certificate 4026 of the key.

(2-3-1-4. Verification Processing Unit 104)

In a case where the use of the RSA algorithm is stopped by the algorithm switch unit 114, the verification processing unit 104 according to the second embodiment verifies, by the MQ algorithm, the information generated on the basis of the MQ secret key of the user terminal 20, which is received from the user terminal 20.

(2-3-1-5. Storage Unit 134)

The storage unit 134 according to the second embodiment stores authentication software based on the RSA algorithm and authentication software based on the MQ algorithm.

Note that other components included in the lock control device 10-2 are substantially similar to the first embodiment.

[2-3-2. User Terminal 20]

Next, the configuration of the user terminal 20 according to the second embodiment will be described.

(2-3-2-1. Cipher Generating Unit 202)

In a case where instruction information to change from the RSA algorithm to the MQ algorithm is received from the server 30, the cipher generating unit 202 according to the second embodiment generates the information on the basis of the random number received from the lock control device 10-1 and the MQ secret key, after the reception.

(2-3-2-2. Transmission Control Unit 206)

In a case where the user terminal 20 is the user terminal 20 of the owner 2a for example, the transmission control unit 206 according to the second embodiment causes the communication unit 220 to transmit to the server 30 a change request from the RSA algorithm to the MQ algorithm, on the basis of the input of the user 2 into the operation display unit 222.

Note that other components included in the user terminal 20 are substantially similar to the first embodiment.

[2-3-3. Server 30]

Next, the configuration of the server 30 according to the second embodiment will be described.

(2-3-3-1. Verification Processing Unit 308)

In a case where the change request from the RSA algorithm to the MQ algorithm is received from the user terminal 20, the verification processing unit 308 according to the second embodiment verifies, by the MQ algorithm, the information generated on the basis of the MQ secret key of the user terminal 20, which is received from the user terminal 20, after the reception.

(2-3-3-4. Transmission Control Unit 304)

In a case where the change request from the RSA algorithm to the MQ algorithm is received from the user terminal 20a, the transmission control unit 304 according to the second embodiment causes the communication unit 320 to transmit instruction information to change from the RSA algorithm to the MQ algorithm to another user terminal 20b.

(2-3-3-5. Storage Unit 322)

The storage unit 322 according to the second embodiment stores authentication software based on the RSA algorithm and authentication software based on the MQ algorithm.

Note that other components included in the server 30 are substantially similar to the first embodiment.

<2-4. Operation>

In the above, the configuration according to the second embodiment has been described. Next, the operation according to the second embodiment will be described in the following order with reference to FIGS. 23 to 30. Note that other types of operations are similar to the first embodiment, and therefore their description will be omitted.

1. Operation when registering a key into the lock control device 10-2
2. Operation of an MQ response data verifying process
3. Operation when verifying the key of the owner 2a
4. Operation when requesting the change of algorithm
5. Operation when authenticating an account by the server 30

Note that, unless expressly stated otherwise, FIGS. 23 to 30 illustrates an example in which the user terminal 20a is the user terminal 20 of the owner 2a, and the user terminal 20b is the user terminal 20 of the guest 2b.

[2-4-1. Operation When Registering Key into Lock Control Device 10-2]

Figure 23:
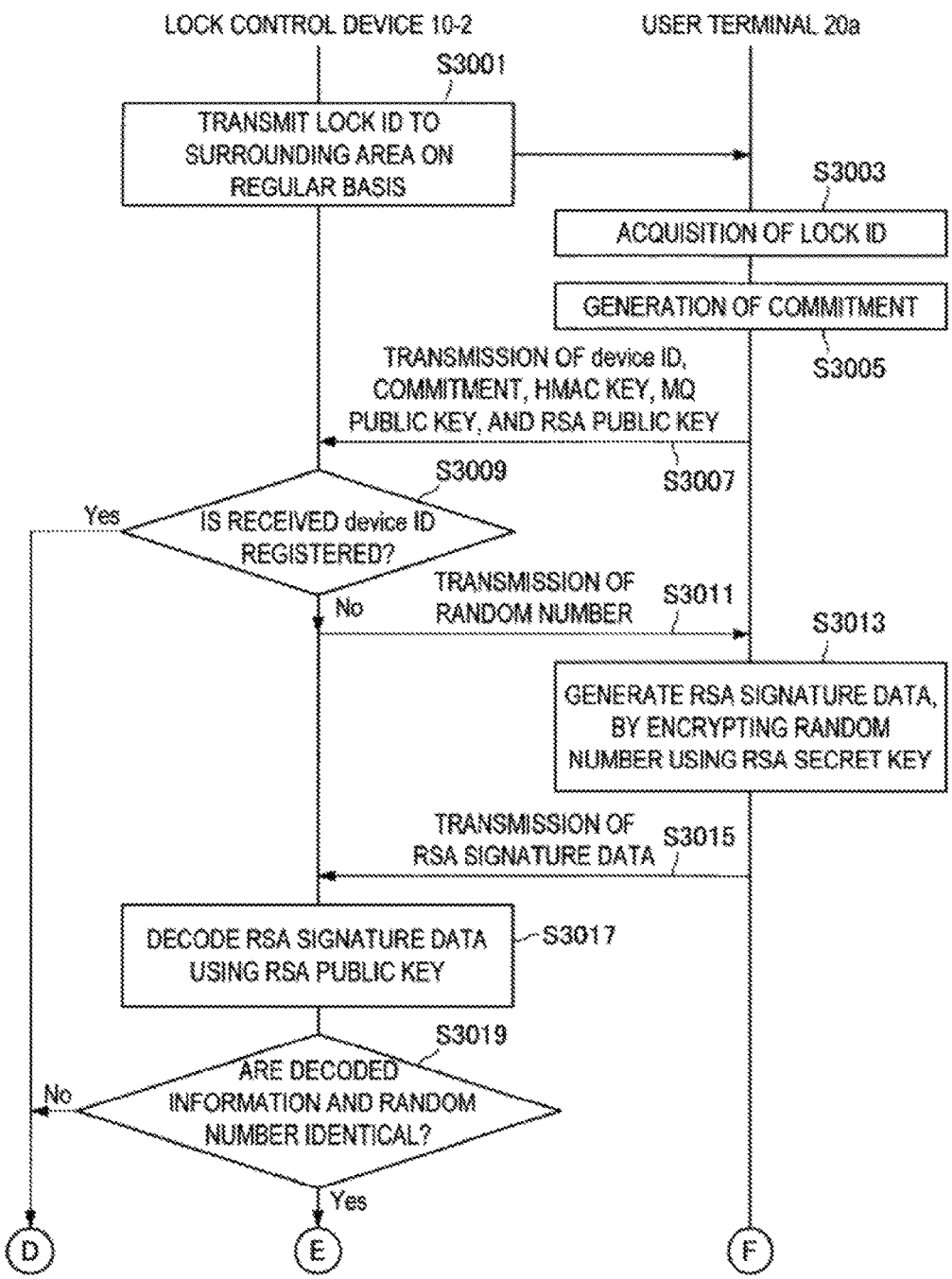
FIG. 23 is a sequence diagram illustrating a part of an operation when registering a key into the lock control device 10-2 according to the same embodiment.

FIG. 23 is a sequence diagram illustrating a part of the operation when registering the key into the lock control device 10-2, according to the second embodiment. Note that this operation is an alternative operation to the operation according to the first embodiment (illustrated in FIG. 6). Also, here, an exemplary operation when initially registering information such as the device ID of the user terminal 20a of the owner 2a and two types of public keys (i.e., the RSA public key and the MQ public key), into the lock control device 10-2 managed by the owner 2a will be described. Also, this operation is basically performed only once by the owner 2a who manages the lock control device 10-2 with regard to each lock control device 10-2.

Note that the operation of S3001 to S3003 illustrated in FIG. 23 is similar to S1001 to S1003 illustrated in FIG. 6.

After S3003, the cipher generating unit 202 of the user terminal 20a generates a commitment on the basis of the MQ algorithm, (S3005).

Subsequently, the transmission control unit 206 causes the communication unit 220 to transmit to the lock control device 10-2 the device ID of the user terminal 20a, the commitment generated in S3005, the HMAC key of the user terminal 20a, the MQ public key of the user terminal 20a, and the RSA public key of the user terminal 20a (S3007).

Note that the operation of S3009 to S3017 illustrated in FIG. 23 is substantially similar to S1007 to S1015 illustrated in FIG. 6.

After S3017, the determination unit 106 of the lock control device 10-2 compares the information decoded in S3017 and the random number generated in S3011 (S3019). In a case where the both are not identical with each other (S3019: No), the determination unit 106 performs the operation of S3045 described later.

Here, the operation in a case where the both are identical with each other in S3019 (S3019: Yes) will be described with reference to FIG. 24.

Figure 24:
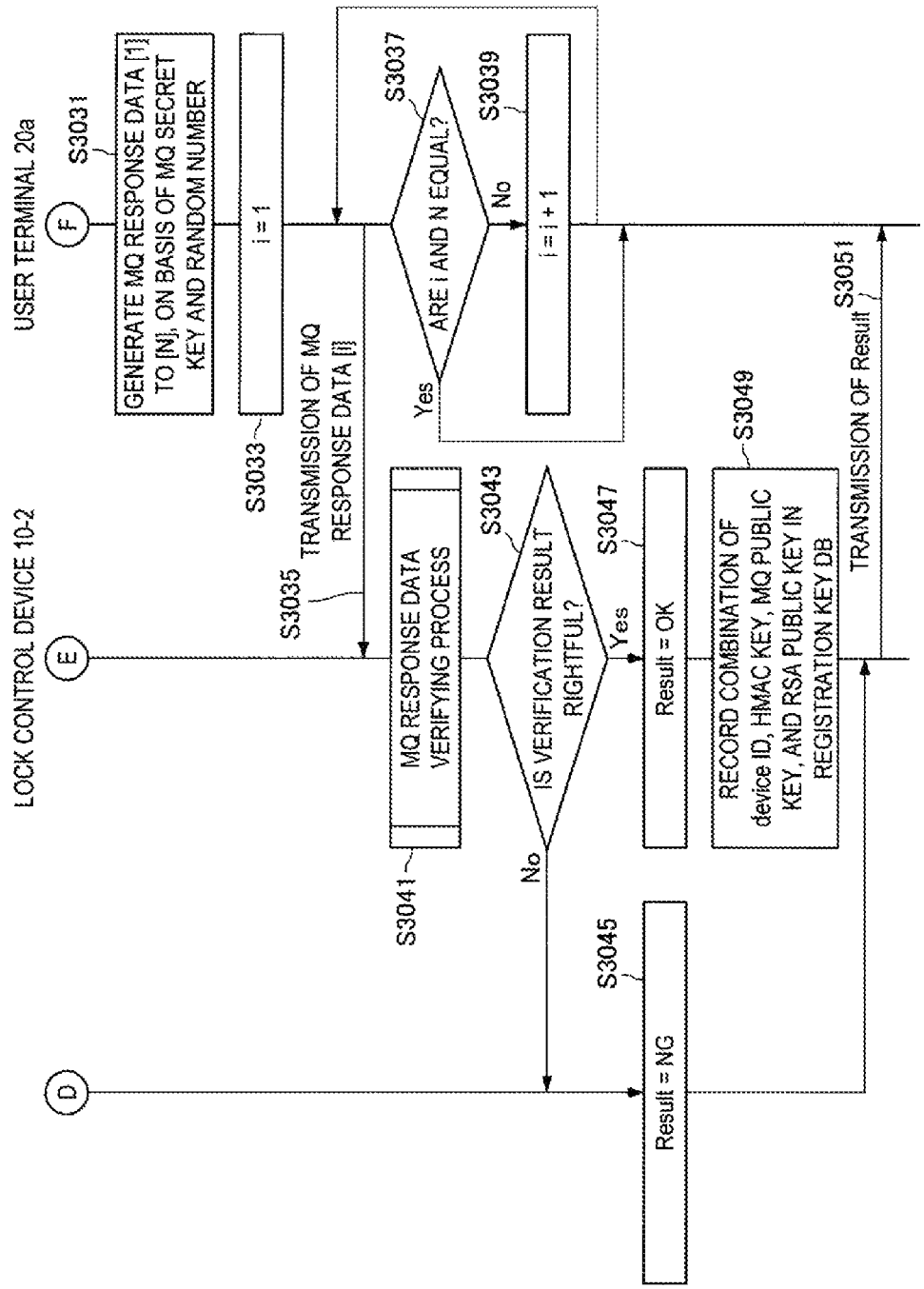
FIG. 24 is a sequence diagram illustrating a part of an operation when registering a key into the lock control device 10-2 according to the same embodiment.

As illustrated in FIG. 24, first, the cipher generating unit 202 of the user terminal 20a generates N pieces of MQ response data [i] (i=1 to N) for example, on the basis of the random number received in S3011 and the MQ secret key of the user terminal 20a (S3031). Note that, here, an example in which the cipher generating unit 202 generates data divided into N pieces, due to a reason such as large data size of the MQ response data for example, will be described. However, the cipher generating unit 202 is not limited to such an example, but may generate only one piece of the MQ response data.

Subsequently, the transmission control unit 206 causes the communication unit 220 to transmit N pieces of the MQ response data [i] (i=1 to N) generated in S3031, to the lock control device 10-2 (S3033 to S3039).

Thereafter, the lock control device 10-2 executes the "MQ response data verifying process" described later (S3041).

Thereafter, if it is verified that the MQ response data is not rightful (S3043: No), the determination unit 106 sets "NG" to Result (=registration result) (S3045). Thereafter, the lock control device 10-2 performs the operation of S3051 described later.

On the other hand, if it is verified that the MQ response data is rightful (S3043: Yes), the determination unit 106 sets "OK" to the Result, (S3047). Then, the determination unit 106 records the device ID, the HMAC key, the MQ public key, and the RSA public key received in S3007 in association with each other, in the registration key DB 136 (S3049).

Thereafter, the transmission control unit 112 causes the communication unit 130 to transmit the Result set in S3045 or S3047 to the user terminal 20a (S3051).

[2-4-2. Operation of MQ Response Data Verifying Process]

Next, with reference to FIG. 25, the "operation of the MQ response data verifying process" in S3041 will be described in detail.

Figure 25:
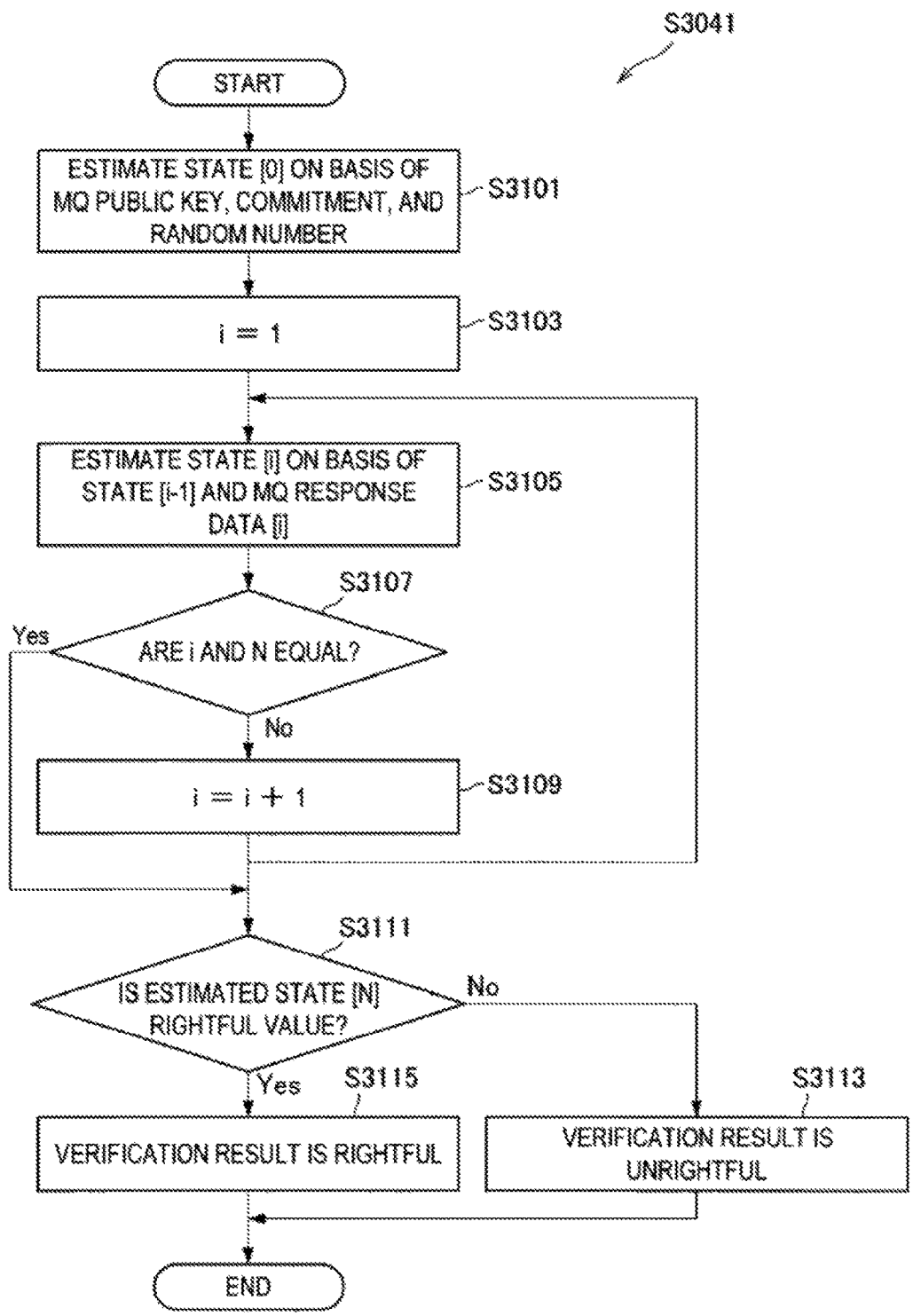
FIG. 25 is a flowchart illustrating an operation of an MQ response data verifying process according to the same embodiment.

As illustrated in FIG. 25, first, the verification processing unit 104 of the lock control device 10-2 estimates State [0] by the MQ algorithm, on the basis of the MQ public key and the commitment received in S3007 illustrated in FIG. 23, and the random number generated in S3011 illustrated in FIG. 23 (S3101).

Thereafter, the verification processing unit 104 repeats estimating State [i] by the MQ algorithm, from i=1 to i=N, on the basis of the estimated State [i−1] and the MQ response data [i] received in S3035 (S3103 to S3109).

Thereafter, the determination unit 106 verifies whether or not the estimated State [N] is a rightful value (S3111). If the State [N] is not a rightful value (S3111: No), the determination unit 106 determines that the MQ response data received from the user terminal 20a is not rightful (S3113).

On the other hand, if the State [N] is a rightful value (S3111: Yes), the determination unit 106 determines that the received MQ response data is rightful (S3115).

[2-4-3. Operation When Verifying Key of Owner 2a]

Next, the operation when verifying the key of the owner 2a according to the second embodiment will be described. Note that, this operation is an alternative operation to the operation according to the first embodiment (illustrated in FIG. 7). Also, this operation includes two types of operations, which are the verification operation using the RSA algorithm and the verification operation using the MQ algorithm, and these two types of operations are executed consecutively, for example. Of these, the verification operation using the RSA algorithm is similar to the operation according to the first embodiment, and therefore the description will be omitted. In the following, the verification operation using the MQ algorithm will be described with reference to FIG. 26.

Figure 26:
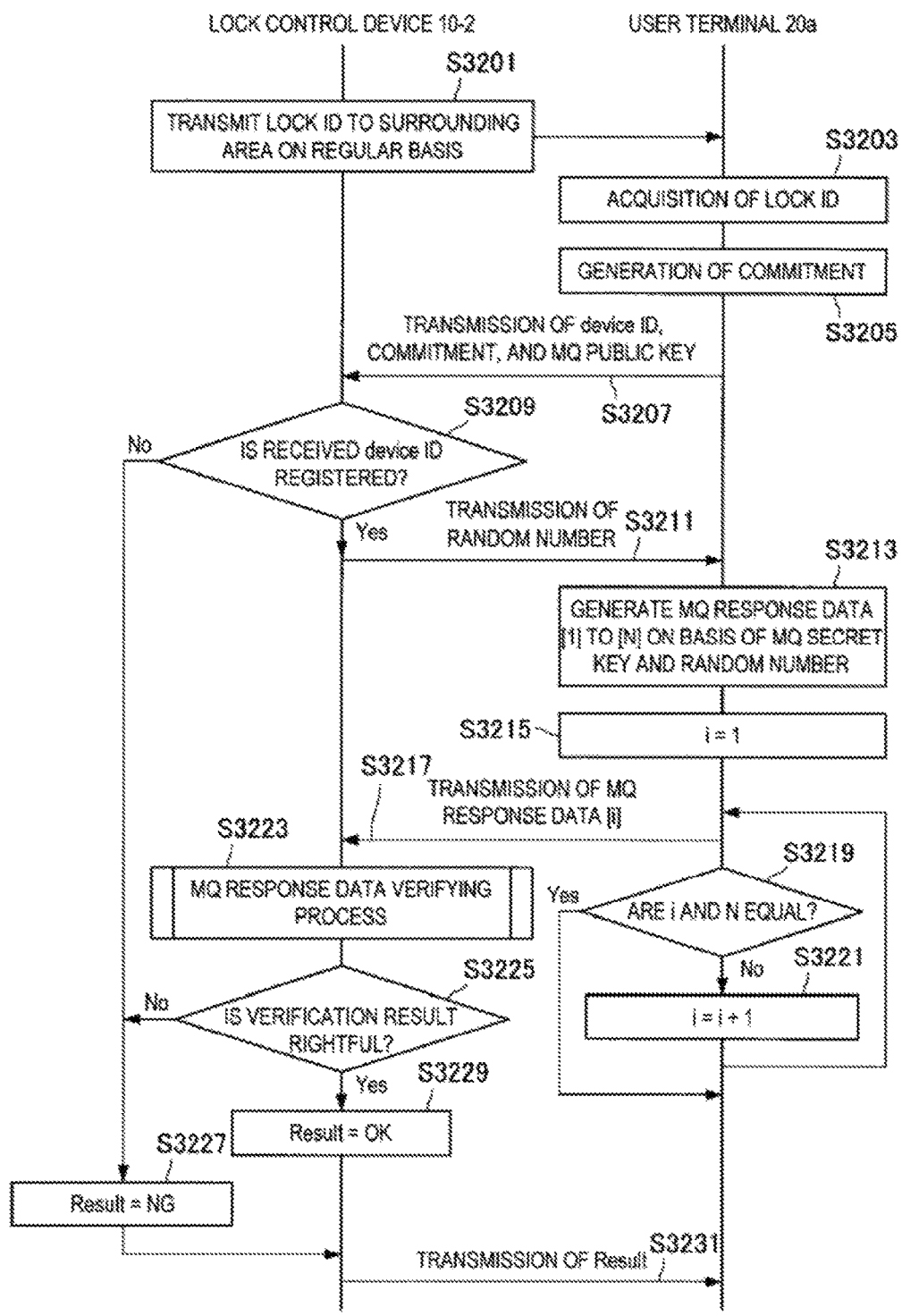
FIG. 26 is a sequence diagram illustrating an operation when verifying a key of an owner 2a according to the same embodiment.

Note that the operation of S3201 to S3203 illustrated in FIG. 26 is similar to S1101 to S1103 illustrated in FIG. 7. Also, the operation of S3205 is similar to S3005 illustrated in FIG. 23.

After S3205, the transmission control unit 206 of the user terminal 20a causes the communication unit 220 to transmit to the lock control device 10-2 the device ID of the user terminal 20a, the commitment generated in S3205, and the MQ public key of the user terminal 20a (S3207).

Note that the operation of S3209 to S3211 is similar to S1107 to S1109 illustrated in FIG. 7. Also, the operation of S3213 to S3223 is similar to S3031 to S3041 illustrated in FIG. 24.

After S3223, if it is verified that the MQ response data is not rightful (S3225: No), the determination unit 106 of the lock control device 10-2 sets "NG" to Result (=verification result) (S3227). Thereafter, the lock control device 10-2 performs the operation of S3231 described later.

On the other hand, if it is verified that the MQ response data is rightful (S3225: Yes), the determination unit 106 sets "OK" to the Result (S3229).

Thereafter, the transmission control unit 112 causes the communication unit 130 to transmit the Result set in S3227 or S3229 to the user terminal 20a (S3231).

[2-4-4. Operation When Requesting Change of Algorithm]

Next, with reference to FIG. 27, the operation when requesting the change of algorithm according to the second embodiment will be described. Note that this operation is the operation performed in a case where the owner 2a wishes to change the authentication algorithm used by the lock control device 10-2 from the RSA algorithm to the MQ algorithm, for example.

Figure 27:
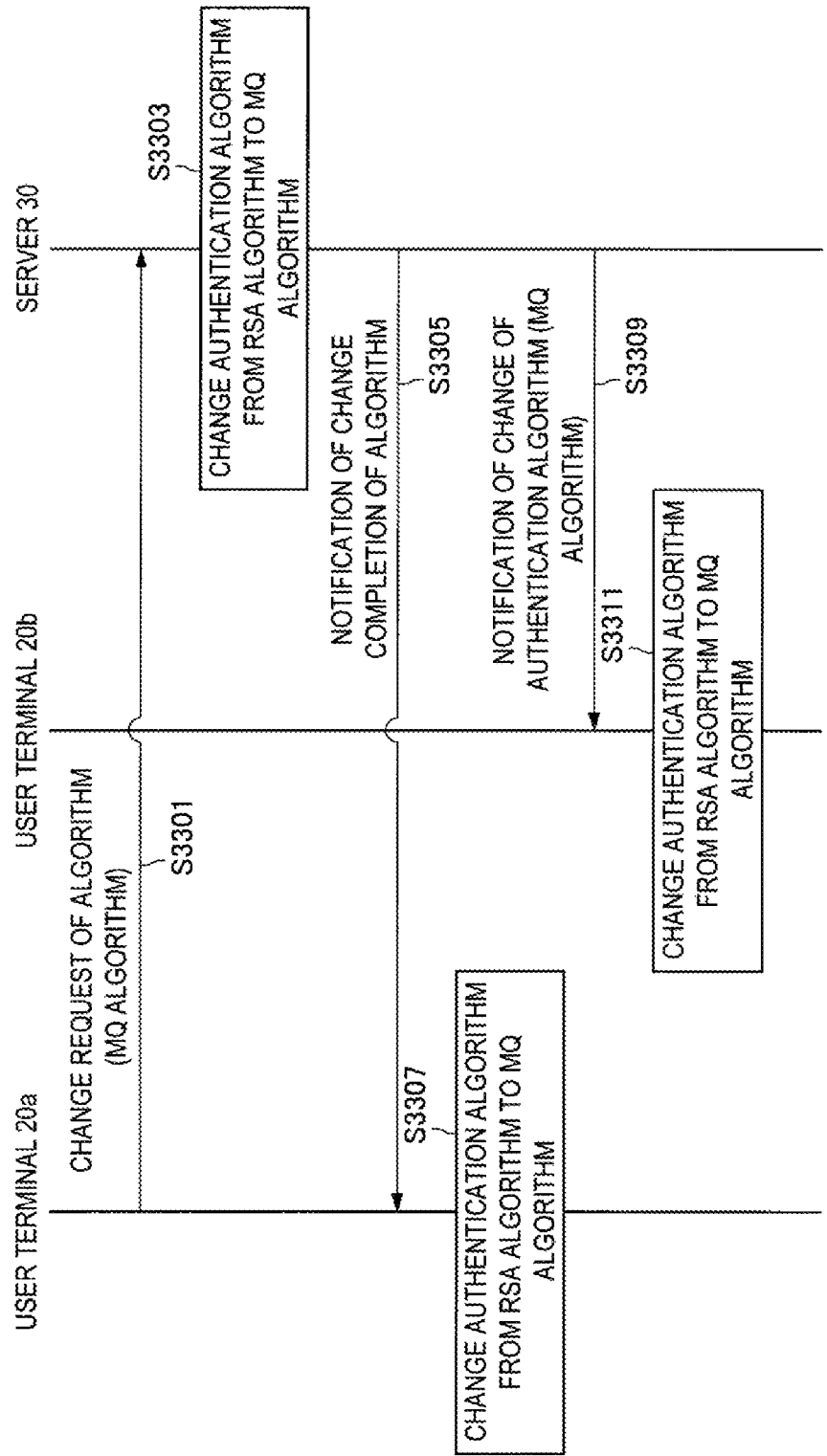
FIG. 27 is a sequence diagram illustrating an operation when requesting a change of an algorithm according to the same embodiment.

As illustrated in FIG. 27, first, the user terminal 20a logs in to the key authentication service. Then, the transmission control unit 206 of the user terminal 20a causes the communication unit 220 to transmit to the server 30 the change request to the MQ algorithm, on the basis of the input of the user into the operation display unit 222, for example, (S3301).

Thereafter, the control unit 300 of the server 30 changes the setting of the authentication algorithm to use, which is recorded in the storage unit 322 (or the database 32), from the RSA algorithm to the MQ algorithm, and updates the recorded content (S3303). Here, the control unit 300 may change the authentication algorithm to use, from the RSA algorithm to the MQ algorithm, with respect to all eKey Groups that have been registered. Alternatively, the control unit 300 may change the authentication algorithm to use, from the RSA algorithm to the MQ algorithm, only with respect to the eKey Group specified in the change request received in S3301.

Subsequently, the transmission control unit 304 causes the communication unit 320 to transmit to the user terminal 20a a notification of the change completion of the authentication algorithm (S3305).

Thereafter, the control unit 200 of the user terminal 20a changes the setting of the authentication algorithm to use, which is recorded in the storage unit 224, from the RSA algorithm to the MQ algorithm, and updates the recorded content of the storage unit 224 (S3307).

Also, the transmission control unit 304 of the server 30 causes the communication unit 320 to transmit to another user terminal 20b an instruction information to change from the RSA algorithm to the MQ algorithm (S3309).

Thereafter, similarly to S3307, the control unit 200 of the user terminal 20b changes the setting of the authentication algorithm to use, from the RSA algorithm to the MQ algorithm, and updates the recorded content of the storage unit 224 (S3311).

[2-4-5. Operation When Authenticating Account By Server 30]

Next, the operation when authenticating an account by the server 30 according to the second embodiment will be described. Note that this operation is an alternative operation to the operation according to the first embodiment (illustrated in FIG. 10). Also, this operation includes two types of operations, which are the authentication operation using the RSA algorithm, and the authentication operation using the MQ algorithm. For example, the server 30 performs the authentication operation using the RSA algorithm before the change request of the algorithm, which is described in section 2-4-4, is received from the user terminal 20a, and performs the authentication operation using the MQ algorithm after the change request of the algorithm is received. Note that the authentication operation using the RSA algorithm is similar to the authentication operation according to the first embodiment, and therefore the description will be omitted. In the following, the authentication operation using the MQ algorithm will be described with reference to FIG. 28.

Figure 28:
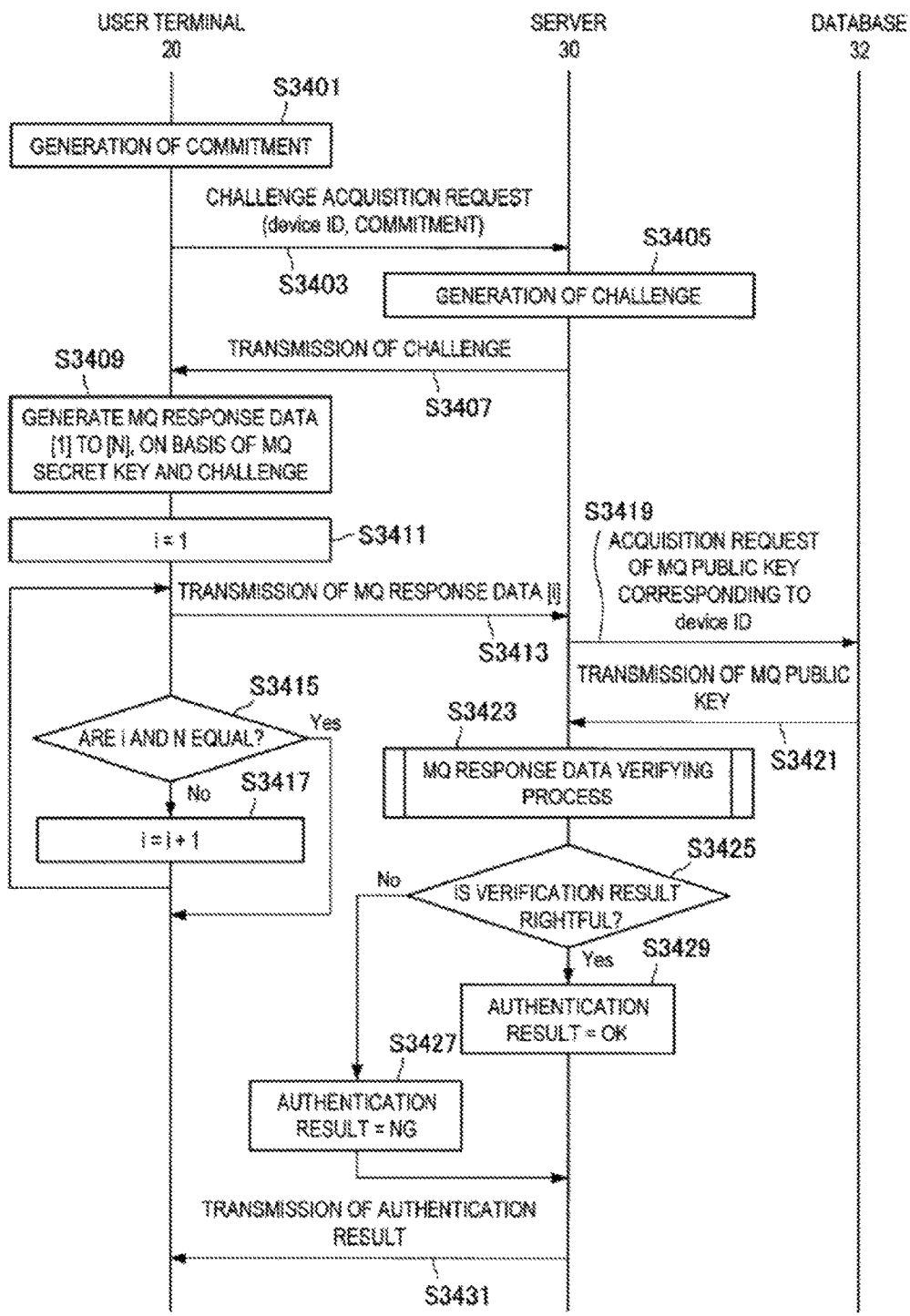
FIG. 28 is a sequence diagram illustrating an operation when authenticating an account by a server 30 according to the same embodiment.

As illustrated in FIG. 28, first, the cipher generating unit 202 of the user terminal 20 generates a commitment on the basis of the MQ algorithm (S3401).

Subsequently, the transmission control unit 206 causes the communication unit 220 to transmit to the server 30 a challenge acquisition request including the device ID of the user terminal 20 and the commitment generated in S3401 (S3403).

Note that the operation of S3405 to S3407 is similar to S1403 to S1405 illustrated in FIG. 10.

Thereafter, the cipher generating unit 202 of the user terminal 20 generates N pieces of the MQ response data [i] (i=1 to N) for example, on the basis of the challenge received in S3407, and the MQ secret key of the user terminal 20 (S3409).

Subsequently, the transmission control unit 206 causes the communication unit 220 to transmit N pieces of the MQ response data [i] (i=1 to N) generated in S3409 to the server 30 (S3409 to S3417).

Thereafter, the transmission control unit 304 of the server 30 causes the communication unit 320 to transmit to the database 32 a request to acquire the MQ public key of the user terminal 20 (S3419).

Thereafter, the database 32 extracts the MQ public key corresponding to the device ID included in the acquisition request received in S3419, and then transmits the extracted MQ public key to the server 30 (S3421).

Thereafter, the server 30 performs the "MQ response data verifying process" (S3423). Note that this "MQ response data verifying process" is different from the operation illustrated in FIG. 25 in that the operation executor is the server 30 instead of the lock control device 10-2, but other configuration is substantially similar.

In S3423, if it is verified that the MQ response data is not rightful (S3425: No), the control unit 300 of the server 30 sets "NG" to Result (=authentication result), and then does not authenticate the user terminal 20 (S3427). Thereafter, the server 30 performs the operation of S3431 described later.

On the other hand, if it is verified that the MQ response data is rightful (S3425: Yes), the control unit 300 sets "OK" to the Result, and then authenticates the user terminal 20 (S3429).

Thereafter, the transmission control unit 304 causes the communication unit 130 to transmit the Result set in S3427 or S3429 to the user terminal 20 (S3431).

[2-4-6. Operation of Unlocking Process]

Next, the "operation of the unlocking process" according to the second embodiment will be described. Note that this operation is an alternative operation to the operation according to the first embodiment (illustrated in FIGS. 15 and 16). Also, this operation includes two types of operations, which are the unlocking process using the RSA algorithm and the unlocking process using the MQ algorithm. For example, the unlocking process using the RSA algorithm is executed in a case where the lock control device 10-2 uses the RSA algorithm as the authentication algorithm, and the unlocking process using the MQ algorithm is executed in a case where the lock control device 10-2 uses the MQ algorithm as the authentication algorithm. Of these, the unlocking process using the RSA algorithm is similar to the operation according to the first embodiment, and therefore the description will be omitted. In the following, the unlocking process using the MQ algorithm will be described with reference to FIGS. 29 to 30.

Figure 29:
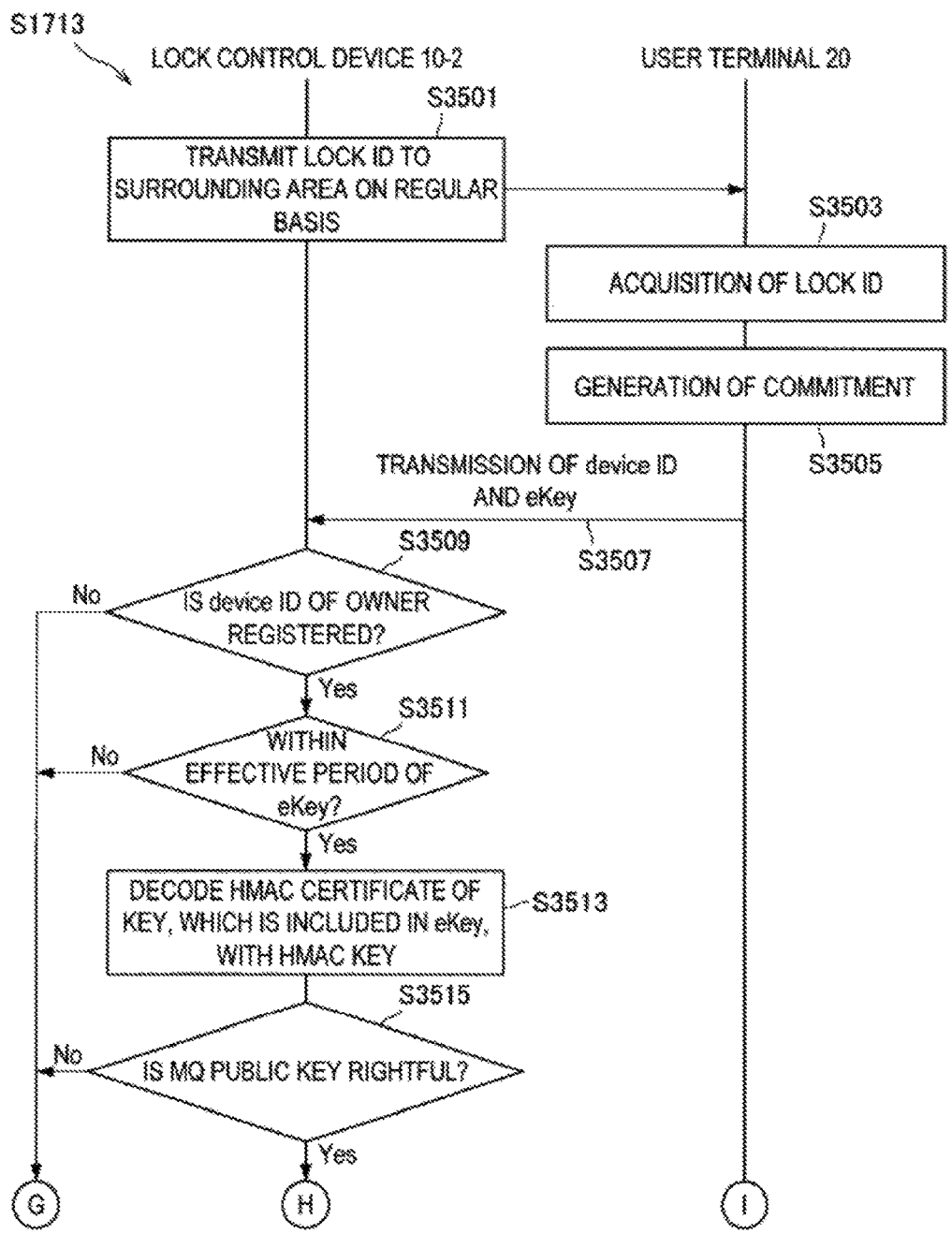
FIG. 29 is a sequence diagram illustrating a part of an operation of an unlocking process according to the same embodiment.

Note that the operation of S3501 to S3503 illustrated in FIG. 29 is similar to the operation of S1801 to S1803 illustrated in FIG. 15. Also, the operation of S3505 is substantially similar to S3205 illustrated in FIG. 26. Also, the operation of S3507 to S3511 is similar to S1805 to S1809 illustrated in FIG. 15.

In S3511, if it is confirmed that the eKey received in S3507 is within the effective period (S3511: Yes), the verification processing unit 104 of the lock control device 10-2 decodes the HMAC certificate of the MQ public key of the user 2, which is included in the eKey, using the HMAC key of the user terminal 20a of the owner 2a, which is recorded in the registration key DB 136 (S3513).

Then, the determination unit 106 determines whether or not the MQ public key of the user 2 is rightful, on the basis of the certificate decoded in S3513 (S3515). If it is determined that the MQ public key of the user 2 is not rightful (S3515: No), the lock control device 10-2 performs the operation of S3535 described later.

Here, the operation in a case where it is determined that the MQ public key of the user 2 is rightful in S3515 (S3515: Yes) will be described with reference to FIG. 30.

Figure 30:
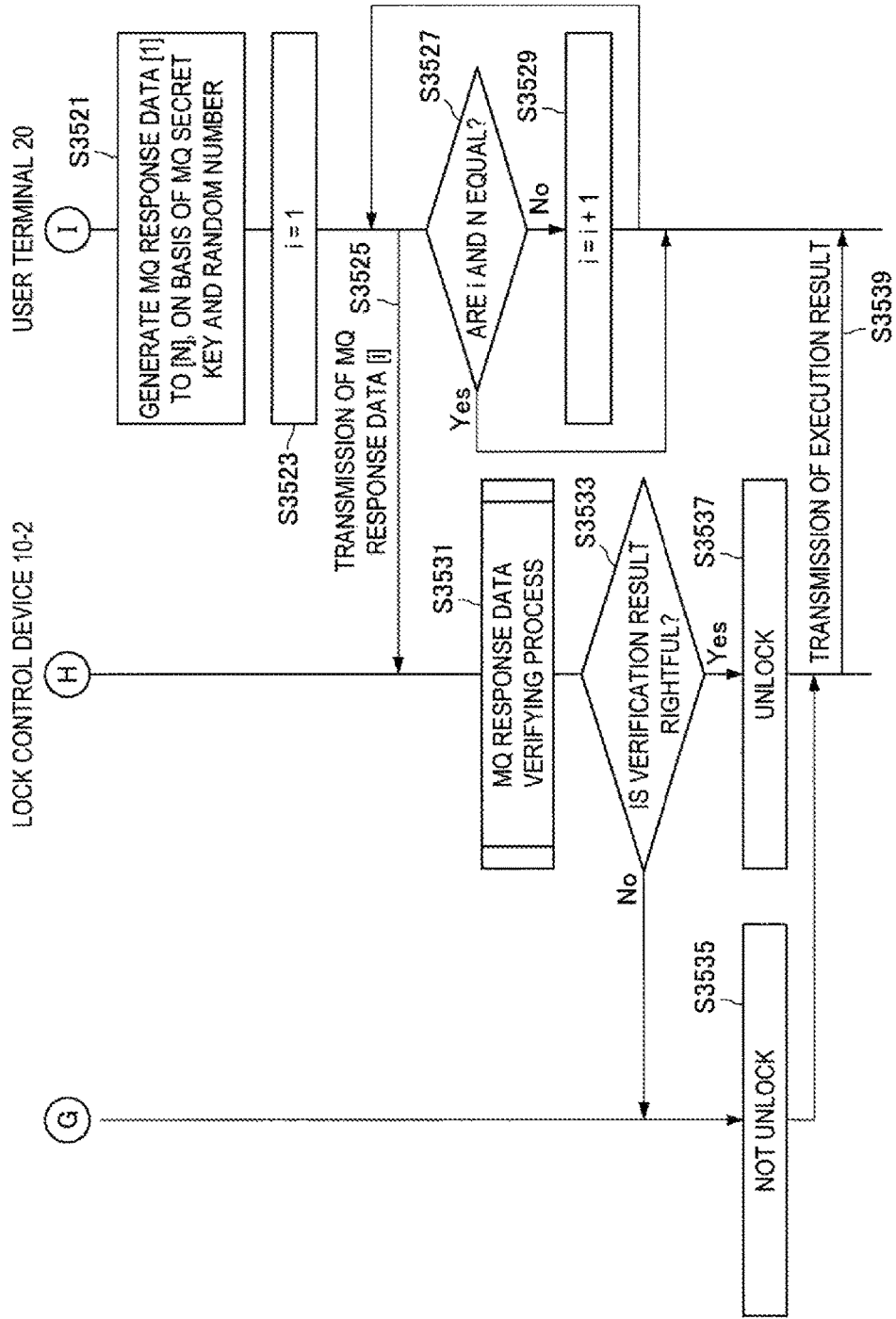
FIG. 30 is a sequence diagram illustrating a part of an operation of the unlocking process according to the same embodiment.

Note that the operation of S3521 to S3531 illustrated in FIG. 30 is substantially similar to S3031 to S3041 illustrated in FIG. 24.

After S3531, if it is verified that the MQ response data is not rightful (S3533: No), the determination unit 106 of the lock control device 10-2 decides not to unlock (S3535).

Thereafter, the lock control device 10-1 performs the operation of S3539 described later.

On the other hand, if it is verified that the MQ response data is rightful (S3533: Yes), the determination unit 106 decides to unlock. Then, the locking control unit 108 causes the locking unit 132 to unlock (S3537).

Thereafter, the transmission control unit 112 causes the communication unit 130 to transmit the execution result of S3535 or S3537 to the user terminal 20 (S3539).

<2-5. Effect>

[2-5-1. Effect 1]

As described with reference to FIGS. 21 to 30 in the above, the lock control device 10-2 and the server 30 according to the second embodiment implement two types of authentication algorithms such as the RSA algorithm and the MQ algorithm, and use the RSA algorithm as the authentication algorithm in an initial state. In the present circumstances, the confidentiality of the key is secured sufficiently by the RSA algorithm, and therefore the authentication is performed safely. Also, the authentication process is executed in a shorter time, as compared with the MQ algorithm, for example.

[2-5-2. Effect 2]

Also, in a case where the change request of the authentication algorithm is received from the user terminal 20a of the owner 2a, the lock control device 10-2 and the server 30 switch the authentication algorithm to use, from the RSA algorithm to the MQ algorithm.

Hence, even if the RSA algorithm becomes unable to maintain the confidentiality of the key, due to the reason such as dramatic progress of calculation functionality in future, the lock control device 10-2 authenticates the user terminal 20 using the MQ algorithm, in order to prevent being unlocked by the third person who does not have the rightful authority. That is, according to the second embodiment, the effect of making the lifetime of the key longer than the first embodiment is obtained.

3. Third Embodiment

<3-1. Background>

In the above, the second embodiment has been described. Next, the third embodiment will be described. First, the background that has lead up to creating the third embodiment will be described.

The effective period is set to the eKey as described above, the date and time information managed in the lock control device 10-1 is to be correct, to correctly operate the eKey. However, there is a risk of the date and time information lagging as the usage of the lock control device 10-1 goes on, due to the restriction of the lock control device 10-1. Thus, the date and time information of the lock control device 10-1 is to be corrected occasionally.

In the meantime, if the date and time information of all user terminals 20 (having the unlocking right) is set in a correctable manner, there is a risk of being set at incorrect date and time by a malicious user 2. For example, there is a risk that the malicious user 2 manipulates the date and time information to incorrect date and time, to continue the use of the eKey whose effective period has expired.

As described later, a lock control device 10-3 according to the third embodiment is capable of limiting the user 2 having the authority to change the date and time information.

<3-2. System Configuration>

The system configuration according to the third embodiment is similar to the first embodiment illustrated in FIG. 1 or FIG. 18.

<3-3. Configuration>

[3-3-1. Lock Control Device 10-3]

Figure 31:
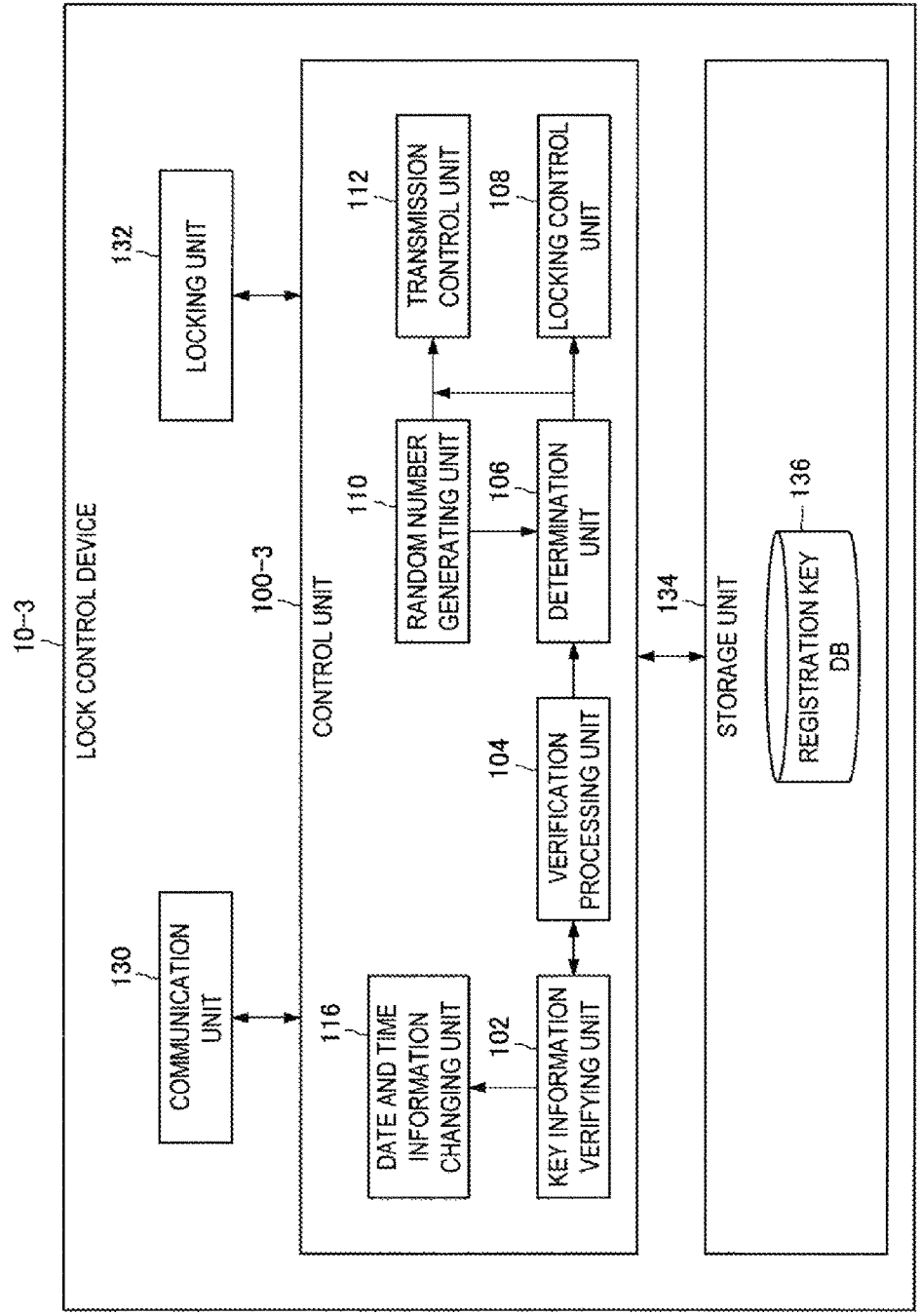
FIG. 31 is a functional block diagram illustrating an exemplary configuration of a lock control device 10-3 according to a third embodiment of the present disclosure.

Next, the configuration according to the third embodiment will be described in detail. FIG. 31 is a functional block diagram illustrating the configuration of the lock control device 10-3 according to the third embodiment. As illustrated in FIG. 31, the lock control device 10-3 includes a control unit 100-3, instead of the control unit 100-1, as compared with the lock control device 10-1 illustrated in FIG. 2.

(3-3-1-1. Control Unit 100-3)

The control unit 100-3 further includes a date and time information changing unit 116, as compared with the control unit 100-1 according to the first embodiment.

(3-3-1-2. Date and Time Information Changing Unit 116)

The date and time information changing unit 116 determines availability or unavailability of the change of the date and time information of the lock control device 10-3 by the user terminal 20, on the basis of a time synchronization availability flag included in the eKey received from the user terminal 20. For example, the date and time information changing unit 116 authorizes the change of the date and time information of the lock control device 10-3 by the user terminal 20, in a case where the time synchronization availability flag included in the received eKey indicates "OK". Also, the date and time information changing unit 116 does not authorize the change of the date and time information of the lock control device 10-3 by the user terminal 20, in a case where this time synchronization availability flag indicates "NG". Note that the value of the time synchronization availability flag may be set by the eKey issuing user 2 (the owner 2a or the vice owner 2c), when issuing the eKey for example. Alternatively, the value of the time synchronization availability flag may be set in a single uniform way, in such a manner that only the owner 2a is "OK", and other users 2b are "NG", for example.

eKey

Figure 32:
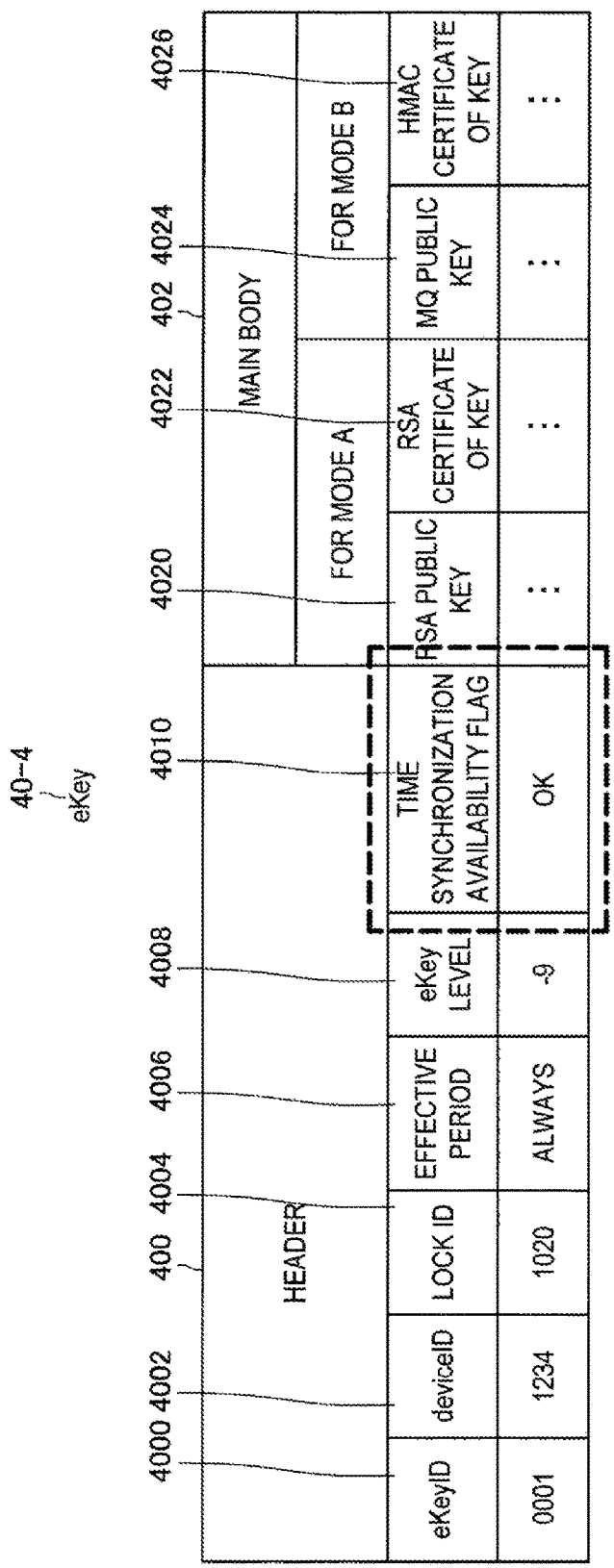
FIG. 32 is an explanatory diagram illustrating an exemplary configuration of an eKey according to the same embodiment.

Here, an exemplary configuration of the eKey (an eKey 40-4) according to the third embodiment will be described with reference to FIG. 32. As illustrated in FIG. 32, the eKey 40-4 further includes a time synchronization availability flag 4010, as compared with the eKey 40-3 (according to the second embodiment) illustrated in FIG. 22. Here, the value of the time synchronization availability flag set for the user terminal 20 to which the eKey 40-3 is issued is recorded in the time synchronization availability flag 4010.

Note that other components included in the lock control device 10-3 are substantially similar to the first embodiment. Also, the configurations of the user terminal 20 and the server 30 are substantially similar to the first embodiment.

<3-4. Operation>

In the above, the configuration according to the third embodiment has been described. Next, the operation according to the third embodiment will be described.

Here, the "operation of the unlocking process" according to the third embodiment will be described. This operation is an alternative operation to the operation according to the first embodiment (illustrated in FIGS. 15 and 16). Note that other types of operations are similar to the first embodiment illustrated in FIGS. 6 to 14 and FIG. 17, and therefore the description will be omitted.

[3-4-1. Operation of Unlocking Process]

Figure 33:
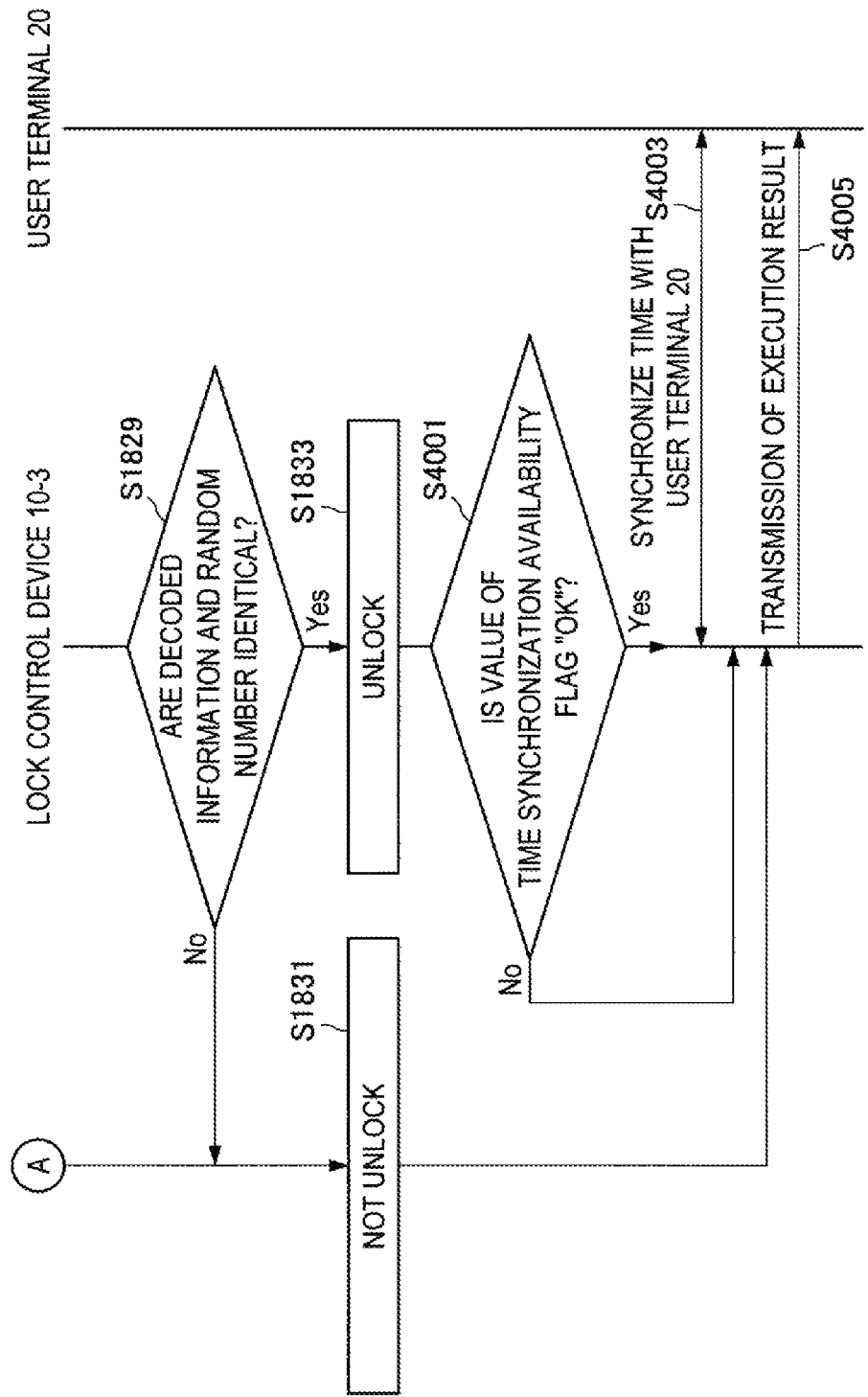
FIG. 33 is a sequence diagram illustrating a part of an operation of an unlocking process according to the same embodiment.

FIG. 33 is a sequence diagram illustrating a part of "operation of the unlocking process" according to the third embodiment. Note that the operation from S1801 to S1829 illustrated in FIGS. 15 to 16 is similar to the first embodiment, and therefore the description is omitted partially in FIG. 33. In the following, only the operation after S1829 will be described.

Figure 16:
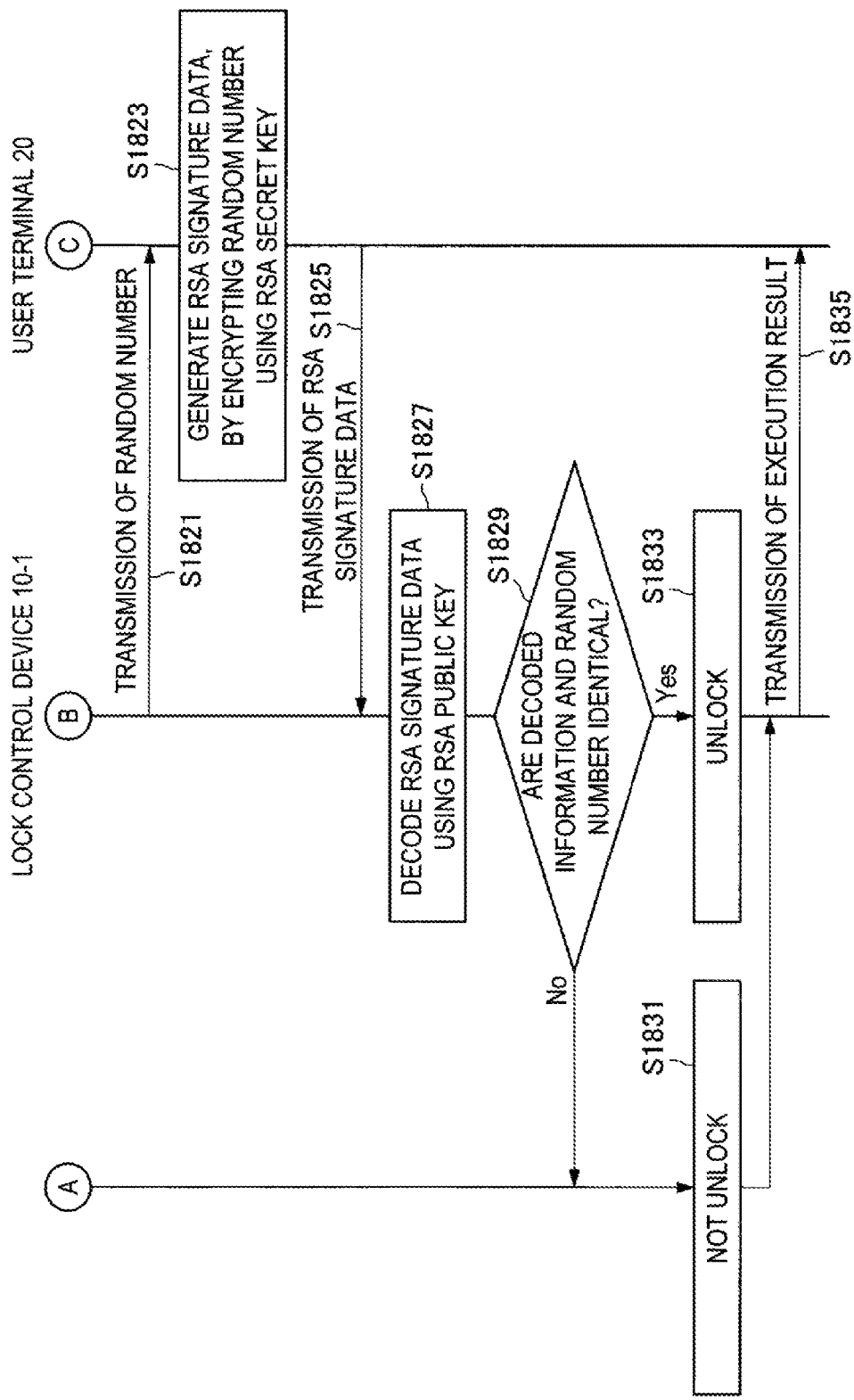
FIG. 16 is a sequence diagram illustrating a part of an operation of the unlocking process according to the same embodiment.

In S1829, if the information decoded in S1827 illustrated in FIG. 16 and the random number generated in S1821 illustrated in FIG. 16 are identical with each other (S1829: Yes), the determination unit 106 of the lock control device 10-3 decides to unlock. Then, the locking control unit 108 causes the locking unit 132 to unlock (S1833).

Subsequently, the date and time information changing unit 116 determines whether or not the value of the time synchronization availability flag included in the eKey received in S1805 illustrated in FIG. 15 is "OK" (S4001). If the value of the time synchronization availability flag is not "OK" (S4001: No), the lock control device 10-3 performs the operation of S4005 described later.

On the other hand, if the value of the time synchronization availability flag is "OK" (S4001: Yes), the date and time information changing unit 116 synchronizes the date and time information of the lock control device 10-3, with the date and time information managed by the user terminal 20 (S4005). Thereby, the date and time information of the lock control device 10-3 is corrected to be the same as the date and time information of the user terminal 20.

Thereafter, the transmission control unit 112 causes the communication unit 130 to transmit the execution result of S1831 or S1833 to the user terminal 20 (S4005).

<3-5. Effect>

In the above, as described with reference to FIGS. 31 to 33, the lock control device 10-3 according to the third embodiment determines the availability or unavailability of the change of the date and time information of the lock control device 10-3 on the basis of the time synchronization availability flag included in the eKey received from the user terminal 20, and then authorizes the change of the date and time information of the lock control device 10-3 by the user terminal 20 in a case where the time synchronization availability flag indicates "OK".

Hence, the date and time information of the lock control device 10-3 can be prevented from being changed by the user terminal 20 of the user 2 to whom the authority of the time correction is not given. For example, the risk of the date and time information being changed to incorrect date and time by the malicious user 2 can be decreased

4. Fourth Embodiment

<4-1. Background>

In the above, the third embodiment has been described. Next, the fourth embodiment will be described. First, the background that has lead up to creating the fourth embodiment will be described.

[4-1-1. Background 1]

In general, it is desirable that the door is unlockable with small burden for the user 2 having the unlocking right. In the publicly known technology, as the first method, a technology is proposed in which the user 2 activates a predetermined application implemented in the carried terminal, and then performs the unlocking operation in the application. However, in this method, the application is to be activated at each trial of unlocking the door, and the work load of the user 2 is large.

Also, as the second method, the method that automatically unlocks, in a case where it is detected that the user 2 having the unlocking right has approached the door is proposed. However, in this method, there is a risk of unlocking even in a case where the user 2 is actually at a position slightly away from the door. As a result, there is a risk of intrusion into a room by the malicious person.

[4-1-2. Background 2]

Also, another problem is described below. In a case where there are a plurality of user terminals 20 having the unlocking right of the same lock control device 10-1, it is envisaged that a situation occurs in which a plurality of user terminals 20 approaches the lock control device 10-1 and then requests unlocking within a substantially same time period. In this case, there is a risk of occurrence of an event in which, while a specific user terminal 20a performs some sort of communication with the lock control device 10-1, another user terminals 20b is unable to communicate with the lock control device 10-1 so as not to unlock for a certain amount of time. In particular, the communication amount increases in a case where secure communication is performed between the lock control device 10-1 and the user terminal 20 for the unlocking process, and therefore the above problem is likely to occur.

As a result, there is a risk that the user 2 of another user terminal 20b is forced to wait for a certain amount of time until unlocked, and feels stress.

As described later, with the lock control device 10-4 according to the fourth embodiment, the user 2 having the unlocking right can unlock securely, without operating the application. Also, the time during which the user 2 is forced to wait in front of the door at the time of the unlocking operation is shortened.

<4-2. System Configuration>

Figure 34:
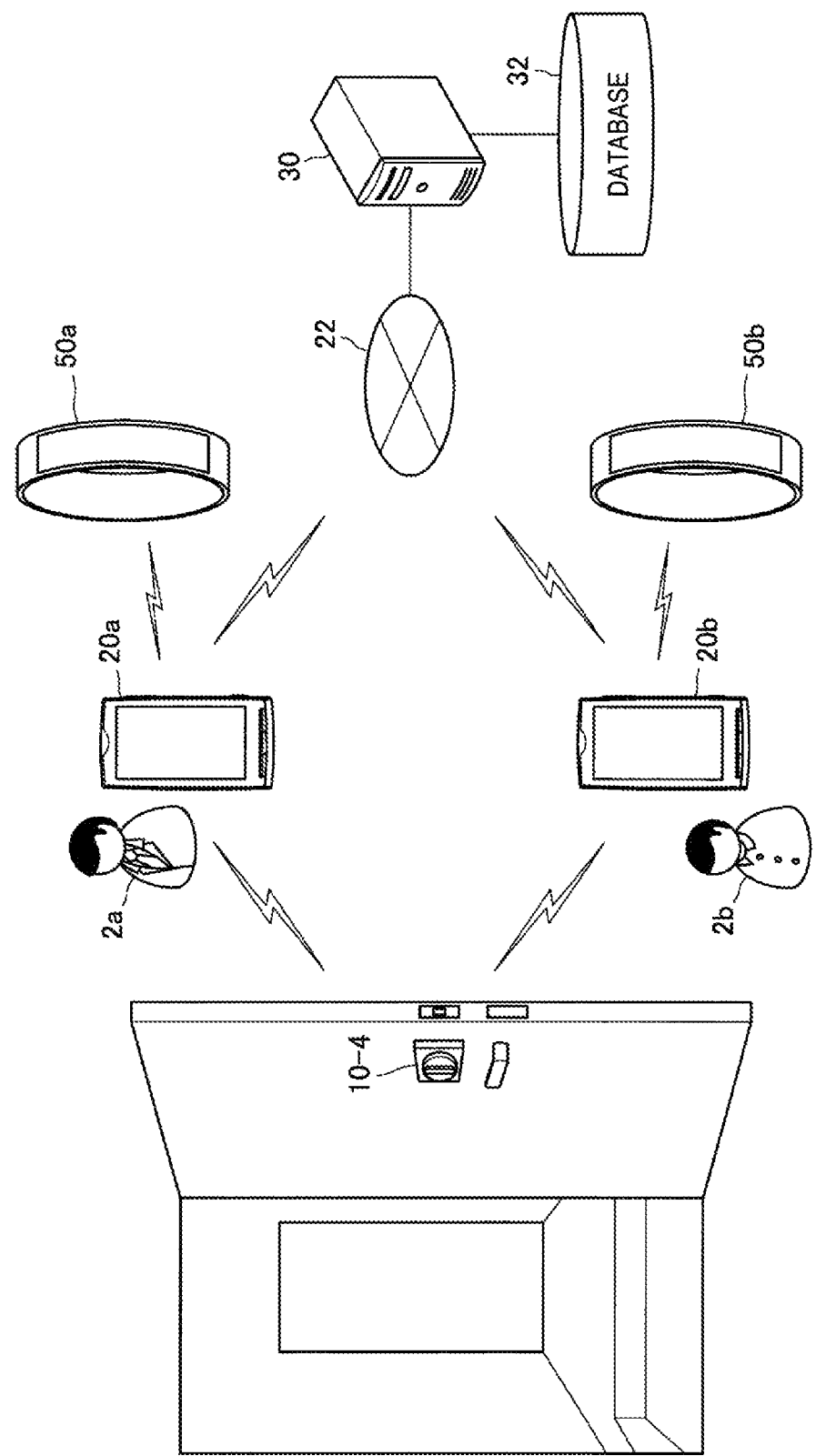
FIG. 34 is an explanatory diagram illustrating an exemplary configuration of an information processing system according to a fourth embodiment of the present disclosure.

First, with reference to FIG. 34, the system configuration according to the fourth embodiment will be described. As illustrated in FIG. 34, the information processing system according to the fourth embodiment further includes a wearable device 50, as compared with the first embodiment illustrated in FIG. 1.

[4-2-1. Wearable Device 50]

The wearable device 50 is a device of a watch type for example, which the user 2 can wear on the body. This wearable device 50 includes an acceleration sensor for example, and is capable of measuring the acceleration of the wearable device 50.

Also, the wearable device 50 includes a display unit having a touch panel, and is capable of displaying a display screen image.

Note that other components are substantially similar to the first embodiment.

<4-3. Configuration>

[4-3-1. Lock Control Device 10-4]

Figure 35:
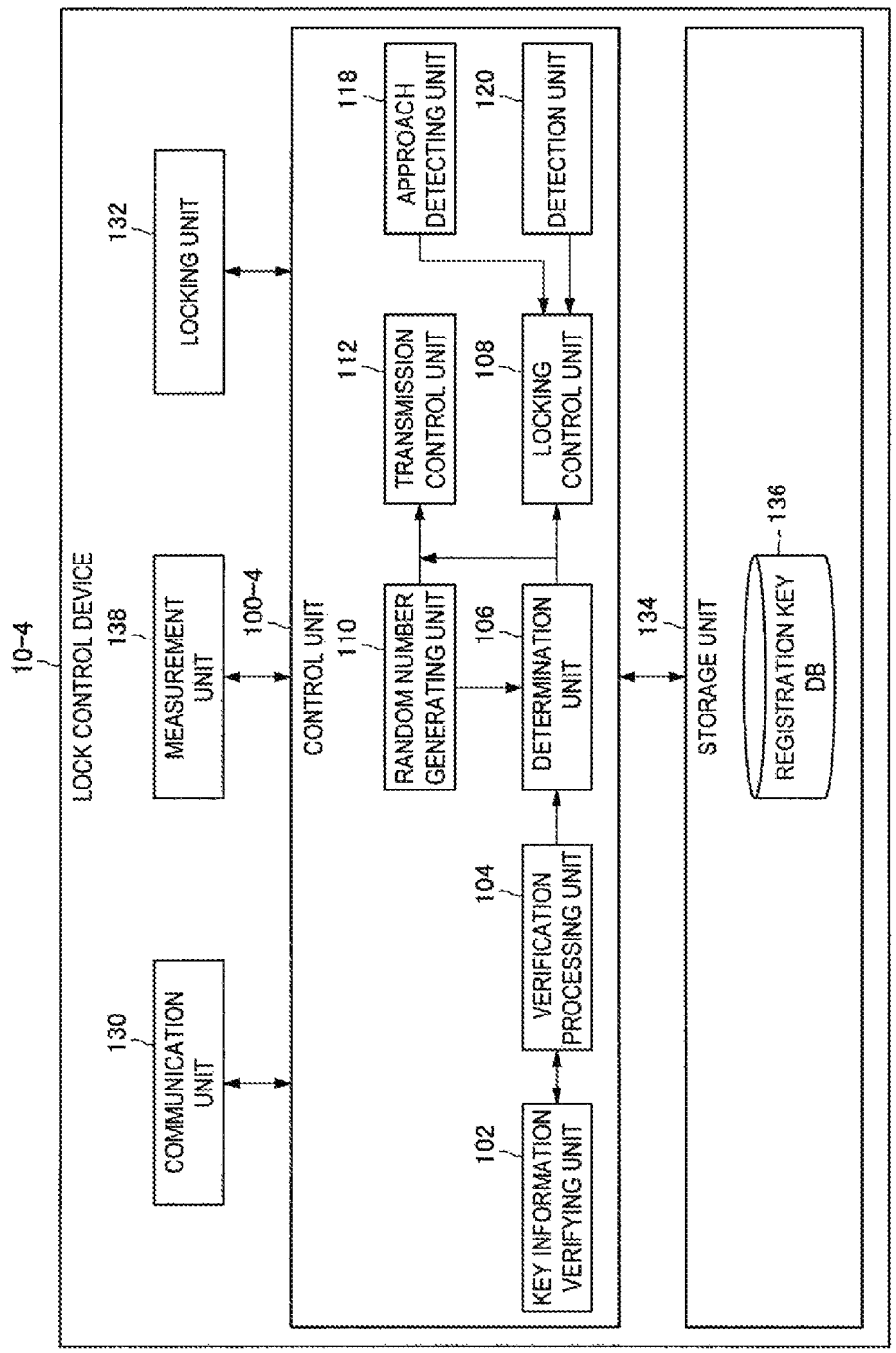
FIG. 35 is a functional block diagram illustrating an exemplary configuration of a lock control device 10-4 according to the same embodiment.

In the above, the configuration of the information processing system according to the fourth embodiment has been described. Next, the configuration according to the fourth embodiment will be described in detail. FIG. 35 is a functional block diagram illustrating the configuration of the lock control device 10-4 according to the fourth embodiment. As illustrated in FIG. 35, the lock control device 10-4 according to the fourth embodiment includes a control unit 100-4, instead of the control unit 100-1, as compared with the lock control device 10-1 illustrated in FIG. 2. Also, the lock control device 10-4 further includes a measurement unit 138.

(4-3-1-1. Control Unit 100-4)

The control unit 100-4 further includes an approach detecting unit 118 and a detection unit 120, as compared with the control unit 100-1 according to the first embodiment.

(4-3-1-2. Approach Detecting Unit 118)

The approach detecting unit 118 detects the approach of the user terminal 20 to the lock control device 10-4. For example, the approach detecting unit 118 detects the approach of the user terminal 20, on the basis of the strength of the radio wave of a predetermined standard, such as Bluetooth, which is received from the user terminal 20. More specifically, the approach detecting unit 118 determines that the user terminal 20 approaches the lock control device 10-4, in a case where it is detected that the strength of the received radio wave increases gradually. Also, the approach detecting unit 118 determines that the user terminal 20 is going away from the lock control device 10-4, in a case where it is detected that the strength of the received radio wave decreases gradually.

Alternatively, the approach detecting unit 118 is also capable of detecting whether or not the user terminal 20 approaches the lock control device 10-4, on the basis of the position information of the user terminal 20 received from the user terminal 20, for example. For example, the approach detecting unit 118 may detect whether or not the user terminal 20 approaches the lock control device 10-4, by receiving from the user terminal 20 the position information of the user terminal 20 identified from the positioning signal received from the positioning satellite such as the global positioning system (GPS), at predetermined time intervals. Alternatively, the approach detecting unit 118 may detect whether or not the user terminal 20 approaches the lock control device 10-4, by receiving from the user terminal 20 the position information of the transmitter transmitted by the transmitter installed indoors, for example.

(4-3-1-2. Detection Unit 120)

The detection unit 120 detects the unlocking request by the user 2 of the user terminal 20, in a case where the detection result of the vibration or the ambient sound measured by the measurement unit 138 described later satisfies a predetermined condition. For example, the detection unit 120 detects the unlocking request, in a case where it is detected that the door is knocked by the user 2, on the basis of the measurement result of the vibration by the measurement unit 138. Alternatively, the detection unit 120 detects the unlocking request, in a case where a predetermined information is received from the wearable device 50 worn by the user 2.

Note that the wearable device 50 may transmit to the lock control device 10-4 the above predetermined information, in a case where a predetermined operating state such as shaking repetitively in the vertical direction by the user 2 is detected for example. Alternatively, the wearable device 50 may transmit the above predetermined information to the lock control device 10-4, in a case where the user has tapped the display screen image.

Also, as an exemplary variant, the detection unit 120 may detect the unlocking request, in a case where the vibration time point measured by the measurement unit 138 and the vibration time point detected by the wearable device 50, which are received from the wearable device 50, are identical with each other. Also, the detection unit 120 may detect the unlocking request, in a case where it is detected that the door is knocked by the user 2 the number of knocking times set in advance, on the basis of the measurement result of the vibration by the measurement unit 138. According to these exemplary variants, since the unlocking request can be detected more appropriately, the security can be improved.

(4-3-1-3. Locking Control Unit 108)

—Control Example 1—

The locking control unit 108 according to the fourth embodiment executes preprocessing among the processes for unlocking, in a case where the approach detecting unit 118 detects that the user terminal 20 approaches within a predetermined range from the lock control device 10-4, for example. Here, the preprocessing is a process that takes a large amount of time among the processes for unlocking. For example, the preprocessing is the process other than the unlocking among the operations of the unlocking processes illustrated in FIGS. 15 to 16. As one example, the preprocessing may be the processes from S1801 to S1821.

Also, in a case where the approach detecting unit 118 further detects the approach of another user terminal 20b while executing the preprocessing of the user terminal 20a, the locking control unit 108 executes the preprocessing corresponding to the other user terminal 20b, after the end of the preprocessing of the user terminal 20a.

—Control Example 2—

Also, in a case where the preprocessing ends, and the detection unit 120 detects the unlocking request, the locking control unit 108 executes the unlocking control process among the processes for unlocking. For example, in a case where the preprocessing of the user terminal 20a ends, and the unlocking request by the user terminal 20a is detected by the detection unit 120 while the locking control unit 108 is executing the preprocessing corresponding to another user terminal 20b, first, the locking control unit 108 temporarily halts the preprocessing corresponding to the other user terminal 20b. Then, the locking control unit 108 executes the unlocking control process corresponding to the user terminal 20a.

Figure 36:
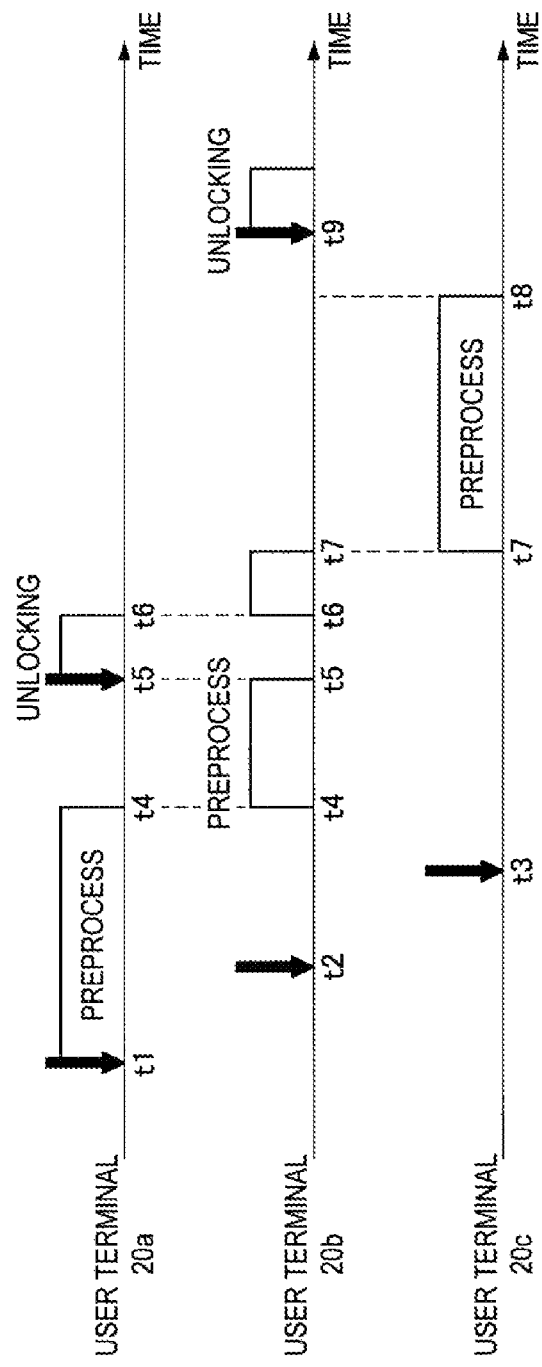
FIG. 36 is an explanatory diagram illustrating a flow of a process relevant to an individual user terminal 20 that has approached the lock control device 10-4 according to the same embodiment.

Here, with reference to FIG. 36, the above function will be described in more detail. FIG. 36 is an explanatory diagram illustrating the flow of the process by the locking control unit 108, with respect to the user terminals 20a to 20c that have approached the lock control device 10-4. As illustrated in FIG. 36, first, it is assumed that the approach detecting unit 118 has detected at time "t1" that the user terminal 20a has approached the lock control device 10-4. In this case, the locking control unit 108 starts the preprocessing of the user terminal 20a at the time "t1". Note that, as illustrated in FIG. 36, the preprocessing is a process that takes a certain amount of time, such as from the time "t1" to "t4", for example.

Then, it is assumed that the approach detecting unit 118 has detected that the user terminal 20b has approached to the lock control device 10-4, at time "t2", while the locking control unit 108 is executing the preprocessing of the user terminal 20a. In this case, the locking control unit 108 puts into a queue the identification information such as the device ID received from the user terminal 20b for example, and then causes the user terminal 20b to wait.

Further, it is assumed that the approach detecting unit 118 has detected that the user terminal 20c has approached to the lock control device 10-4 at time "t3", while continuing the preprocessing of the user terminal 20a. In this case, the locking control unit 108 puts into the queue the identification information of the user terminal 20c, and then causes the user terminal 20c to wait, similarly.

Thereafter, it is assumed that the preprocessing of the user terminal 20a ends at the time "t4". In this case, the locking control unit 108 takes out the identification number from the head of the queue, and then starts the preprocessing of the user terminal 20 (i.e., the user terminal 20b) corresponding to the identification number that is taken out.

Thereafter, it is assumed that the detection unit 120 has detected the unlocking request from the user terminal 20a, at time "t5", while the locking control unit 108 is executing the preprocessing of the user terminal 20b. In this case, the locking control unit 108 temporarily halts the preprocessing of the user terminal 20b, and then starts the unlocking control process of the user terminal 20a. Then, when the unlocking control process of the user terminal 20a ends at time "t6", the locking control unit 108 restarts the halting preprocessing of the user terminal 20b.

(4-3-1-4. Measurement Unit 138)

The measurement unit 138 measures various types of information, by an acceleration sensor, a geomagnetic sensor, or a microphone for example, which is included in the lock control device 10-4. For example, the measurement unit 138 measures acceleration of the lock control device 10-4, and ambient sound and the like.

Note that other components included in the lock control device 10-4 are substantially similar to the first embodiment. Also, the configuration of the user terminal 20 and the server 30 are substantially similar to the first embodiment.

<4-4. Operation>

In the above, the configuration according to the fourth embodiment has been described. Next, the operation according to the fourth embodiment will be described with reference to FIGS. 37 to 39. Note that, here, the operation in a situation of unlocking request by the user terminal 20 will be described. More specifically, to the lock control device 10-4, an exemplary operation in a case where first the user terminal 20a approaches the lock control device 10-4, and thereafter another user terminal 20b approaches the lock control device 10-4 will be described.

Note that other types of operations are similar to the first embodiment illustrated in FIGS. 6 to 17, and therefore the description will be omitted.

[4-4-1. Overall Operation]

Figure 37:
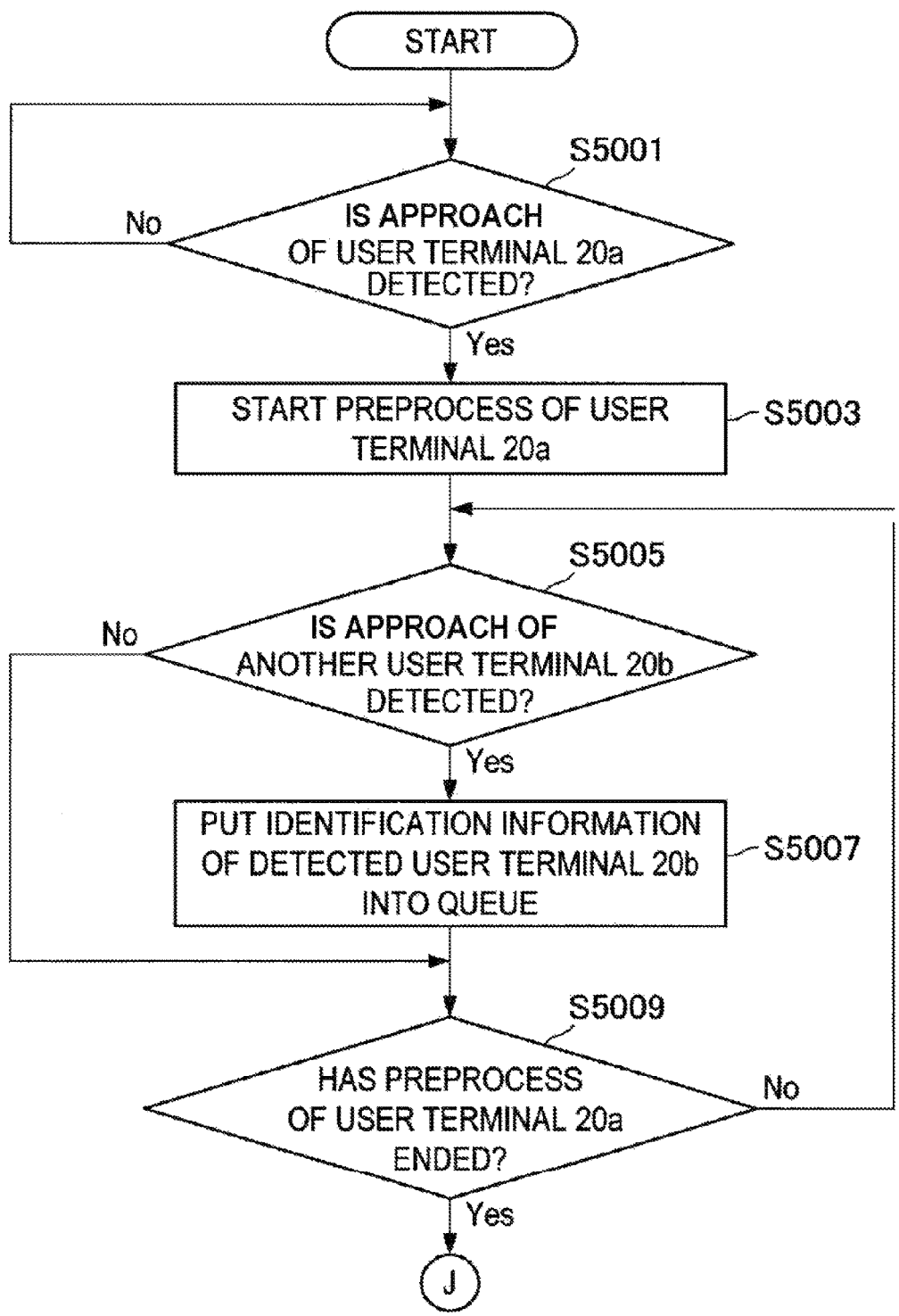
FIG. 37 is a flowchart illustrating a part of an operation according to the same embodiment.

As illustrated in FIG. 37, first, the locking control unit 108 of the lock control device 10-4 waits until the approach detecting unit 118 detects the approach of one of the user terminals 20 (S5001).

Then, if the approach detecting unit 118 detects the approach of the user terminal 20a (S5001: Yes), the locking control unit 108 starts the preprocessing of the user terminal 20a (S5003).

Thereafter, if the approach detecting unit 118 detects the approach of another user terminal 20b during the preprocessing of the user terminal 20a (S5005: Yes), the locking control unit 108 puts the identification information of the detected user terminal 20b into the queue (S5007).

Then, the locking control unit 108 repeats the process of S5005 to S5007, until the preprocessing of the user terminal 20a ends.

Figure 38:
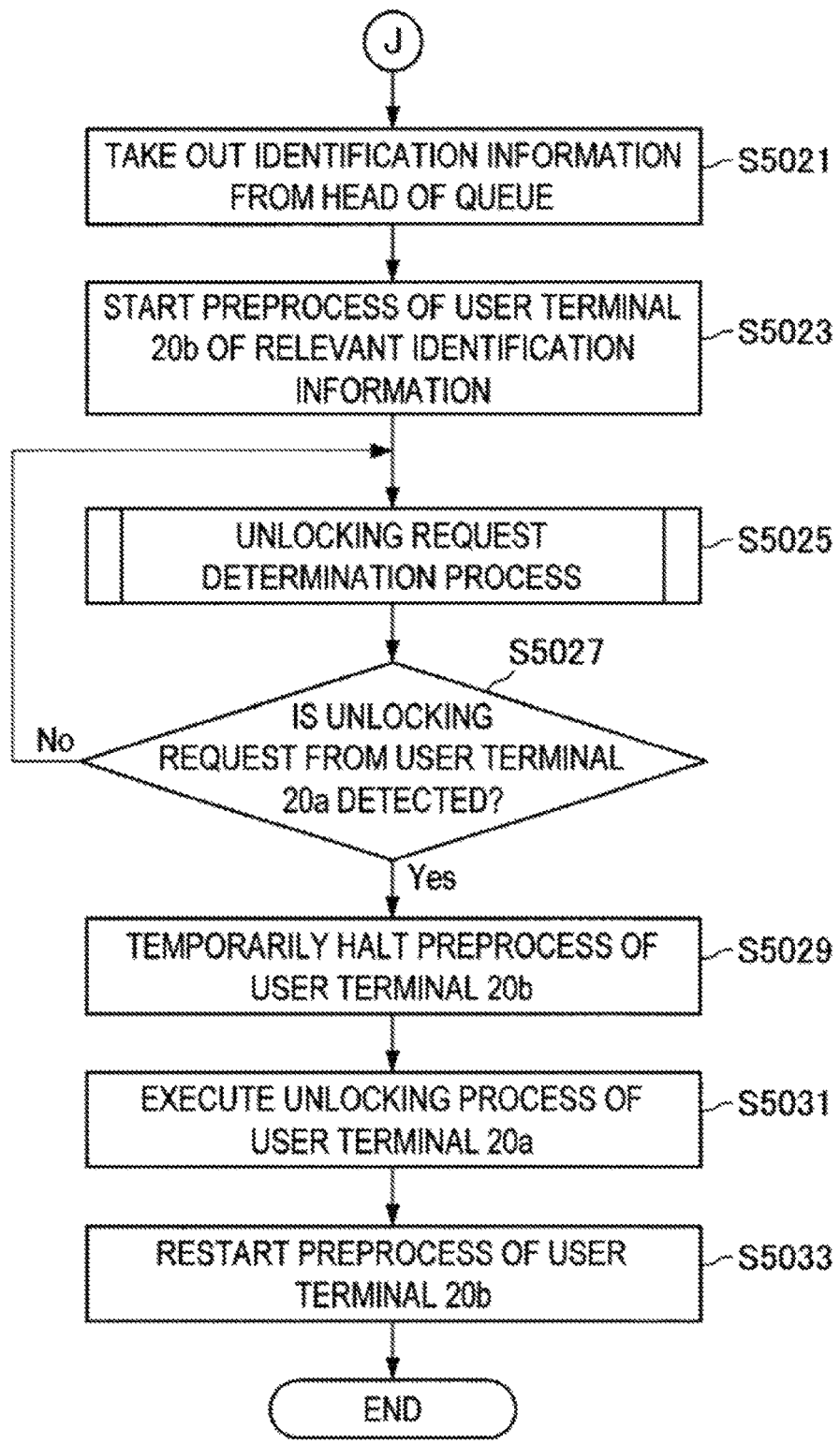
FIG. 38 is a flowchart illustrating a part of an operation according to the same embodiment.

Here, with reference to FIG. 38, the operation after S5007 will be described. If the preprocessing of the user terminal 20a ends after S5007 (S5009: Yes), the locking control unit 108 takes out the identification information at the head, among the identification information put into the queue (S5021).

Subsequently, the locking control unit 108 starts the preprocessing corresponding to the user terminal 20b of the identification information taken out in S5021 (S5023).

Then, the locking control unit 108 performs the "unlocking request determination process" described later (S5025). Thereafter, until the detection unit 120 detects the unlocking request from the user terminal 20a, the locking control unit 108 repeats the process of S5025.

If the unlocking request from the user terminal 20a is detected by the detection unit 120 in S5025 (S5027: Yes), the locking control unit 108 temporarily halts the preprocessing of the user terminal 20b (S5029).

Subsequently, the locking control unit 108 executes the unlocking control process of the user terminal 20a (S5031).

Thereafter, the locking control unit 108 restarts the preprocessing of the user terminal 20b that temporarily halts in S5029 (S5033).

[4-4-2. Unlocking Request Determination Process]

Next, with reference to FIG. 39, the operation of the "unlocking request determination process" in S5025 will be described in detail.

Figure 39:
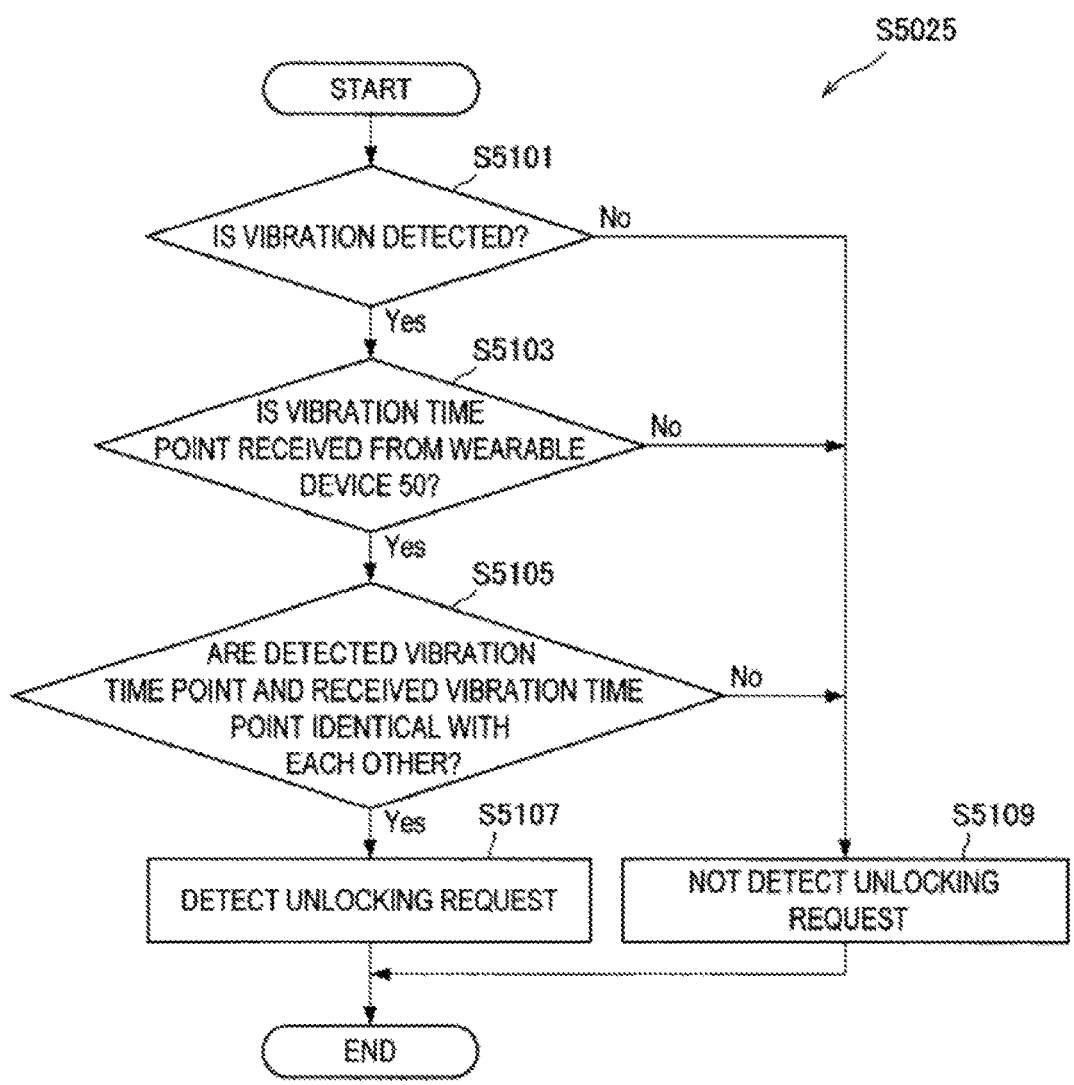
FIG. 39 is a flowchart illustrating an operation of an unlocking request determination process according to the same embodiment.

As illustrated in FIG. 39, first, the detection unit 120 of the lock control device 10-4 determines whether or not vibration is detected, on the basis of the measurement result of the acceleration by the measurement unit 138 (S5101). If the vibration is not detected (S5101: No), the detection unit 120 performs the operation of S5109 described later.

On the other hand, if the vibration is detected (S5101: Yes), the detection unit 120 waits for a predetermined time for example, until the vibration time point detected by the wearable device 50 is received from the wearable device 50 (S5103). If the vibration time point is not received (S5103: No), the detection unit 120 performs the operation of S5109 described later.

On the other hand, if the detected vibration time point is received from the wearable device 50 (S5103: Yes), the detection unit 120 determines whether or not the vibration time point detected in S5101 and the received vibration time point are identical with each other (S5105).

If the vibration time points are identical with each other (S5105: Yes), the detection unit 120 detects the unlocking request from the user terminal 20a (S5107). On the other hand, if the vibration time points are not identical with each other (S5105: No), the detection unit 120 does not detect the unlocking request (S5109).

<4-5. Effect>

[4-5-1. Effect 1]

In the above, as described with reference to FIGS. 35 to 39 for example, the lock control device 10-4 according to the fourth embodiment executes the preprocessing among the processes for unlocking, in a case where it is detected that the user terminal 20 approaches. Then, in a case where the preprocessing ends, and the unlocking request from the user terminal 20 is detected, the lock control device 10-4 executes the unlocking control process among the processes for unlocking.

Hence, the lock control device 10-4 executes the preprocessing beforehand, and therefore it is sufficient that only the remaining process (i.e., the unlocking control process) among the processes for unlocking be executed at the time of the unlocking request, and the process ends in a short time. Thus, the time during which the user 2 is forced to wait in front of the door is shortened at the time of the unlocking request.

Also, in a case where the unlocking request by the user terminal 20a for which the preprocessing has ended already is detected while executing the preprocessing of the user terminal 20b, the lock control device 10-4 temporarily halts the preprocessing of the user terminal 20b, and then executes the unlocking control process of the user terminal 20a. Hence, even in a case where a plurality of user terminals 20 approach the lock control device 10-4 within a same time period, unlocking is performed promptly upon unlocking operation by the user 2 of the user terminal 20a. Hence, the user 2 is forced to wait little for unlocking, and does not feel the stress.

[4-5-2. Effect 2]

Also, according to the fourth embodiment, the user can perform the unlocking operation, by shaking the wearable device 50 or by tapping the wearable device 50, for example. Hence, the user is needless to activate the application in the user terminal 20 at each trial of unlocking the door for example, and thus the work load is reduced.

[4-5-3. Effect 3]

Also, as long as the unlocking request from the user terminal 20 is not detected, the lock control device 10-4 does not execute the unlocking control process, and therefore the safety of the unlocking improves, as compared with the publicly known key less entry technology, for example. For example, in a case where the user is positioned away from the door, the door is prevented from being unlocked without intention of the user.

<4-6. Exemplary Variant>

Note that the following exemplary variant is applicable, in a case where the lock control device 10-4 and the user terminal 20 communicate in accordance with Bluetooth. For example, in a case where the detection unit 120 has not detected the unlocking request by the user terminal 20a for which the preprocessing has ended already, and the preprocessing currently executed for another user terminal 20b ends, the locking control unit 108 may return the connection of Bluetooth from the user terminal 20b to the user terminal 20a.

Normally, the connection of Bluetooth takes a certain amount of time. According to this exemplary variant, the connection of Bluetooth is returned in advance to the user terminal 20a for which the preprocessing has ended previously, so that the lock control device 10-4 can execute the unlocking control process corresponding to the user terminal 20a in shorter time, in a case where the unlocking request by the user terminal 20a is detected.

5. Fifth Embodiment

<5-1. Background>

In the above, the fourth embodiment has been described. Next, the fifth embodiment will be described. First, the background that has lead up to creating the fifth embodiment will be described.

In general, it is desirable that the door is automatically locked at an appropriate time point, after unlocked transiently. In the publicly known technology, there is proposed a method for automatically locking, when a predetermined time has passed since the door is unlocked. However, in this method, there is a risk that the locking process is performed with the door open, in a case where the user keeps the door open.

As described later, a lock control device 10-5 according to the fifth embodiment can lock automatically at an appropriate time point.

<5-2. System Configuration>

The system configuration according to the fifth embodiment is similar to the first embodiment illustrated in FIG. 1 or FIG. 18.

<5-3. Configuration>

[5-3-1. Lock Control Device 10-5]

Figure 40:
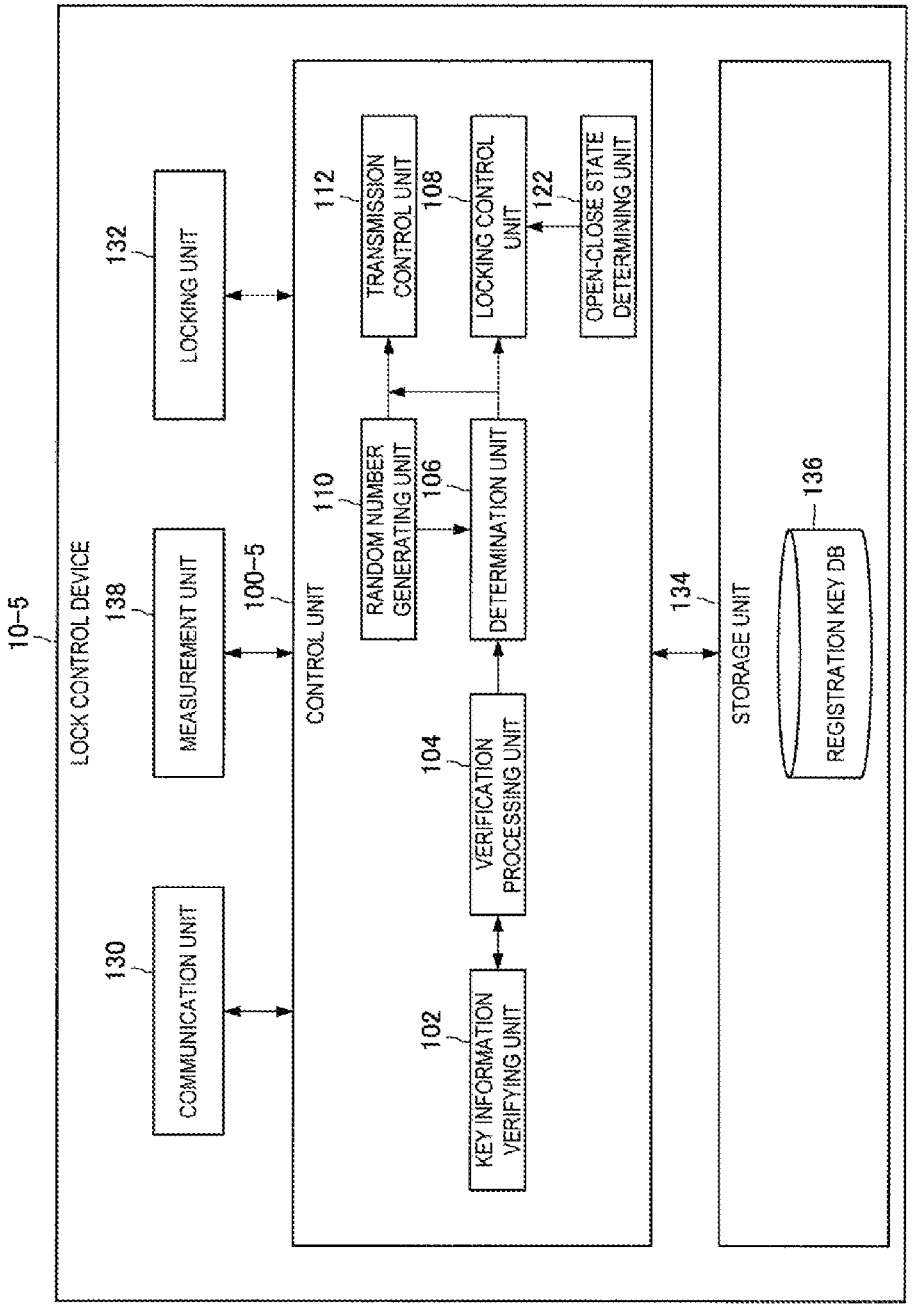
FIG. 40 is a functional block diagram illustrating an exemplary configuration of a lock control device 10-5 according to a fifth embodiment of the present disclosure.

Next, the configuration according to the fifth embodiment will be described in detail. FIG. 40 is a functional block diagram illustrating the configuration of the lock control device 10-5 according to the fifth embodiment. As illustrated in FIG. 40, the lock control device 10-5 according to the fifth embodiment includes a control unit 100-5, instead of the control unit 100-1, as compared with the lock control device 10-1 illustrated in FIG. 2. Also, the lock control device 10-5 further includes the measurement unit 138.

(5-3-1-1. Control Unit 100-5)

The control unit 100-5 further includes an open-close state determining unit 122, as compared with the control unit 100-1 according to the first embodiment.

(5-3-1-2. Open-Close State Determining Unit 122)

The open-close state determining unit 122 determines whether or not the door in which the lock control device 10-5 is installed is closed, on the basis of the measurement result measured by the measurement unit 138. For example, the open-close state determining unit 122 determines that the door is moving, in a case where the acceleration measured by the measurement unit 138 is a value equal to or larger than a predetermined threshold value.

Also, the open-close state determining unit 122 determines whether or not the door is closed, by comparing a value of geomagnetism measured by the measurement unit 138 with a measured value of geomagnetism of a door closing state, which is stored in the storage unit 134 for example. More specifically, the open-close state determining unit 122 determines that the door is closed, in a case where the difference between the measured value of geomagnetism of the door closed state and the value of geomagnetism measured by the measurement unit 138 is within a predetermined range. Also, the open-close state determining unit 122 determines that the door is open in a case where the above difference is out of the predetermined range.

Exemplary Variant

Note that, as an exemplary variant, the open-close state determining unit 122 is also capable of determining whether or not the installation state of the lock control device 10-5 is abnormal, on the basis of the measurement result by the measurement unit 138. For example, when the measurement unit 138 measures an acceleration of a value within a predetermined range, the open-close state determining unit 122 may determine that the lock control device 10-5 is falling from the door installed. Further, the open-close state determining unit 122 is also capable of discriminating the installation orientation of the lock control device 10-5 on the basis of the direction of the gravity force measured by the measurement unit 138. For example, in a case where the lock control device 10-5 is installed on the door with a double-faced adhesive tape, the installation orientation of the lock control device 10-5 can change. Thus, in a case where the discriminated installation orientation of the lock control device 10-5 is shifted from a predetermined direction, the open-close state determining unit 122 may determine that the installation state of the lock control device 10-5 is abnormal.

(5-3-1-3. Locking Control Unit 108)

The locking control unit 108 according to the fifth embodiment causes the locking unit 132 to lock, in a case where a predetermined time has passed after causing the locking unit 132 to unlock for example, and the open-close state determining unit 122 determines that the door is closed.

(5-3-1-4. Transmission Control Unit 112)

In a case where a predetermined time has passed since the open-close state determining unit 122 determines that the door is open, the transmission control unit 112 according to the fifth embodiment is capable of causing the communication unit 130 to transmit the notification of the warning to the user terminal 20. According to this transmission example, the user can be warned that the door is kept open for a long time.

Note that the function of the measurement unit 138 is similar to the fourth embodiment. Also, other components included in the lock control device 10-5 are substantially similar to the first embodiment. Also, the configurations of the user terminal 20 and the server 30 are substantially similar to the first embodiment.

<5-4. Operation>

In the above, the configuration according to the fifth embodiment has been described. Next, the operation according to the fifth embodiment will be described with reference to FIG. 41. Note that, here, the operation at the time unlocking and locking of the door will be described. Other types of operations are similar to the first embodiment illustrated in FIGS. 6 to 17, and therefore the description will be omitted.

Figure 41:
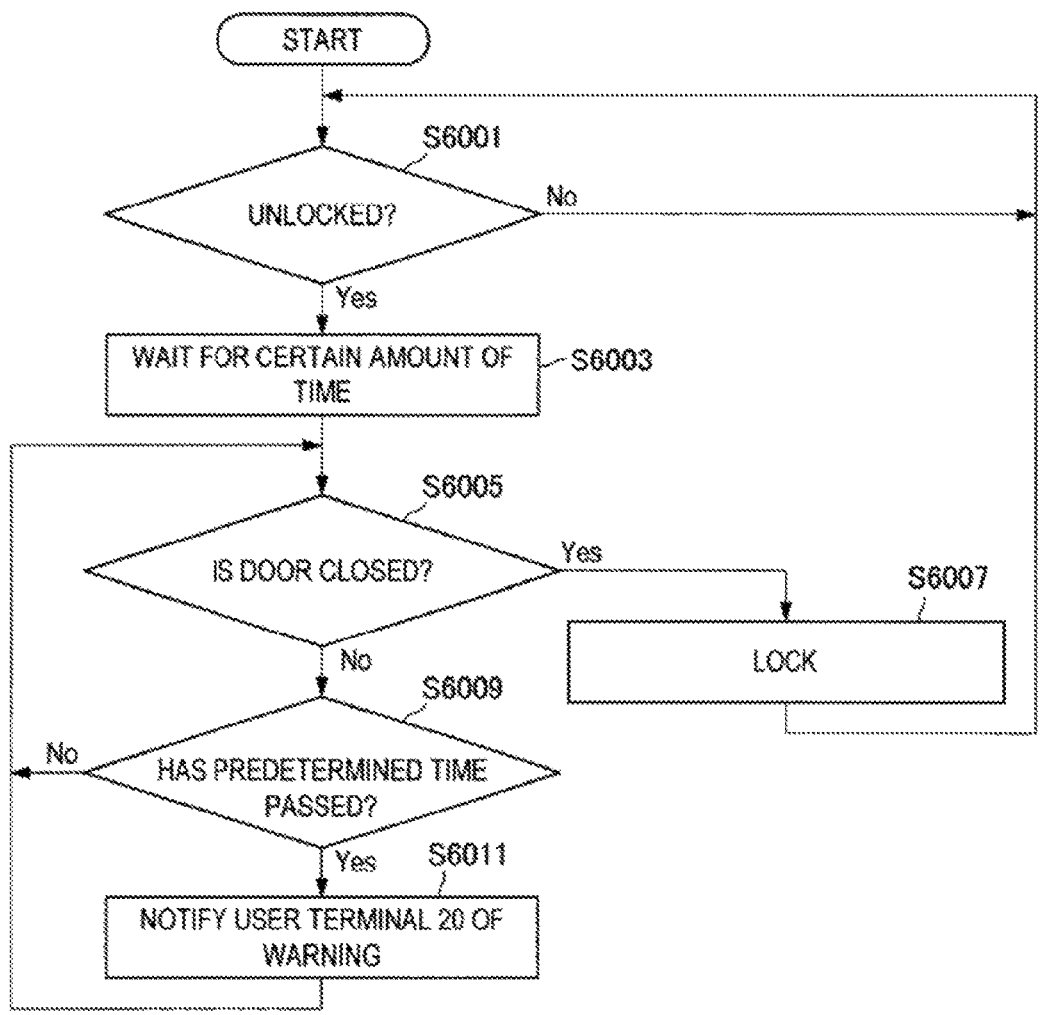
FIG. 41 is a flowchart illustrating an operation according to the same embodiment.

As illustrated in FIG. 41, first, the locking control unit 108 of the lock control device 10-5 waits until unlocked by the locking unit 132 (for example, until the operation of S1833 illustrated in FIG. 16 is performed) (S6001).

Then, if unlocked (S6001: Yes), the locking control unit 108 waits for a certain amount of time. Note that, during this, the open-close state determining unit 122 determines on a regular basis whether or not the door in which the lock control device 10-5 is installed is closed (S6003).

Subsequently, the locking control unit 108 confirms whether or not the open-close state determining unit 122 determines that the door is closed at present moment (S6005). If it is determined that the door is closed (S6005: Yes), the locking control unit 108 causes the locking unit 132 to lock (S6007). Thereafter, the lock control device 10-5 performs the operation of S6001 again.

On the other hand, if it is determined the door is open (S6005: No), the locking control unit 108 repeats the operation of S6005, until a predetermined time passes.

Then, if the predetermined time passes (S6009: Yes), the transmission control unit 112 causes the communication unit 130 to transmit the notification of the warning to the user terminal 20 (S6011).

Thereafter, the lock control device 10-5 performs the operation of S6005 again.

<5-5. Effect>

In the above, as described with reference to FIGS. 40 and 41, the lock control device 10-5 according to the fifth embodiment automatically locks in a case where a predetermined time has passed after unlocking for example, and it is determined that the door in which the lock control device 10-5 is installed is closed.

Hence, automatic lock is enabled only when the door is closed. Also, the door in an open state can be prevented from being locked.

<5-6. Exemplary Variant>

Note that, as an exemplary variant of the fifth embodiment, a magnet may be installed on a wall adjacent to the lock control device 10-5. According to this exemplary variant, the difference between the measurement result of geomagnetism when the door is open and the measurement result of geomagnetism when the door is closed is considered to become larger. Thus, the lock control device 10-5 can determine the open-close state of the door more accurately.

Also, in the above description, an example in which, in a case where it is determined that the door is open for a long time, the lock control device 10-5 transmits the notification of the warning to the user terminal 20 has been described, but is not limited to such an example. For example, in the above case, the lock control device 10-5 may sound a buzzer.

6. Sixth Embodiment

<6-1. Background>

In the above, the fifth embodiment has been described. Next, the sixth embodiment will be described. First, the background that has lead up to creating the sixth embodiment will be described.

In a situation where the lock control device 10-1 wirelessly communicates with the user terminal 20 and authenticates the user terminal 20 to execute the unlocking process, the user 2 of the user terminal 20 does not interact with the lock control device 10-1 physically at all. Hence, without notifying the user by some sort of mechanism that the lock control device 10-1 is reacting, the user 2 cannot understand the situation of the lock control device 10-1, such as the lock control device 10-1 communicating with the user terminal 20, and the lock control device 10-1 malfunctioning, for example.

In the publicly known technology, there is proposed a method in which the lock control device is installed outside the door, to inform the user of the situation of the lock control device, by a display mechanism such as a light emitting diode (LED) or a display. However, when the lock control device is installed outside the door, there is a risk that the lock control device is stolen by a malicious person.

Also, as another method, there is a method in which the lock control device is installed inside the door, and a display device for informing the user of the situation of the lock control device is further installed outside the door. However, in this method, the cost for manufacturing and installing the device is large.

As described later, even in a case where a lock control device 10-6 is installed inside the door, the lock control device 10-6 according to the sixth embodiment is capable of notifying the user of the situation of the process.

<6-2. System Configuration>

The system configuration according to the sixth embodiment is similar to the first embodiment illustrated in FIG. 1 or FIG. 18.

<6-3. Configuration>

[6-3-1. Lock Control Device 10-6]

Figure 42:
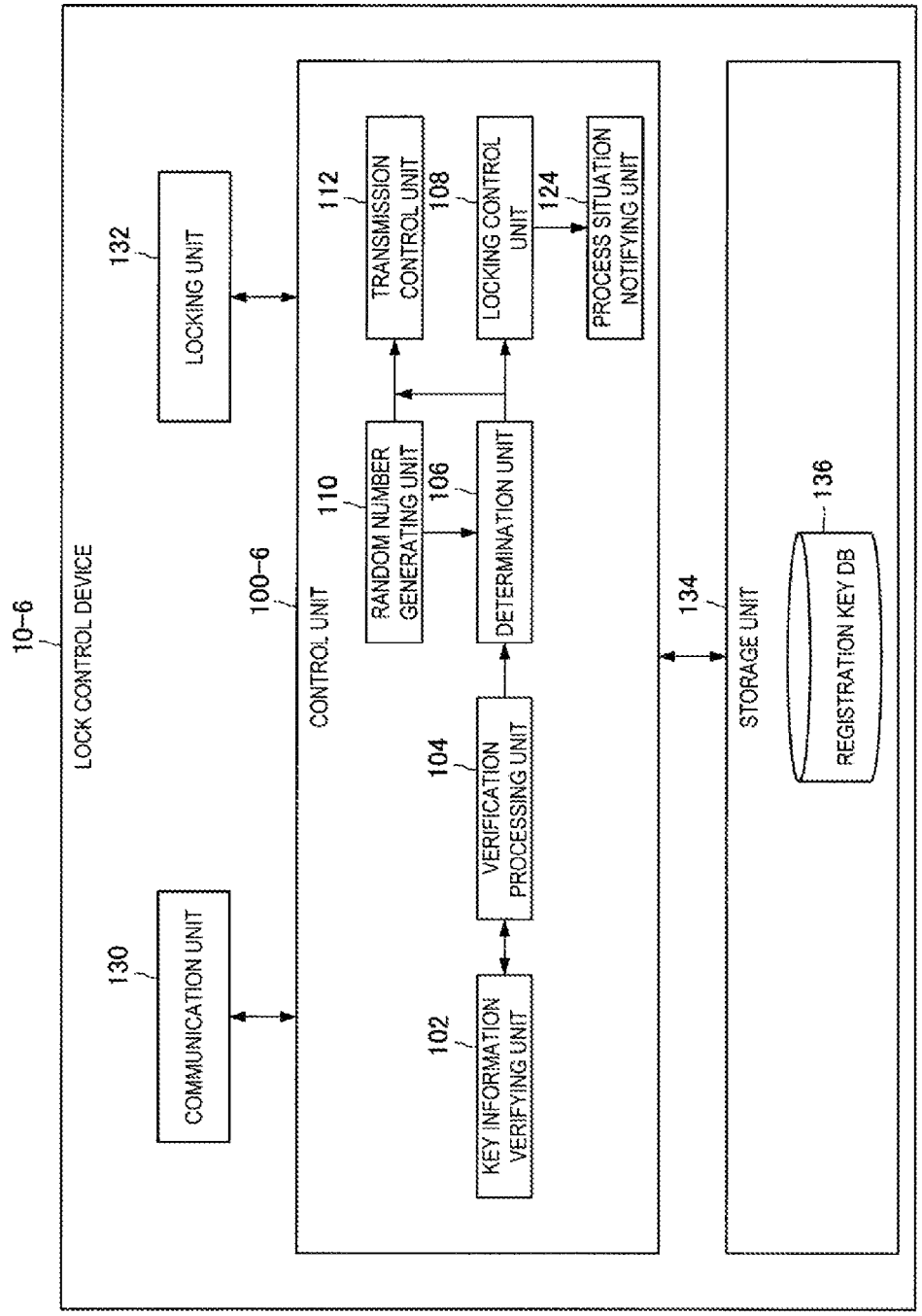
FIG. 42 is a functional block diagram illustrating an exemplary configuration of a lock control device 10-6 according to a sixth embodiment of the present disclosure.

Next, the configuration according to the sixth embodiment will be described in detail. FIG. 42 is a functional block diagram illustrating the configuration of the lock control device 10-6 according to the sixth embodiment. As illustrated in FIG. 42, the lock control device 10-6 according to the sixth embodiment includes a control unit 100-6, instead of the control unit 100-1, as compared with the lock control device 10-1 illustrated in FIG. 2.

(6-3-1-1. Control Unit 100-6)

The control unit 100-6 further includes a process situation notifying unit 124, as compared with the control unit 100-1 according to the first embodiment.

(6-3-1-2. Process Situation Notifying Unit 124)

The process situation notifying unit 124 causes the communication unit 130 to transmit to the relevant user terminal 20 the process situation notification indicating the process situation by the locking control unit 108, at a predetermined time point. For example, each time a to-be-notified event occurs while the locking control unit 108 executes the process for unlocking, the process situation notifying unit 124 causes the communication unit 130 to transmit to the relevant user terminal 20 a process situation notification indicating the content of the to-be-notified event that has occurred.

Here, the process for unlocking is similar to the fourth embodiment. Also, for example, the to-be-notified event may be "the lock control device 10-6 and the user terminal 20 becomes connectable to each other", "the lock control device 10-6 and the user terminal 20 have actually connected to each other", "the authentication process of the user terminal 20 is ongoing", "the authentication process of the user terminal 20 is completed", or, "the unlocking is completed". Note that, "having actually connected" refers to execution of a bond process in BLE, for example.

Note that other components included in the lock control device 10-6 are substantially similar to the first embodiment.

[6-3-2. User Terminal 20]

Next, the configuration of the user terminal 20 according to the sixth embodiment will be described.

(6-3-2-1. Control Unit 200)

On the basis of the process situation notification received from the lock control device 10-6, the control unit 200 according to the sixth embodiment outputs the received process situation notification. For example, the control unit 200 causes the user terminal 20 or the wearable device 50 to vibrate, in a case where the received process situation notification is a predetermined notification. Also, the control unit 200 displays the content of the received process situation notification on the display screen, in a case where the received process situation notification is other than the predetermined notification. Here, the predetermined notification may be a notification indicating "having actually connected" for example. According to such a configuration, the vibration of the user terminal 20 or the wearable device 50 prompts the user to confirm the display screen image. Also, the vibration event is only once, and therefore there is little risk that the user feels discomfort.

Note that other components included in the user terminal 20 are substantially similar to the first embodiment. Also, the configuration of the server 30 is substantially similar to the first embodiment.

<6-4. Operation>

In the above, the configuration according to the sixth embodiment has been described. Next, the operation according to the sixth embodiment will be described with reference to FIG. 43. Note that, here, the operation at the time of the unlocking processing will be described. Other types of operations are similar to the first embodiment illustrated in FIGS. 6 to 17, and therefore the description will be omitted. Also, the operation illustrated in FIG. 43 is assumed to be performed on a regular basis at predetermined time intervals.

Figure 43:
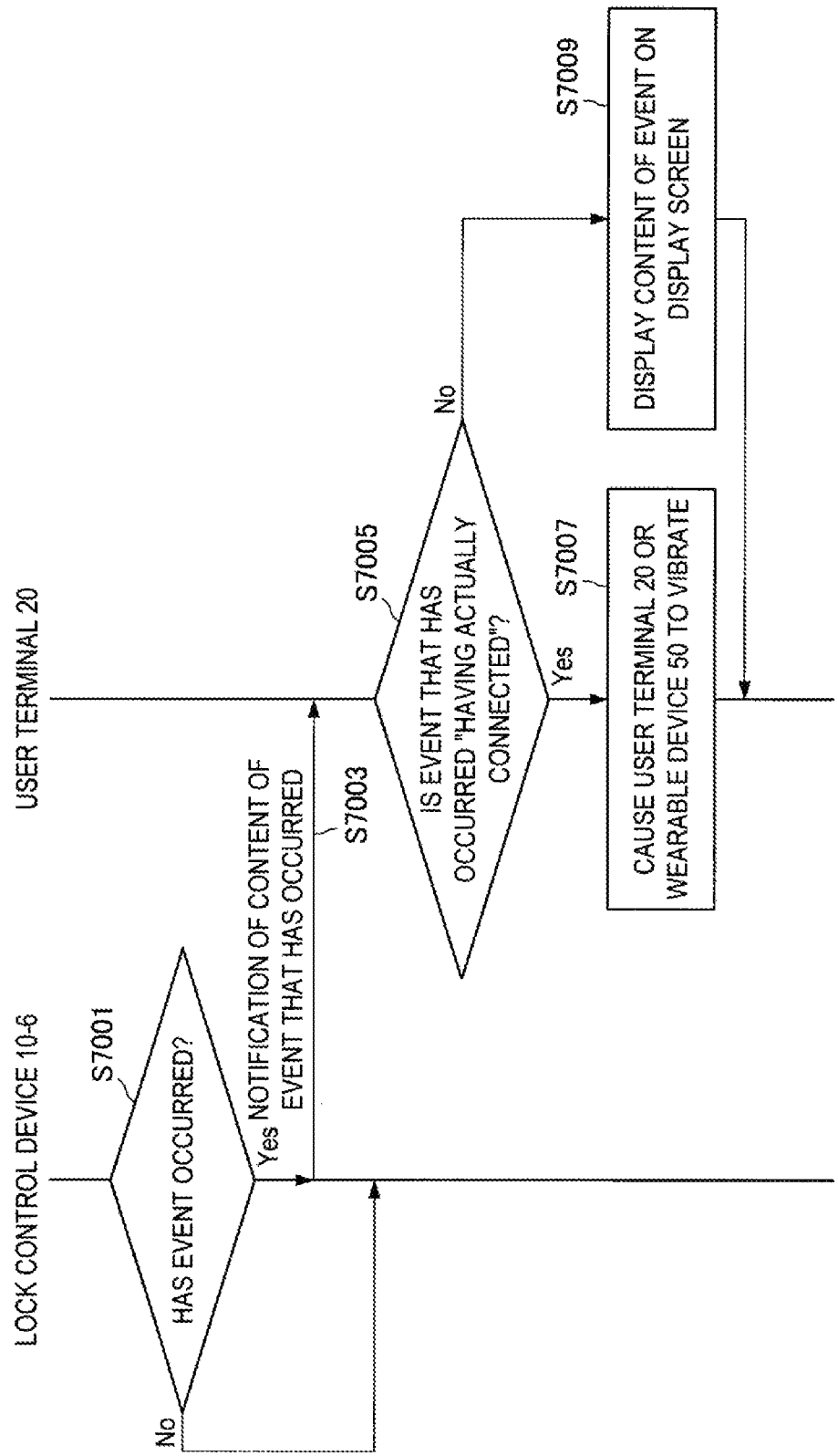
FIG. 43 is a sequence diagram illustrating an operation according to the same embodiment.

As illustrated in FIG. 43, first, the process situation notifying unit 124 of the lock control device 10-6 confirms the process situation of the lock control device 10-6, and confirms whether or not the to-be-notified event has occurred (S7001). If the to-be-notified event has occurred (S7001: Yes), the process situation notifying unit 124 causes the communication unit 130 to transmit to the relevant user terminal 20 a process situation notification indicating the content of the to-be-notified event (S7003).

Thereafter, the control unit 200 of the user terminal 20 determines whether or not the process situation notification received in S7003 is a predetermined notification (S7005). If the received process situation notification is the predetermined notification (S7005: Yes), the control unit 200 causes the user terminal 20 or the wearable device 50 (worn by the user 2 of the user terminal 20) to vibrate (S7007).

On the other hand, if the received process situation notification is other than the predetermined notification (S7005: No), the control unit 200 displays the content of the received process situation notification on the display screen (S7009).

<6-5. Effect>

In the above, as described with reference to FIGS. 42 and 43, each time the to-be-notified event occurs, the lock control device 10-6 according to the sixth embodiment transmits to the relevant user terminal 20 the process situation notification indicating the content of the to-be-notified event that has occurred. Hence, even in a case where the lock control device 10-6 is installed inside the door (i.e., inside a room), the user can be notified of the situation of the lock control device 10-6.

As a result, the lock control device 10-6 is needless to be installed outside the door, and therefore there is little risk that the lock control device 10-6 is stolen. Also, for example, a display device for informing the user of the situation of the lock control device 10-6 is needless to be installed, and therefore the cost for manufacturing and installing the device can be reduced.

7. Seventh Embodiment

<7-1. Background>

In the above, the sixth embodiment has been described. Next, the seventh embodiment will be described. First, the background that has lead up to creating the seventh embodiment will be described.

Normally, a battery such as a dry cell battery and a secondary battery is utilized in many cases, as a power supply of the lock control device such as the lock control device 10-1. Hence, when the battery electric power remaining level becomes insufficient, the lock control device becomes unusable, and therefore it is desirable to notify the user of the appropriate battery exchange time point.

However, the consumption of the dry cell battery is affected largely by ambient temperature for example, and therefore, the battery lifetime of the dry cell battery is generally difficult to predict. Hence, there is a risk that the battery lifetime ends earlier than the predicted lifetime.

Also, with regard to the rechargeable dry cell battery, there is a problem that the lock control device is unusable without a substitute battery, while charging the battery.

Also, a method in which the lock control device includes a built-in rechargeable battery can be considered, but in this method, charging work is inconvenient for the user. For example, the user is to perform work such as wiring a charge cable between a lock control device and an electricity outlet.

As described later, a lock control device 10-7 according to the seventh embodiment is capable of notifying the user of an appropriate exchange time point of the battery.

<7-2. System Configuration>

The system configuration according to the seventh embodiment is similar to the first embodiment illustrated in FIG. 1 or FIG. 18.

<7-3. Configuration>

[7-3-1. Lock Control Device 10-7]

Figure 44:
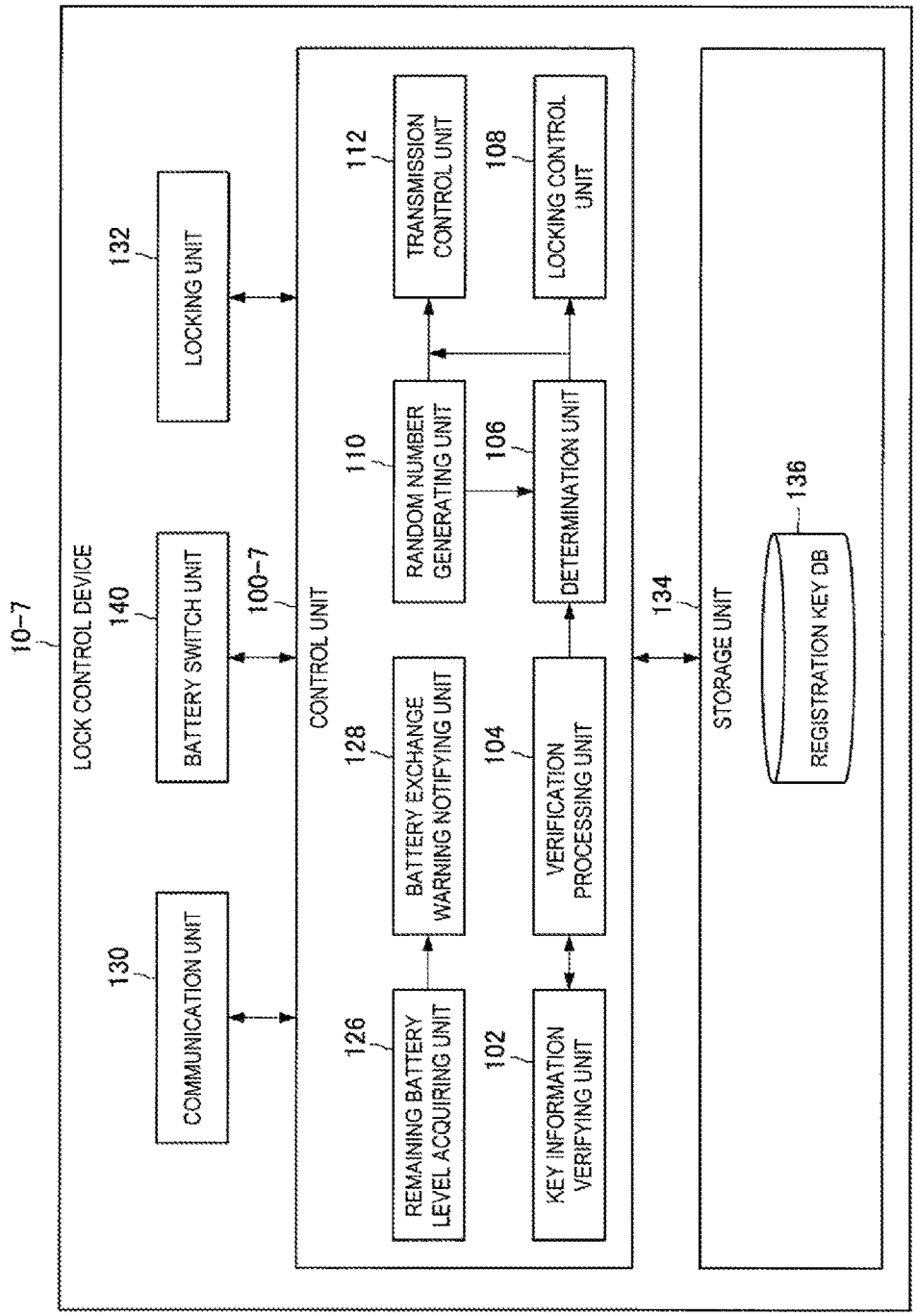
FIG. 44 is a functional block diagram illustrating an exemplary configuration of a lock control device 10-7 according to a seventh embodiment of the present disclosure.

Next, the configuration according to the seventh embodiment will be described in detail. FIG. 44 is a functional block diagram illustrating the configuration of the lock control device 10-7 according to the seventh embodiment. As illustrated in FIG. 44, the lock control device 10-7 according to the seventh embodiment includes a control unit 100-7, instead of the control unit 100-1, as compared with the lock control device 10-1 illustrated in FIG. 2. Also, the lock control device 10-7 further includes a battery switch unit 140.

Also, although not illustrated in FIG. 44, the lock control device 10-7 includes two types of batteries, which are a first battery and a second battery. Here, the first battery is a battery in use, and the second battery is an auxiliary battery for backup. Also, the first battery and the second battery can be batteries of the same type. Also, the first battery and the second battery may be a dry cell battery such as a lithium dry cell battery or a battery such as a secondary battery, for example.

(7-3-1-1. Control Unit 100-7)

The control unit 100-7 further includes a remaining battery level acquiring unit 126 and a battery exchange warning notifying unit 128, as compared with the control unit 100-1 according to the first embodiment.

(7-3-1-2. Remaining Battery Level Acquiring Unit 126)

The remaining battery level acquiring unit 126 acquires information indicating the remaining level of the first battery, from the first battery for example. Note that, in a case where the first battery is the dry cell battery, the information indicating the above remaining level may be the information indicating whether or not the voltage equal to or larger than a threshold value is measured, for example.

(7-3-1-3. Battery Exchange Warning Notifying Unit 128)

In a case where the information acquired by the remaining battery level acquiring unit 126 indicates that the remaining level of the first battery has become equal to or smaller than the predetermined threshold value, the battery exchange warning notifying unit 128 causes the communication unit 130 to transmit a warning notification for battery exchange to the user terminal 20. For example, in the above case and until the first battery is exchanged, the battery exchange warning notifying unit 128 may cause the communication unit 130 to transmit the warning notification for battery exchange to the user terminal 20 on a regular basis.

Here, the predetermined threshold value may be the minimum electric power level to activate the lock control device 10-7 normally, for example. Also, a predetermined threshold value may be "0".

(7-3-1-4. Battery Switch Unit 140)

In a case where the information acquired by the remaining battery level acquiring unit 126 indicates that the remaining level of the first battery has become equal to or smaller than a predetermined threshold value, the battery switch unit 140 switches the battery to use, from the first battery to the second battery.

Note that other components included in the lock control device 10-7 are substantially similar to the first embodiment.

[7-3-2. User Terminal 20]

Next, the configuration of the user terminal 20 according to the seventh embodiment will be described.

(7-3-2-1. Display Control Unit 210)

In a case where the warning notification for battery exchange is received from the lock control device 10-7, the display control unit 210 according to the seventh embodiment causes the operation display unit 222 to display the received warning notification. For example, the display control unit 210 may cause the operation display unit 222 to display the warning notification continuously in a pop-up manner, until selected by the user, for example.

Also, the display control unit 210 is capable of causing the operation display unit 222 to further display a menu screen image for the user 2 to order a battery, in a case where the warning notification displayed on the display screen is selected by the user 2.

Note that other components included in the user terminal 20 are substantially similar to the first embodiment. Also, the configuration of the server 30 is substantially similar to the first embodiment.

<7-4. Operation>

In the above, the configuration according to the seventh embodiment has been described. Next, the operation according to the seventh embodiment will be described with reference to FIG. 45. Note that this operation is performed on a regular basis at predetermined time intervals, while the lock control device 10-7 is activated, for example. Also, other types of operations are similar to the first embodiment illustrated in FIGS. 6 to 17, and therefore the description will be omitted.

As illustrated in FIG. 45, first, the remaining battery level acquiring unit 126 of the lock control device 10-7 acquires the information indicating the remaining level of the first battery, from the first battery for example. Then, the battery switch unit 140 confirms whether or not the remaining level indicated by the acquired information is equal to or smaller than a predetermined threshold value (S8001). If the remaining level has not become equal to or smaller than the predetermined threshold value (S8001: No), the lock control device 10-7 performs the operation of S8009 described later.

On the other hand, if the remaining level is equal to or smaller than the predetermined threshold value (S8001: Yes), the battery switch unit 140 switches the battery to use, from the first battery to the second battery (S8003). Then, the battery exchange warning notifying unit 128 causes the communication unit 130 to transmit the warning notification for battery exchange to the user terminal 20 (S8005).

Thereafter, the display control unit 210 of the user terminal 20 causes the operation display unit 222 to display the warning notification received in S8005. Further, if the displayed warning notification is selected by the user, the display control unit 210 causes the operation display unit 222 to display a battery order menu (S8007).

Thereafter, the lock control device 10-7 waits for a certain amount of time (S8009). Thereafter, the lock control device 10-7 repeats the operation of S8001 again.

<7-5. Effect>

[7-5-1. Effect 1]

In the above, as described with reference to FIGS. 44 and 45, in a case where it is detected that the remaining level of the first battery has become equal to or smaller than a predetermined threshold value, the lock control device 10-7 according to the seventh embodiment automatically switches the battery to use, from the first battery to the auxiliary second battery. Hence, occurrence of remaining battery level insufficiency can be prevented, and the lock control device 10-7 can be activated for a long time in a stabilized manner.

[7-5-2. Effect 2]

Also, in a case where it is detected that the remaining level of the first battery has become equal to or smaller than a predetermined threshold value, the lock control device 10-7 transmits the warning notification to the user terminal 20. Hence, the lock control device 10-7 can prompt the user to exchange the battery at an appropriate time point. As a result, for example, inefficient battery exchange by the user, such as user's exchange of a dry cell battery which is still usable, can be avoided.

Also, the user terminal 20 is capable of causing the operation display unit 222 to display the battery order menu in association with the received warning notification. Hence, the user 2 can also perform order and payment of the battery in the relevant application, enhancing convenience for the user.

8. Modification Example

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

In above each embodiment, an example in which the lock control device 10-1 to the lock control device 10-7 are installed in a door at an entrance of a house has been described mainly, but embodiments are not limited to such examples. The lock control device 10-1 to the lock control device 10-7 can be installed in various types of doors, such as a door of a locker installed in an airport, a station, or the like, and a door of a car, for example. Also, it may be applied to a locking mechanism of a bicycle or the like.

Also, the steps in the operation of above each embodiment are needless to be executed in the described order. For example, the steps may be executed in the order changed as appropriate. Also, the steps may be executed in parallel or individually in part, instead of being executed in temporal sequence.

Also, according to above each embodiment, a computer program for causing a processor such as a CPU and hardware such as a RAM to exercise a function equivalent to each configuration of the above lock control device 10-1 may be provided. Also, a recording medium storing the computer program is provided.

Additionally, the present technology may also be configured as below.

(1)

An information processing apparatus including:

a communication unit configured to receive an unlocking request and first information generated on the basis of a first secret key, from a first communication terminal; and a determination unit configured to determine whether or not to cause a locking unit to unlock, on the basis of a first public key corresponding to the first secret key and the generated first information.

(2)

The information processing apparatus according to (1), further including:

a verification processing unit configured to verify the generated first information on the basis of the first public key, in which the determination unit determines whether or not to cause the locking unit to unlock, on the basis of a verification result of the generated first information.

(3)

The information processing apparatus according to (2), in which in a case where the verification processing unit verifies that the generated first information is rightful, the determination unit determines to cause the locking unit to unlock.

(4)

The information processing apparatus according to (2) or (3), in which the communication unit further receives first key information including the first public key and signature information for the first public key by a second communication terminal, the information processing apparatus further includes a key verifying unit configured to verify rightfulness of the first public key on the basis of the signature information for the first public key, and the determination unit further determines whether or not to cause the locking unit to unlock, on the basis of a verification result obtained by the key verifying unit.

(5)

The information processing apparatus according to (4), in which in a case where it is verified that the first public key is rightful, the determination unit determines to cause the locking unit to unlock.

(6)

The information processing apparatus according to (4) or (5), in which the signature information for the first public key is information in which a digital signature is created for the first public key using a second secret key associated with the second communication terminal, the verification processing unit further verifies the signature information for the first public key on the basis of a second public key corresponding to the second secret key, and the key verifying unit verifies whether or not the first public key is rightful on the basis of a verification result of the signature information for the first public key and the first public key.

(7)

The information processing apparatus according to (6), further including: a storage unit configured to store the second public key.

(8)

The information processing apparatus according to any one of (1) to 6, further including:

a storage unit configured to store a first algorithm and a second algorithm, in which the first public key and the first secret key are each information based on the first algorithm.

(9)

The information processing apparatus according to (8), in which a third public key and a third secret key corresponding to the third public key are each information based on the second algorithm, the communication unit further receives first information generated on the basis of the third secret key, from the first communication terminal, and the determination unit determines whether or not to cause the locking unit to unlock, on the basis of the third public key and the first information generated on the basis of the third secret key.

(10)

The information processing apparatus according to (8) or (9), in which the communication unit further receives a change request from the first algorithm to the second algorithm, from the first communication terminal, and the information processing apparatus further includes an algorithm switch unit configured to stop using the first algorithm in a case where the change request is received.

(11)

The information processing apparatus according to any one of (4) to (7), in which the first key information further includes date and time changing authority information indicating presence or absence of authority for changing date and time information managed by the information processing apparatus, and the information processing apparatus further includes a date and time information changing unit configured to determine availability or unavailability of change of the date and time information by the first communication terminal, on the basis of the date and time changing authority information included in the first key information.

(12)

The information processing apparatus according to any one of (1) to (11), further including:

the locking unit.

(13)

An information processing method including:

receiving an unlocking request and first information generated on the basis of a first secret key, from a first communication terminal; and determining whether or not to cause a locking unit to unlock, on the basis of a first public key corresponding to the first secret key and the generated first information.

(14)

A program for causing a computer to function as:

a communication unit configured to receive an unlocking request and first information generated on the basis of a first secret key, from a first communication terminal; and a determination unit configured to determine whether or not to cause a locking unit to unlock, on the basis of a first public key corresponding to the first secret key and the generated first information.

(15)

An information processing system including:

a first communication terminal; and an information processing apparatus, in which the information processing apparatus includes a communication unit configured to receive an unlocking request and first information generated on the basis of a first secret key, from the first communication terminal, and a determination unit configured to determine whether or not to cause a locking unit to unlock, on the basis of a first public key corresponding to the first secret key and the generated first information.

(16)

The information processing system according to (15), further including:

a second communication terminal; and a management device, in which the second communication terminal transmits, to the first communication terminal, second information and link information to the management device, the first communication terminal transmits the second information to the management device to thereby receive first key information from the management device, and the first key information includes signature information for the first public key by the second communication terminal.

(17)

The information processing system according to (16), in which in a case where the second information is received from the first communication terminal, the management device transmits a request for issuing the first key information to the second communication terminal, and in a case where the request for issuing the first key information is received from the management device, the second communication terminal transmits the first key information to the management device.

(18)

The information processing system according to (16) or (17), in which the first key information further includes rank information indicating a rank of a user of the first communication terminal, and the rank information included in the first key information indicates a rank lower than a rank of a user of the second communication terminal.

(19)

The information processing system according to (18), in which the user of the second communication terminal is an administrator of the information processing apparatus.

(20)

The information processing system according to any one of (15) to (19), further including:

a third communication terminal; and a management device, in which a fourth public key is associated with the third communication terminal, the first communication terminal transmits, to the third communication terminal, third information and link information to the management device, the third communication terminal transmits the third information to the management device to thereby receive third key information from the management device, and the third key information includes signature information for the fourth public key by the first communication terminal.

REFERENCE SIGNS LIST 10-1 to 10-7 lock control device
20 user terminal
22 communication network
30 server
32 database
50 wearable device
100-1 to 100-7 control unit
102 key information verifying unit
104 verification processing unit
106 determination unit
108 locking control unit
110 random number generating unit
112 transmission control unit
114 algorithm switch unit
116 date and time information changing unit
118 approach detecting unit
120 detection unit
122 open-close state determining unit
124 process situation notifying unit
126 remaining battery level acquiring unit
128 battery exchange warning notifying unit
130 communication unit
132 locking unit
134 storage unit
136 registration key DB
138 measurement unit
140 battery switch unit
200 control unit
202 cipher generating unit
204 key information issuing unit 206 transmission control unit
208 invitation e-mail generating unit
210 display control unit
220 communication unit
222 operation display unit
224 storage unit
300 control unit
302 key information issuance requesting unit
304 transmission control unit
306 random number generating unit
308 verification processing unit
310 verifying unit
320 communication unit
322 storage unit

The invention claimed is:

1. An information processing apparatus comprising:
circuitry configured to:
detect a first approach of a first communication terminal;
perform a preprocess of the first communication terminal as a condition that the first approach is detected;
detect a second approach of a second communication terminal while the circuity is performing the preprocess of the first communication terminal.

2. The information processing apparatus according to claim 1, wherein
the preprocess is an authentication process for unlocking.

3. The information processing apparatus according to claim 2, wherein
the authentication process includes a verification of whether or not a public key corresponding to a secret key is rightful.

4. The information processing apparatus according to claim 1, wherein the circuitry configured to:
put identification information of the second communication terminal, for which the second approach is detected, into queue.

5. The information processing apparatus according to claim 4, wherein the preprocess is a first preprocess, the circuitry configured to:
perform a second preprocess of the second communication terminal based on the identification information.

6. The information processing apparatus according to claim 5, wherein the circuitry configured to:
halt the second preprocess as a condition that a unlocking request is detected from the first communication terminal.

7. An information processing system comprising:
circuitry including at least an acceleration sensor and a display, the circuitry configured to:
detect a first approach of a first communication terminal;
perform a preprocess of the first communication terminal as a condition that the first approach is detected;
detect a second approach of a second communication terminal while the circuity is performing the preprocess of the first communication terminal.

8. The information processing system according to claim 7, wherein
the preprocess is an authentication process for unlocking.

9. The information processing system according to claim 8, wherein
the authentication process includes a verification of whether or not a public key corresponding to a secret key is rightful.

10. The information processing system according to claim 7, wherein the circuitry configured to:
put identification information of the second communication terminal, for which the second approach is detected, into queue.

11. The information processing system according to claim 10, wherein the preprocess is a first preprocess, the circuitry configured to:
perform a second preprocess of the second communication terminal based on the identification information.

12. The information processing system according to claim 11, wherein the circuitry configured to:
halt the second preprocess as a condition that a unlocking request is detected from the first communication terminal.

13. An information processing method comprising:
detecting a first approach of a first communication terminal;
performing a preprocess of the first communication terminal as a condition that the first approach is detected;
detecting a second approach of a second communication terminal while the circuity is performing the preprocess of the first communication terminal.

14. The information processing method according to claim 13, wherein
the preprocess is an authentication process for unlocking.

15. The information processing method according to claim 14, further comprising:
verifying whether or not a public key corresponding to a secret key is rightful.

16. The information processing method according to claim 13, further comprising:
putting identification information of the second communication terminal, for which the second approach is detected, into queue.

17. The information processing method according to claim 16, wherein the preprocess is a first preprocess, further comprising:
performing a second preprocess of the second communication terminal based on the identification information.

18. The information processing method according to claim 17, further comprising:
halting the second preprocess as a condition that a unlocking request is detected from the first communication terminal.

* * * * *